US012612195B2

(12) United States Patent
Andreev

(10) Patent No.: US 12,612,195 B2
(45) Date of Patent: Apr. 28, 2026

(54) SYSTEM FOR VISUALIZING IMAGE (VARIANTS), METHOD FOR VISUALIZING IMAGE (VARIANTS) AND UNMANNED AERIAL VEHICLE

(71) Applicant: Pavel Ruslanovich Andreev, Nevsky (RU)

(72) Inventor: Pavel Ruslanovich Andreev, Nevsky (RU)

( * ) Notice: Subject to any disclaimer, the term of this patent is extended or adjusted under 35 U.S.C. 154(b) by 249 days.

(21) Appl. No.: 18/221,095

(22) Filed: Jul. 12, 2023

(65) Prior Publication Data

US 2024/0199243 A1     Jun. 20, 2024

(30) Foreign Application Priority Data

Nov. 9, 2022     (RU) ................................ 2022129081

(51) Int. Cl.
 *B64U 20/87*          (2023.01)
 *B64C 39/02*          (2023.01)
 (Continued)

(52) U.S. Cl.
 CPC ............ *B64U 20/87* (2023.01); *B64C 39/024* (2013.01); *B64U 70/90* (2023.01); *G05D 1/695* (2024.01);
 (Continued)

(58) Field of Classification Search
 CPC ........ B64U 20/87; B64U 70/90; B64U 10/13; B64U 2101/24; B64U 2201/10;
 (Continued)

(56) References Cited

U.S. PATENT DOCUMENTS 8,876,571 B2     11/2014   Trowbridge et al.
9,645,581 B1 *   5/2017   Yang ...................... G05D 1/101
 (Continued)

FOREIGN PATENT DOCUMENTS

KR     10-2017-0045071 A     4/2017
KR     10-2018-0119455 A     11/2018
KR     10-2019-0097702 A     8/2019

*Primary Examiner* — Sohana Tanju Khayer
(74) *Attorney, Agent, or Firm* — Taft Stettinius & Hollister LLP

(57)               ABSTRACT

Provided is a system for visualizing an image, including: (i) one or more parking stations; (ii) unmanned aerial vehicles which are accommodated in the parking stations and each of which is provided with at least one display; (iii) a control device communicatively coupled to the unmanned aerial vehicles and configured to direct at least a portion of the unmanned aerial vehicles from at least one of the parking stations to a predetermined region of space so as to enable disposition of each of the directed unmanned aerial vehicles in a predetermined spatial location in accordance with a predetermined model of arrangement of unmanned aerial vehicles to form in the air at least one aggregate display of the displays; wherein the control device is configured to present data relating to an image to the directed unmanned aerial vehicles so as to enable displaying of the image at least on a portion of the aggregate display, and the unmanned aerial vehicles whose displays form the aggregate display define at least one movable string of unmanned aerial vehicles as part of the aggregate display.

79 Claims, 19 Drawing Sheets

(51) Int. Cl.

| | |
|---|---|
| *B64U 10/13* | (2023.01) |
| *B64U 70/90* | (2023.01) |
| *G05D 1/695* | (2024.01) |
| *G06V 10/00* | (2022.01) |
| *G08G 5/32* | (2025.01) |
| *G08G 5/55* | (2025.01) |
| *G08G 5/56* | (2025.01) |
| *G08G 5/57* | (2025.01) |
| *G08G 5/59* | (2025.01) |
| *G08G 5/80* | (2025.01) |
| *B64U 101/24* | (2023.01) |
| *G05D 109/25* | (2024.01) |

(52) U.S. Cl.
CPC .............. *G06V 10/00* (2022.01); *G08G 5/32* (2025.01); *G08G 5/55* (2025.01); *G08G 5/56* (2025.01); *G08G 5/57* (2025.01); *G08G 5/59* (2025.01); *G08G 5/80* (2025.01); *B64U 10/13* (2023.01); *B64U 2101/24* (2023.01); *B64U 2201/10* (2023.01); *B64U 2201/102* (2023.01); *G05D 2109/254* (2024.01)

(58) Field of Classification Search
CPC .......... B64U 2201/102; B64U 2201/20; B64U 20/80; B64U 80/00; B64U 20/70; B64U 50/37; B64U 80/70; B64C 39/024; G05D 1/695; G05D 2109/254; G05D 1/104; G06V 10/00; G08G 5/32; G08G 5/55; G08G 5/56; G08G 5/57; G08G 5/59; G08G 5/80; G08G 5/26; H04N 7/18; B64D 47/02; G09F 9/33; G09F 9/35; G09F 21/08; Y02T 50/50
See application file for complete search history.

(56) References Cited

U.S. PATENT DOCUMENTS

| | | | | |
|---|---|---|---|---|
| 9,678,507 | B1 * | 6/2017 | Douglas ................... | G08G 5/22 |
| 10,303,415 | B1 | 5/2019 | Ananthanarayanan et al. | |
| 10,338,610 | B2 | 7/2019 | Gurdan | |
| 10,370,101 | B2 | 8/2019 | Kales et al. | |
| 10,812,960 | B2 * | 10/2020 | Weinfield ................ | H04W 4/44 |
| 11,854,262 | B1 * | 12/2023 | Lecocke ................ | G06V 20/35 |
| 11,895,508 | B1 * | 2/2024 | Qureshi ................ | H04W 16/26 |
| 12,033,547 | B2 * | 7/2024 | Saes ....................... | G09G 3/002 |
| 12,220,994 | B2 * | 2/2025 | Fisher ..................... | B60L 53/51 |
| 12,235,639 | B1 * | 2/2025 | Downey ............... | B64C 39/024 |
| 12,310,274 | B1 * | 5/2025 | Muehlfeld ............ | G06T 3/4038 |
| 12,315,376 | B1 * | 5/2025 | Parker ..................... | G08G 5/22 |
| 12,380,657 | B1 * | 8/2025 | Pohl ........................ | H04L 41/22 |
| 2014/0233099 | A1 * | 8/2014 | Stark ....................... | G09F 19/18 |
| | | | | 362/555 |
| 2014/0236388 | A1 * | 8/2014 | Wong ................... | B64D 47/02 |
| | | | | 244/17.23 |
| 2017/0137125 | A1 * | 5/2017 | Kales ...................... | G09F 21/10 |
| 2017/0190104 | A1 * | 7/2017 | Bostick ................ | B29C 64/106 |
| 2017/0240296 | A1 | 8/2017 | Molnar et al. | |
| 2018/0067309 | A1 * | 3/2018 | Shimura ................. | G06F 3/011 |
| 2018/0111683 | A1 * | 4/2018 | Di Benedetto ....... | G06Q 10/083 |
| 2018/0136646 | A1 * | 5/2018 | Gurdan .................. | G09F 21/06 |
| 2018/0186473 | A1 * | 7/2018 | Erickson ............... | B60L 53/665 |
| 2018/0231972 | A1 * | 8/2018 | Woon ...................... | G08G 5/55 |
| 2018/0237161 | A1 * | 8/2018 | Minnick ................ | B64U 50/37 |
| 2019/0051224 | A1 * | 2/2019 | Marshall ............... | G09F 19/226 |
| 2019/0106212 | A1 * | 4/2019 | Furukawa .......... | B65H 75/4484 |
| 2019/0138031 | A1 * | 5/2019 | Arango .................. | G05D 1/104 |
| 2019/0310628 | A1 * | 10/2019 | Taveira ................ | B64D 45/0031 |
| 2020/0067604 | A1 * | 2/2020 | Hiller .................... | B64U 10/13 |
| 2020/0349852 | A1 * | 11/2020 | DiCosola ................. | G08G 5/55 |
| 2021/0142776 | A1 * | 5/2021 | Sadhwani ........... | G06V 10/454 |
| 2021/0148131 | A1 | 5/2021 | Wankewycz | |
| 2021/0198983 | A1 * | 7/2021 | Eitschberger ......... | E21B 43/117 |
| 2021/0200245 | A1 * | 7/2021 | Lim ....................... | G08G 5/32 |
| 2021/0295533 | A1 * | 9/2021 | DeLeon .................. | G06T 7/246 |
| 2021/0341128 | A1 * | 11/2021 | Abron ..................... | G09F 19/12 |
| 2021/0403157 | A1 * | 12/2021 | Thompson ............. | G06T 19/00 |
| 2022/0023685 | A1 * | 1/2022 | Nohmi .................... | B64U 10/13 |
| 2022/0029438 | A1 * | 1/2022 | Maurer ............ | H02J 7/007182 |
| 2022/0058960 | A1 * | 2/2022 | Stein .................... | B64C 39/024 |
| 2022/0090576 | A1 * | 3/2022 | Sia ............................ | F03D 9/11 |
| 2022/0161928 | A1 * | 5/2022 | Scott ...................... | B64U 50/34 |
| 2022/0242560 | A1 * | 8/2022 | Fernandez ............... | B64F 1/20 |
| 2022/0285836 | A1 * | 9/2022 | Badichi .................... | H01Q 3/02 |
| 2023/0095505 | A1 * | 3/2023 | Dicosola ................. | G09F 21/08 |
| | | | | 701/3 |
| 2023/0106595 | A1 * | 4/2023 | Eitschberger ....... | E21B 43/1185 |
| | | | | 166/297 |
| 2024/0026657 | A1 * | 1/2024 | Sekiguchi .............. | B64U 10/13 |
| 2024/0043143 | A1 * | 2/2024 | Wannowsky .......... | B64U 10/14 |
| 2024/0124169 | A1 * | 4/2024 | Song ...................... | B64U 80/25 |
| 2024/0248477 | A1 * | 7/2024 | Weinheber .............. | G05D 1/86 |
| 2024/0281000 | A1 * | 8/2024 | Cai ......................... | G08G 5/54 |
| 2024/0394643 | A1 * | 11/2024 | Kristensen ............. | B66C 17/06 |
| 2024/0419177 | A1 * | 12/2024 | Sharon ................... | B64U 80/00 |

\* cited by examiner

300

310

200

200

320

600

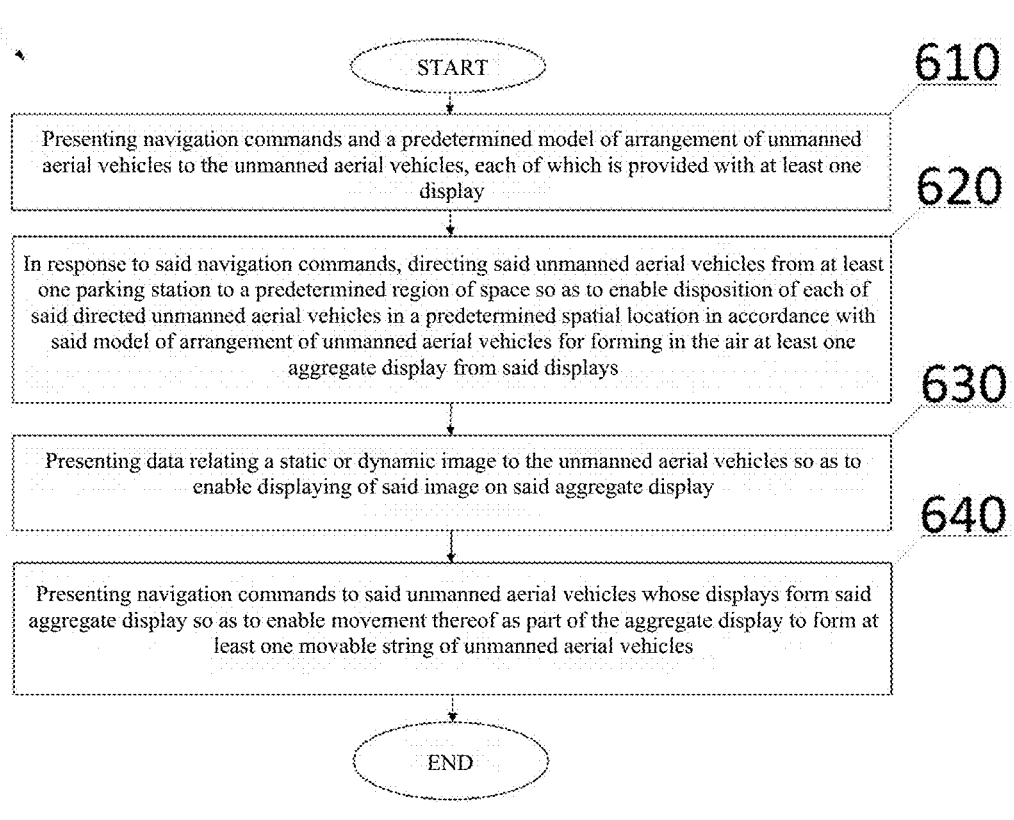

610

START

Presenting navigation commands and a predetermined model of arrangement of unmanned aerial vehicles to the unmanned aerial vehicles, each of which is provided with at least one display

620

In response to said navigation commands, directing said unmanned aerial vehicles from at least one parking station to a predetermined region of space so as to enable disposition of each of said directed unmanned aerial vehicles in a predetermined spatial location in accordance with said model of arrangement of unmanned aerial vehicles for forming in the air at least one aggregate display from said displays

630

Presenting data relating a static or dynamic image to the unmanned aerial vehicles so as to enable displaying of said image on said aggregate display

640

Presenting navigation commands to said unmanned aerial vehicles whose displays form said aggregate display so as to enable movement thereof as part of the aggregate display to form at least one movable string of unmanned aerial vehicles

END

Fig. 12

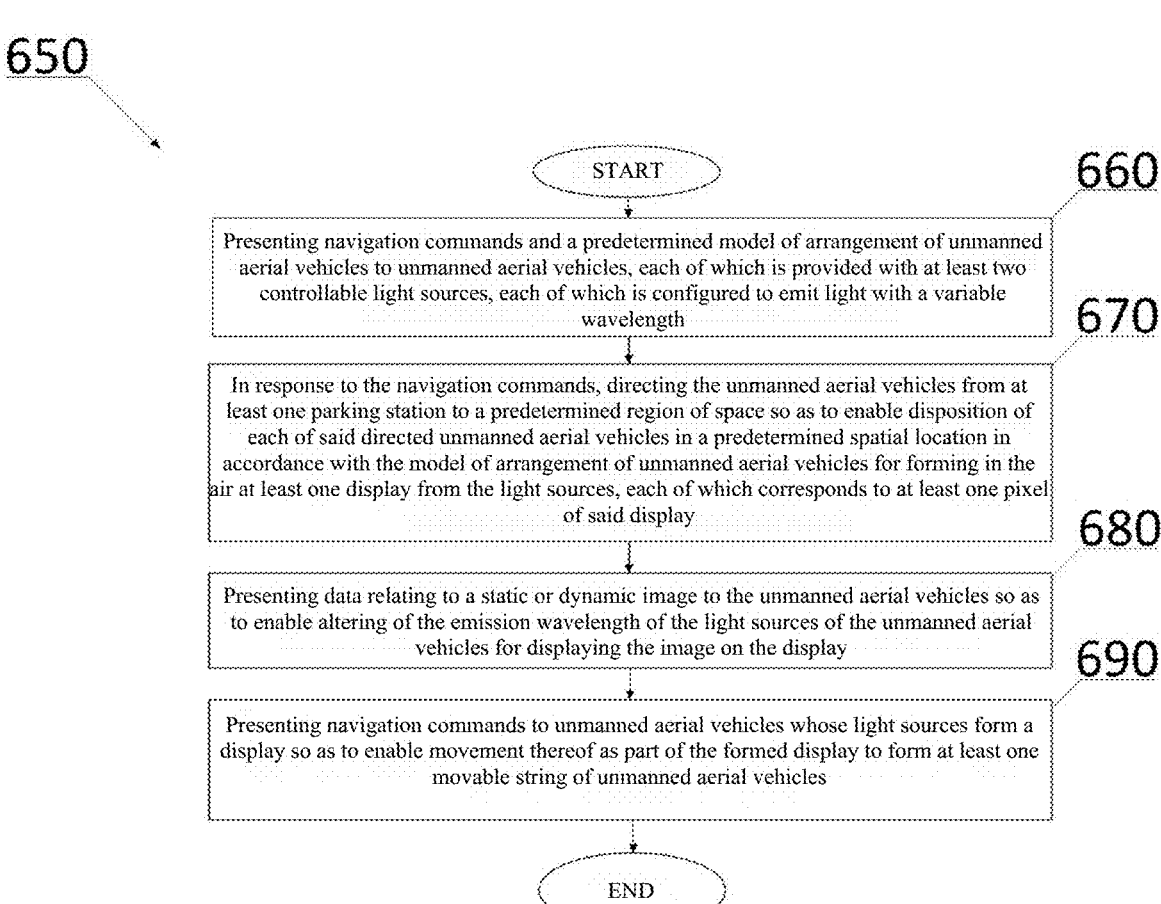

650

660

START

Presenting navigation commands and a predetermined model of arrangement of unmanned aerial vehicles to unmanned aerial vehicles, each of which is provided with at least two controllable light sources, each of which is configured to emit light with a variable wavelength

670

In response to the navigation commands, directing the unmanned aerial vehicles from at least one parking station to a predetermined region of space so as to enable disposition of each of said directed unmanned aerial vehicles in a predetermined spatial location in accordance with the model of arrangement of unmanned aerial vehicles for forming in the air at least one display from the light sources, each of which corresponds to at least one pixel of said display

680

Presenting data relating to a static or dynamic image to the unmanned aerial vehicles so as to enable altering of the emission wavelength of the light sources of the unmanned aerial vehicles for displaying the image on the display

690

Presenting navigation commands to unmanned aerial vehicles whose light sources form a display so as to enable movement thereof as part of the formed display to form at least one movable string of unmanned aerial vehicles

END

Fig. 13

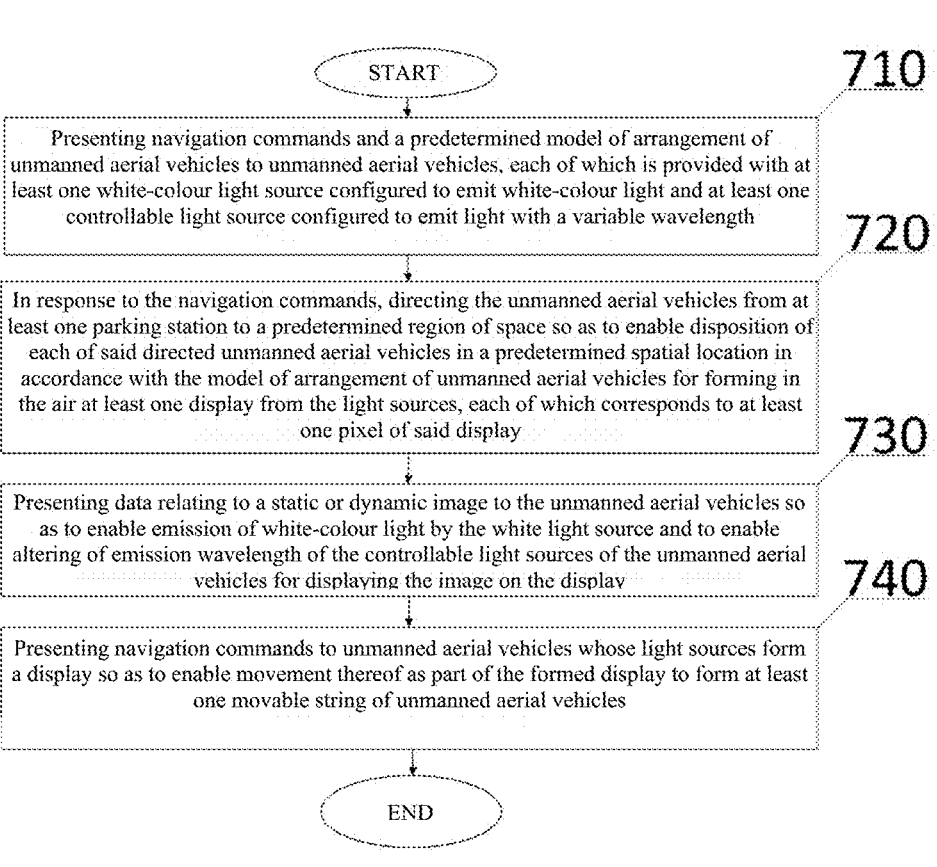

700

710

START

Presenting navigation commands and a predetermined model of arrangement of unmanned aerial vehicles to unmanned aerial vehicles, each of which is provided with at least one white-colour light source configured to emit white-colour light and at least one controllable light source configured to emit light with a variable wavelength

720

In response to the navigation commands, directing the unmanned aerial vehicles from at least one parking station to a predetermined region of space so as to enable disposition of each of said directed unmanned aerial vehicles in a predetermined spatial location in accordance with the model of arrangement of unmanned aerial vehicles for forming in the air at least one display from the light sources, each of which corresponds to at least one pixel of said display

730

Presenting data relating to a static or dynamic image to the unmanned aerial vehicles so as to enable emission of white-colour light by the white light source and to enable altering of emission wavelength of the controllable light sources of the unmanned aerial vehicles for displaying the image on the display

740

Presenting navigation commands to unmanned aerial vehicles whose light sources form a display so as to enable movement thereof as part of the formed display to form at least one movable string of unmanned aerial vehicles

END

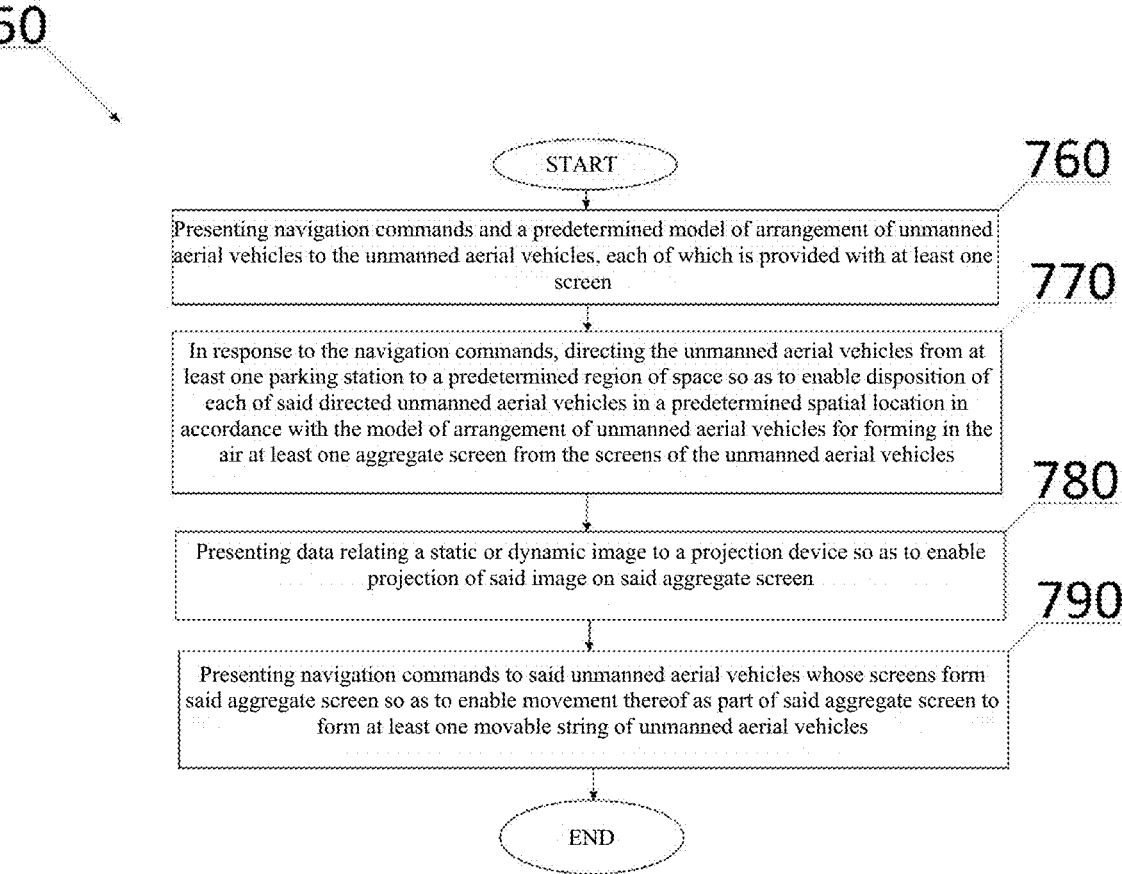

760

START

Presenting navigation commands and a predetermined model of arrangement of unmanned aerial vehicles to the unmanned aerial vehicles, each of which is provided with at least one screen

770

In response to the navigation commands, directing the unmanned aerial vehicles from at least one parking station to a predetermined region of space so as to enable disposition of each of said directed unmanned aerial vehicles in a predetermined spatial location in accordance with the model of arrangement of unmanned aerial vehicles for forming in the air at least one aggregate screen from the screens of the unmanned aerial vehicles

780

Presenting data relating a static or dynamic image to a projection device so as to enable projection of said image on said aggregate screen

790

Presenting navigation commands to said unmanned aerial vehicles whose screens form said aggregate screen so as to enable movement thereof as part of said aggregate screen to form at least one movable string of unmanned aerial vehicles

END

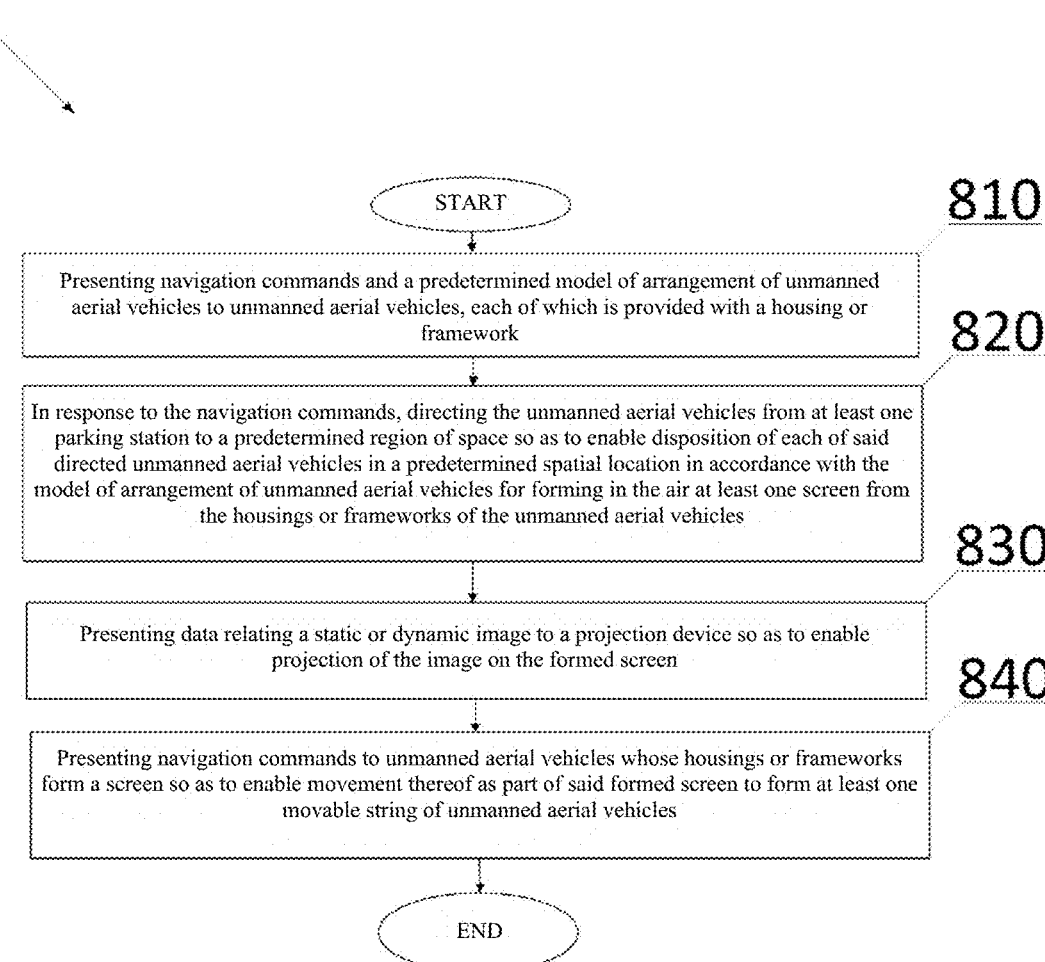

810

START

Presenting navigation commands and a predetermined model of arrangement of unmanned aerial vehicles to unmanned aerial vehicles, each of which is provided with a housing or framework

820

In response to the navigation commands, directing the unmanned aerial vehicles from at least one parking station to a predetermined region of space so as to enable disposition of each of said directed unmanned aerial vehicles in a predetermined spatial location in accordance with the model of arrangement of unmanned aerial vehicles for forming in the air at least one screen from the housings or frameworks of the unmanned aerial vehicles

830

Presenting data relating a static or dynamic image to a projection device so as to enable projection of the image on the formed screen

840

Presenting navigation commands to unmanned aerial vehicles whose housings or frameworks form a screen so as to enable movement thereof as part of said formed screen to form at least one movable string of unmanned aerial vehicles

END

Fig. 16

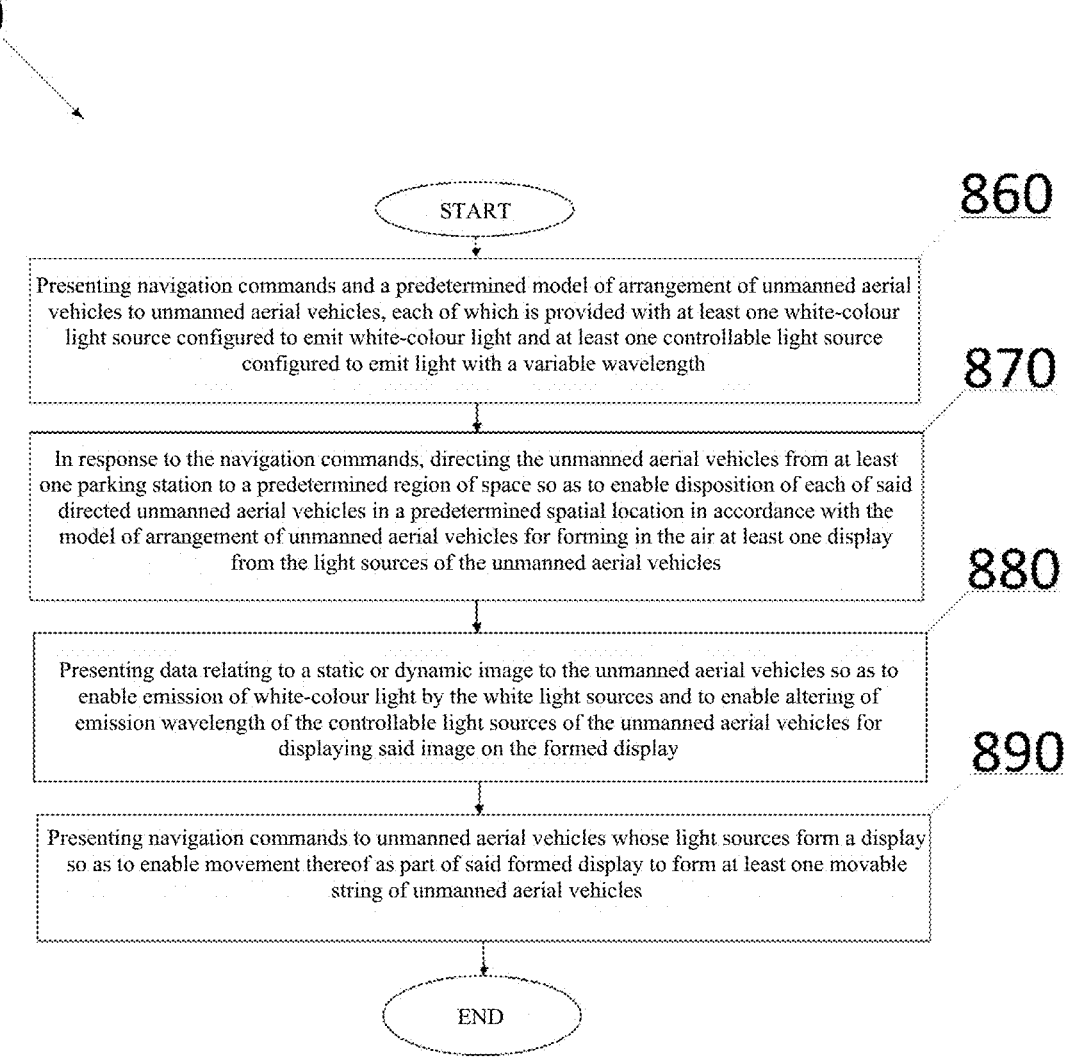

850

START

860

Presenting navigation commands and a predetermined model of arrangement of unmanned aerial vehicles to unmanned aerial vehicles, each of which is provided with at least one white-colour light source configured to emit white-colour light and at least one controllable light source configured to emit light with a variable wavelength

870

In response to the navigation commands, directing the unmanned aerial vehicles from at least one parking station to a predetermined region of space so as to enable disposition of each of said directed unmanned aerial vehicles in a predetermined spatial location in accordance with the model of arrangement of unmanned aerial vehicles for forming in the air at least one display from the light sources of the unmanned aerial vehicles

880

Presenting data relating to a static or dynamic image to the unmanned aerial vehicles so as to enable emission of white-colour light by the white light sources and to enable altering of emission wavelength of the controllable light sources of the unmanned aerial vehicles for displaying said image on the formed display

890

Presenting navigation commands to unmanned aerial vehicles whose light sources form a display so as to enable movement thereof as part of said formed display to form at least one movable string of unmanned aerial vehicles

END

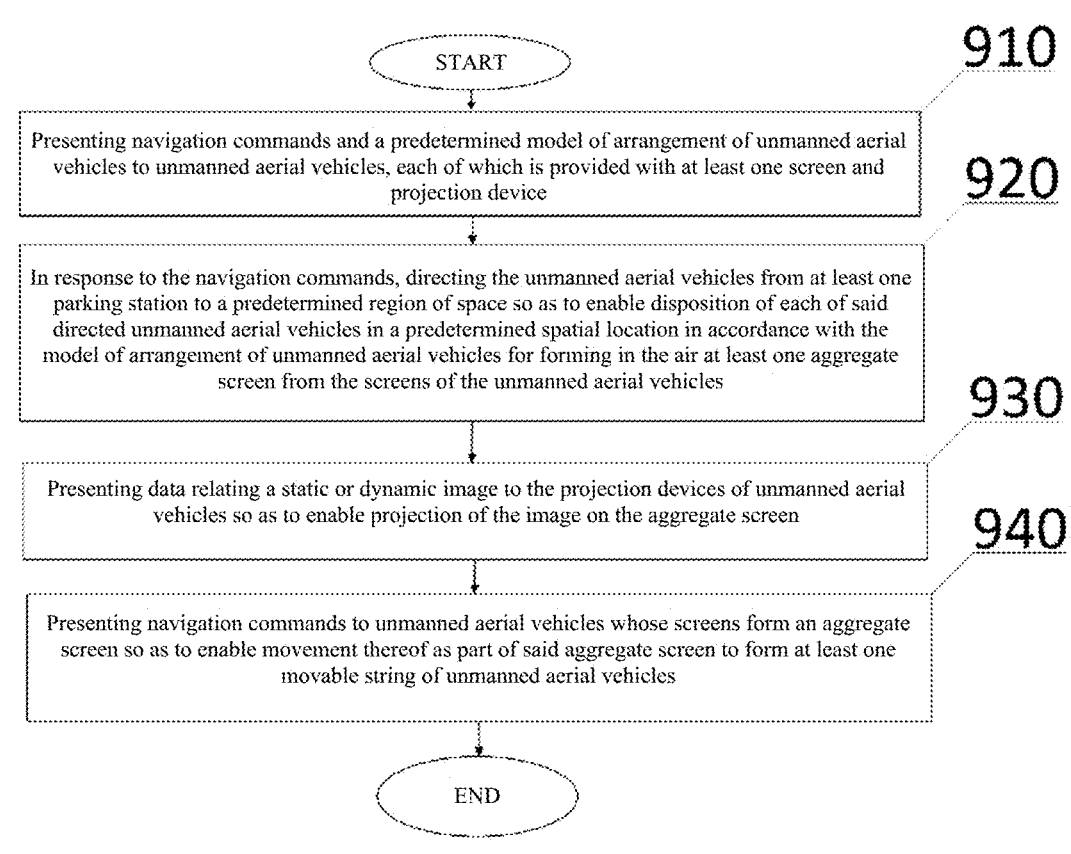

910

START

Presenting navigation commands and a predetermined model of arrangement of unmanned aerial vehicles to unmanned aerial vehicles, each of which is provided with at least one screen and projection device

920

In response to the navigation commands, directing the unmanned aerial vehicles from at least one parking station to a predetermined region of space so as to enable disposition of each of said directed unmanned aerial vehicles in a predetermined spatial location in accordance with the model of arrangement of unmanned aerial vehicles for forming in the air at least one aggregate screen from the screens of the unmanned aerial vehicles

930

Presenting data relating a static or dynamic image to the projection devices of unmanned aerial vehicles so as to enable projection of the image on the aggregate screen

940

Presenting navigation commands to unmanned aerial vehicles whose screens form an aggregate screen so as to enable movement thereof as part of said aggregate screen to form at least one movable string of unmanned aerial vehicles

END

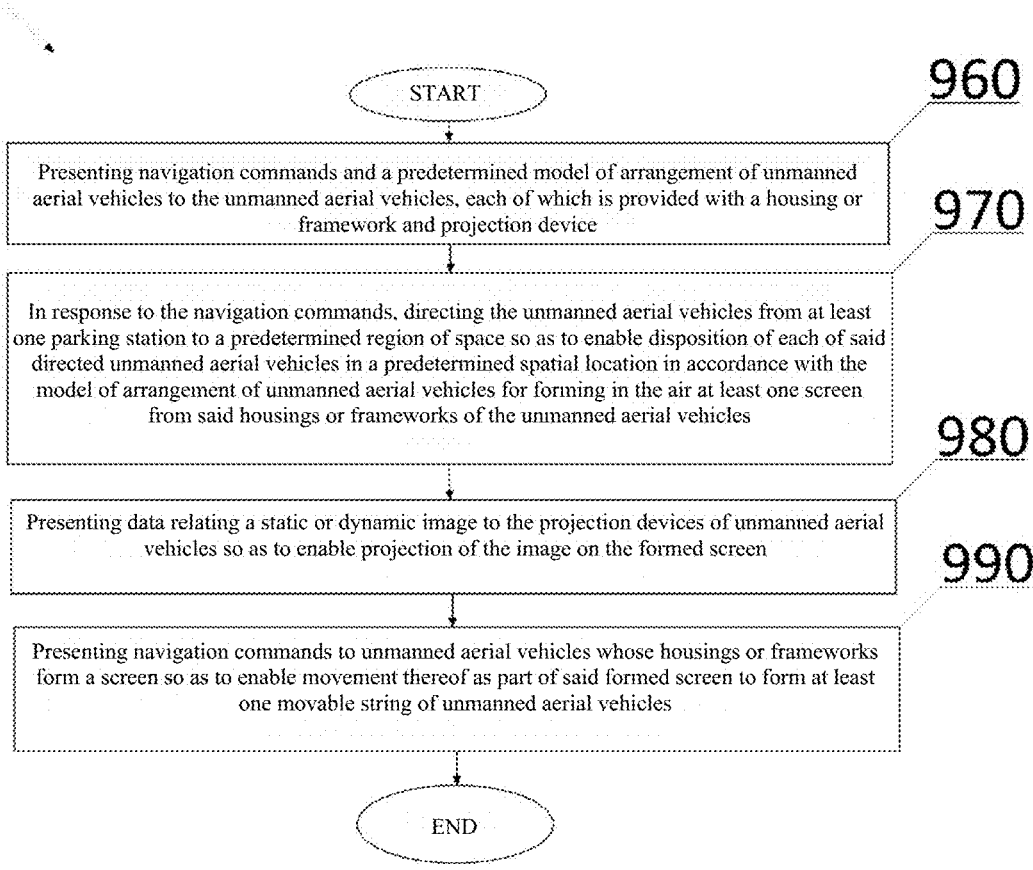

960

START

970

Presenting navigation commands and a predetermined model of arrangement of unmanned aerial vehicles to the unmanned aerial vehicles, each of which is provided with a housing or framework and projection device In response to the navigation commands, directing the unmanned aerial vehicles from at least one parking station to a predetermined region of space so as to enable disposition of each of said directed unmanned aerial vehicles in a predetermined spatial location in accordance with the model of arrangement of unmanned aerial vehicles for forming in the air at least one screen from said housings or frameworks of the unmanned aerial vehicles

980

Presenting data relating a static or dynamic image to the projection devices of unmanned aerial vehicles so as to enable projection of the image on the formed screen

990

Presenting navigation commands to unmanned aerial vehicles whose housings or frameworks form a screen so as to enable movement thereof as part of said formed screen to form at least one movable string of unmanned aerial vehicles

END

Fig. 19

SYSTEM FOR VISUALIZING IMAGE (VARIANTS), METHOD FOR VISUALIZING IMAGE (VARIANTS) AND UNMANNED AERIAL VEHICLE

CROSS REFERENCE TO RELATED APPLICATIONS

This application claims priority to Russian Patent Application No. RU2022129081 filed Nov. 9, 2022, the contents of which are hereby incorporated by reference in their entirety.

FIELD OF THE INVENTION

The present invention relates to aviation equipment, in particular to means and methods for visualizing images in the air, and specifically to a system and method for visualizing images based on the use of controllable unmanned aerial vehicles, as well as to an unmanned aerial vehicle which may be used as part of such system and method for visualizing an image.

BACKGROUND OF THE INVENTION

To date, manned and unmanned aerial vehicles with various designs and propulsion units used in the prior art for visualizing images have become widely popular. In particular, known are drones, airplanes, helicopters, gliders, aerostats and other types of aircraft which are capable of performing, to one degree or another, visualisation of images in the air, in particular capable of carrying displays for displaying images, screens for projecting thereon images, various light sources for emitting light with different wavelength and/or capable of dispersing in the air various aerosols or suspensions for projecting thereon an image, and/or the like.

The unmanned aerial vehicles are advantageous over other types of aircraft which may be used to visualise an image in the air in the following: (i) possibility to accommodate such unmanned aerial vehicles in close proximity to the region of space in which it is contemplated to use these unmanned aerial vehicles for visualizing images, thus allowing them to quickly occupy the appropriate spatial locations in a predetermined region of space; (ii) possibility to obtain an approval from local authorities (local administration) for use of such unmanned aerial vehicles within city limits for visualizing images, for example, advertising static or dynamic images; (iii) possibility to visualise images in the air using such unmanned aerial vehicles at a small distance from the ground surface and, accordingly, viewers, thus allowing viewers to clearly see the images being visualised; (iv) less likelihood of causing serious injuries to viewers viewing the images being visualised, or threats to life of such viewers in the event of occurrence of malfunctions in the operation of such unmanned aerial vehicles, breakdowns of such unmanned aerial vehicles, or unexpected collisions of unmanned aerial vehicles to other air or ground objects; and (v) less noise pollution of the region of space in which there are visualised the images using such unmanned aerial vehicles as a result of the operation of air propulsion units thereof.

In the meantime, use of other types of air vehicles, such as, for example, airplanes, helicopters, gliders, aerostats, or the like, in some regions of space, especially in urban conditions, has significant limitations for visualizing images. In particular, airplanes, helicopters and other similar aircraft require the availability of corresponding takeoff and landing areas which occupy a significant area, require obtaining a permission from local authorities for use of such air vehicles within city limits for visualizing images and may be significantly removed from the region of space in which it is contemplated to visualise images using such aircraft. Furthermore, the overall dimensions of most aircraft, speed of movement thereof in the air and the noise from engines or air propulsion units thereof preclude the possibility of use thereof within city limits at a small distance from viewers observing the images being visualised using such air vehicles.

For example, U.S. patent Ser. No. 10/303,415 (hereinafter U.S. Ser. No. 10/303,415) published on May 28, 2019 describes a system for visualizing an image which is comprised of unmanned aerial vehicles provided each with distinct means for visualizing an image, and a control device communicatively coupled, in a wired or wireless manner, to unmanned aerial vehicles and configured to direct said unmanned aerial vehicles to a predetermined region of space so as to enable each of said directed unmanned aerial vehicles to be disposed in a predetermined spatial location to form in the air an aggregate display from said displays. It should be noted that the system for visualizing an image disclosed in U.S. Ser. No. 10/303,415 does not provide accommodation or parking of unmanned aerial vehicles used for visualizing an image in close proximity to the region of space in which it is contemplated to visualise said image in the air, thus also complicating the task of delivery of unmanned aerial vehicles to said region of space, complicating the task of replacement or replenishment of the range of unmanned aerial vehicles involved in the implementation of the image visualisation process, and lengthening, in terms of time, the process of formation of an aggregate display in the air using such unmanned aerial vehicles.

Thus, the mass adoption of unmanned aerial vehicles for visualizing images in a predetermined region of space, especially within city limits, requires at least to solve the urgent problem related to the storage or parking of such unmanned aerial vehicles in close proximity to the region of space (including in the region of space within city limits) in which it is contemplated to visualise an image in the air using such unmanned aerial vehicles, or to the delivery of such unmanned aerial vehicles to said region of space.

Accordingly, U.S. patent Ser. No. 10/370,101 (hereinafter U.S. Ser. No. 10/370,101) published on May 18, 2017 describes a system for visualizing an image which is comprised of unmanned aerial vehicles provided each with distinct means for visualizing an image, parking stations in which there are accommodated said unmanned aerial vehicles, and a control device communicatively coupled to unmanned aerial vehicles and configured to direct said unmanned aerial vehicles to a predetermined region of space so as to enable each of said directed unmanned aerial vehicles to be disposed in a predetermined spatial location to form in the air an aggregate display from said displays.

Although the system for visualizing an image disclosed in U.S. Ser. No. 10/370,101 at least partially solves the above task of storing or parking unmanned aerial vehicles used for visualizing an image, said unmanned aerial vehicles according to U.S. Ser. No. 10/370,101 are only capable of hovering in the air so as to maintain spatial positions thereof in the air and, accordingly, maintain the spatial position of the aggregate display with an image being visualised thereon, thus complicating the possibility of replacement of at least one of the unmanned aerial vehicles whose image visualisation means are involved in the visualisation of an image on the aggregate display, without deteriorating the quality of the image being visualised (in particular, for example, without temporal disappearance of at least a portion of the image being visualised, the portion corresponding to image visualisation means related to the unmanned aerial vehicle being replaced), and/or thus complicating the possibility of movement of the aggregate display in the air without deteriorating the quality of the image being visualised (in particular, for example, without temporal disappearance of at least a portion of the image being visualised, the portion corresponding to image visualisation means related to the unmanned aerial vehicles being moved, or without temporal interruption of demonstration of the image being visualised for a period of time corresponding to the time necessary for rearrangement of unmanned aerial vehicles for altering the spatial position of the aggregate display formed from the image visualisation means thereof).

Thus, the main disadvantage of the known system for visualizing an image disclosed in U.S. Ser. No. 10/370,101 is that it is possible to lose the quality of an image displayed on the aggregate display while performing replacement of at least one of the unmanned aerial vehicles whose image visualisation means are involved in image visualisation on the aggregate display, and/or in the event that there is a need to move in the air the aggregate display and, accordingly, the image being visualised on said aggregate display.

Thus, there is an obvious need for further improvement of the known systems for visualizing images, in particular, for maintaining the quality of the image being visualised on the aggregate display formed from the image visualisation means of distinct unmanned aerial vehicles while movement in the air of said aggregate display and the image being visualised thereon and while replacement of at least one of said unmanned aerial vehicles.

Accordingly, the technical problem solved by the present invention is to create a system for visualizing an image which at least partially eliminates at least one of the above disadvantages of the known system for visualizing an image which is increased likelihood of image quality deterioration while performing replacement of at least one of the unmanned aerial vehicles whose image visualisation means are involved in visualisation of an image on the aggregate display and/or while movement of said aggregate display with an image being visualised thereon in the air.

DISCLOSURE

The object of the present invention is to create a system for visualizing an image that addresses at least one of the above problems of the prior art, and also to expand the range of image visualisation means.

The task at hand is solved in the first aspect of the present invention by the fact that in the subject system for visualizing an image, comprising: (i) one or more parking stations; (ii) unmanned aerial vehicles which are accommodated in the parking stations and each of which is provided with at least one display; and (iii) a control device communicatively coupled to the unmanned aerial vehicles and configured to direct at least a portion of said unmanned aerial vehicles from at least one parking station of said parking stations to a predetermined region of space so as to enable disposition of each of said directed unmanned aerial vehicles in a predetermined spatial location in accordance with a predetermined model of arrangement of unmanned aerial vehicles to form in the air at least one aggregate display from said displays, wherein (a) the control device is configured to present data relating to an image to said directed unmanned aerial vehicles so as to enable displaying of said image on said aggregate display, and (b) the unmanned aerial vehicles whose displays form said aggregate display define at least one movable string of unmanned aerial vehicles as part of said aggregate display.

Furthermore, the task at hand is solved in a second aspect of the present invention by the fact that the subject system for visualizing an image comprises: (i) one or more parking stations; (ii) unmanned aerial vehicles used by said vehicle; (iii) a control device communicatively coupled to the unmanned aerial vehicles and configured to direct at least a portion of said unmanned aerial vehicles from the parking stations to a predetermined region of space so as to enable disposition of each of said directed unmanned aerial vehicles in a predetermined spatial location in accordance with a predetermined model of arrangement of unmanned aerial vehicles to form in the air at least one display of said light sources, wherein (a) each of the light sources corresponds to at least one pixel of said display, (b) the control device is configured to present data relating to an image to the unmanned aerial vehicles so as to enable altering of the emission wavelength of the light sources of said unmanned aerial vehicles for displaying said image on said formed display, and (c) the unmanned aerial vehicles whose screens form said aggregate screen define at least one movable string of unmanned aerial vehicles as part of said formed display.

Furthermore, the task at hand is solved in a third aspect of the present invention by the fact that the subject system for visualizing an image comprises: (i) one or more parking stations; (ii) unmanned aerial vehicles which are accommodated in the parking stations and each of which is provided with at least one screen; (iii) a projection device; and (iv) a control device communicatively coupled to the unmanned aerial vehicles and configured to direct at least a portion of said unmanned aerial vehicles from at least one parking station of said parking stations to a predetermined region of space so as to enable disposition of each of said directed unmanned aerial vehicles in a predetermined spatial location in accordance with a predetermined model of arrangement of unmanned aerial vehicles to form in the air at least one aggregate screen of said screens, wherein (a) the control device is configured to present data relating to an image to said projection device so as to enable projection of said image on said aggregate screen, and (b) the unmanned aerial vehicles whose screens form said aggregate screen define at least one movable string of unmanned aerial vehicles as part of said aggregate screen.

Furthermore, the task at hand is solved in a fourth aspect of the present invention by the fact that the subject system for visualizing an image comprises: (i) one or more parking stations; (ii) unmanned aerial vehicles which are accommodated in the parking stations and each of which has a housing or framework; (iii) a projection device; (iv) a control device communicatively coupled to the unmanned aerial vehicles and configured to direct at least a portion of said unmanned aerial vehicles from at least one parking station of said parking stations to a predetermined region of space so as to enable disposition of each of said directed unmanned aerial vehicles in a predetermined spatial location in accordance with a predetermined model of arrangement of unmanned aerial vehicles to form in the air at least one screen from said housings or frameworks of the unmanned aerial vehicles, wherein (a) the control device is configured to present data relating to an image to said projection device so as to enable projection of said image on said formed screen, and (b) the unmanned aerial vehicles whose housings or frameworks form said screen define at least one movable string of unmanned aerial vehicles as part of said formed screen.

Furthermore, the task at hand is solved in a fifth aspect of the present invention by the fact that the subject system for visualizing an image comprises: (i) one or more parking stations; (ii) unmanned aerial vehicles which are accommodated in the parking stations and each of which is provided with at least one white-color light source configured to emit white-color light and at least one controllable light source configured to emit light with a variable wavelength; and (iii) a control device communicatively coupled to the unmanned aerial vehicles and configured to direct at least a portion of said unmanned aerial vehicles from the parking stations to a predetermined region of space so as to enable disposition of each of said directed unmanned aerial vehicles in a predetermined spatial location in accordance with a predetermined model of arrangement of unmanned aerial vehicles to form in the air at least one display of said light sources, wherein (a) each of the light sources corresponds to at least one pixel of said formed display, (b) the control device is configured to present data relating to an image to the unmanned aerial vehicles so as to enable emission of white-color light by said white light source and to enable altering of emission wavelength of said controllable light sources of the unmanned aerial vehicles for displaying said image on said display, and (c) the unmanned aerial vehicles whose light sources form said display define at least one movable string of unmanned aerial vehicles as part of said formed display.

Furthermore, the task at hand is solved in a sixth aspect of the present invention by the fact that the subject system for visualizing an image comprises: (i) one or more parking stations; (ii) unmanned aerial vehicles which are accommodated in the parking stations and each of which is provided with at least one screen and a projection device; and (iii) a control device communicatively coupled to the unmanned aerial vehicles and configured to direct at least a portion of said unmanned aerial vehicles from at least one parking station of said parking stations to a predetermined region of space so as to enable disposition of each of said directed unmanned aerial vehicles in a predetermined spatial location in accordance with a predetermined model of arrangement of unmanned aerial vehicles to form in the air at least one aggregate screen of said screens, wherein (a) the control device is configured to present data relating to an image to said projection devices of the unmanned aerial vehicles so as to enable projection of said image on said aggregate screen, and (b) the unmanned aerial vehicles whose screens form said aggregate screen define at least one movable string of unmanned aerial vehicles as part of said aggregate screen.

Furthermore, the task at hand is solved in a seventh aspect of the present invention by the fact that the subject system for visualizing an image comprises: (i) one or more parking stations; (ii) unmanned aerial vehicles which are accommodated in the parking stations, each of said unmanned aerial vehicles having a housing or framework and being provided with a projection device; and (iii) a control device communicatively coupled to the unmanned aerial vehicles and configured to direct at least a portion of said unmanned aerial vehicles from at least one parking station of said parking stations to a predetermined region of space so as to enable disposition of each of said directed unmanned aerial vehicles in a predetermined spatial location in accordance with a predetermined model of arrangement of unmanned aerial vehicles to form in the air at least one screen from said housings or frameworks of the unmanned aerial vehicles, wherein (a) the control device is configured to present data relating to an image to said projection devices of the unmanned aerial vehicles so as to enable projection of said image on said formed screen, and (b) the unmanned aerial vehicles whose housings or frameworks form said screen define at least one movable string of unmanned aerial vehicles as part of said formed screen.

Furthermore, the task at hand is solved in the eighth aspect of the present invention by the fact that the subject method for visualizing an image comprises the following steps of: (i) presenting navigation commands and a predetermined model of arrangement of unmanned aerial vehicles to the unmanned aerial vehicles, each of which is provided with at least one display; (ii) in response to said navigation commands, directing said unmanned aerial vehicles to a predetermined region of space so as to enable disposition of each of said directed unmanned aerial vehicles in a predetermined spatial location in accordance with said model of arrangement of unmanned aerial vehicles to form in the air at least one aggregate display from said displays; (iii) presenting data relating to a static or dynamic image to the unmanned aerial vehicles so as to enable displaying of said image on said aggregate display; and (iv) presenting navigation commands to said unmanned aerial vehicles whose displays form said aggregate display so as to enable movement thereof as part of said aggregate display to form at least one movable string of unmanned aerial vehicles.

Furthermore, the task at hand is solved in the ninth aspect of the present invention by the fact that the subject method for visualizing an image comprises the following steps of: (i) presenting navigation commands and a predetermined model of arrangement of unmanned aerial vehicles to unmanned aerial vehicles, each of which is provided with at least two controllable light sources, each of which is configured to emit light with a variable wavelength; (ii) in response to said navigation commands, directing said unmanned aerial vehicles to a predetermined region of space so as to enable disposition of each of said directed unmanned aerial vehicles in a predetermined spatial location in accordance with said model of arrangement of unmanned aerial vehicles to form in the air at least one display from said light sources, each of which corresponds to at least one pixel of said display; (iii) presenting data relating to a static or dynamic image to the unmanned aerial vehicles so as to enable altering of the emission wavelength of the light sources of said unmanned aerial vehicles for displaying said image on said formed display; and (iv) presenting navigation commands to said unmanned aerial vehicles whose light sources form said display so as to enable movement thereof as part of said formed display to form at least one movable string of unmanned aerial vehicles.

Furthermore, the task at hand is solved in the tenth aspect of the present invention by the fact that the subject method for visualizing an image comprises the following steps of: (i) presenting navigation commands and a predetermined model of arrangement of unmanned aerial vehicles to unmanned aerial vehicles, each of which is provided with at least one white-color light source configured to emit white-color light and at least one controllable light source configured to emit light with a variable wavelength; (ii) in response to said navigation commands, directing said unmanned aerial vehicles to a predetermined region of space so as to enable disposition of each of said directed unmanned aerial vehicles in a predetermined spatial location in accordance with said model of arrangement of unmanned aerial vehicles to form in the air at least one display from said light sources, each of which corresponds to at least one pixel of said display; (iii) presenting data relating to a static or dynamic image to the unmanned aerial vehicles so as to enable emission of white-color light by said white light source and to enable altering of emission wavelength of said controllable light sources of the unmanned aerial vehicles for displaying said image on said formed display; and (iv) presenting navigation commands to said unmanned aerial vehicles whose light sources form said display so as to enable movement thereof as part of said formed display to form at least one movable string of unmanned aerial vehicles.

Furthermore, the task at hand is solved in the eleventh aspect of the present invention by the fact that the subject unmanned aerial vehicle comprises: (i) a housing in which there is installed at least one air propulsion unit enabling movement of the unmanned aerial vehicle by air; (ii) at least two controllable light sources which are installed in the housing and each of which is configured to emit light with a variable wavelength so as to enable lightening or illumination of said housing; and (iii) a control module operably connected to said light sources so as to enable altering of the emission wavelength of said light sources for displaying at least a portion of a static or dynamic image by means of said light sources, wherein (a) the control module enables receipt of navigation commands for moving said unmanned aerial vehicle as part of a movable string of unmanned aerial vehicles.

Furthermore, the task at hand is solved in the twelfth aspect of the present invention by the fact that the subject method for visualizing an image comprises the following steps of: (i) presenting navigation commands and a predetermined model of arrangement of unmanned aerial vehicles to unmanned aerial vehicles, each of which is provided with at least one screen; (ii) in response to said navigation commands, directing said unmanned aerial vehicles from at least one parking station to a predetermined region of space so as to enable disposition of each of said directed unmanned aerial vehicles in a predetermined spatial location in accordance with said model of arrangement of unmanned aerial vehicles to form in the air at least one aggregate screen from said screens; (iii) presenting data relating a static or dynamic image to a projection device so as to enable projection of said image on said aggregate screen; and (iv) presenting navigation commands to said unmanned aerial vehicles whose screens form said aggregate screen so as to enable movement thereof as part of said aggregate screen to form at least one movable string of unmanned aerial vehicles.

Furthermore, the task at hand is solved in the thirteenth aspect of the present invention by the fact that the subject method for visualizing an image comprises the following steps of: (i) presenting navigation commands and a predetermined model of arrangement of unmanned aerial vehicles to unmanned aerial vehicles, each of which is provided with a housing or framework; (ii) in response to said navigation commands, directing said unmanned aerial vehicles from at least one parking station to a predetermined region of space so as to enable disposition of each of said directed unmanned aerial vehicles in a predetermined spatial location in accordance with said model of arrangement of unmanned aerial vehicles to form in the air at least one screen from said housings or frameworks; (iii) presenting data relating a static or dynamic image to a projection device so as to enable projection of said image on said screen; and (iv) presenting navigation commands to said unmanned aerial vehicles whose housings or frameworks form said screen so as to enable movement thereof as part of said formed screen to form at least one movable string of unmanned aerial vehicles.

Furthermore, the task at hand is solved in the fourteenth aspect of the present invention by the fact that the subject method for visualizing an image comprises the following steps of: (i) presenting navigation commands and a predetermined model of arrangement of unmanned aerial vehicles to unmanned aerial vehicles, each of which is provided with at least one white-color light source configured to emit white-color light and at least one controllable light source configured to emit light with a variable wavelength; (ii) in response to said navigation commands, directing said unmanned aerial vehicles from at least one parking station to a predetermined region of space so as to enable disposition of each of said directed unmanned aerial vehicles in a predetermined spatial location in accordance with said model of arrangement of unmanned aerial vehicles to form in the air at least one display from said light sources; (iii) presenting data relating to a static or dynamic image to said unmanned aerial vehicles so as to enable emission of white-color light by said white light sources and to enable altering of emission wavelength of said controllable light sources of the unmanned aerial vehicles for displaying said image on said display; and (iv) presenting navigation commands to said unmanned aerial vehicles whose light sources form said display so as to enable movement thereof as part of said formed display to form at least one movable string of unmanned aerial vehicles.

Furthermore, the task at hand is solved in the fifteenth aspect of the present invention by the fact that the subject method for visualizing an image comprises the following steps of: (i) presenting navigation commands and a predetermined model of arrangement of unmanned aerial vehicles to unmanned aerial vehicles, each of which is provided with at least one screen and projection device; (ii) in response to said navigation commands, directing said unmanned aerial vehicles from at least one parking station to a predetermined region of space so as to enable disposition of each of said directed unmanned aerial vehicles in a predetermined spatial location in accordance with said model of arrangement of unmanned aerial vehicles to form in the air at least one aggregate screen from said screens; (iii) presenting data relating a static or dynamic image to the projection devices of unmanned aerial vehicles so as to enable projection of said image on said aggregate screen; and (iv) presenting navigation commands to said unmanned aerial vehicles whose screens form said aggregate screen so as to enable movement thereof as part of said aggregate screen to form at least one movable string of unmanned aerial vehicles.

Furthermore, the task at hand is solved in the sixteenth aspect of the present invention by the fact that the subject method for visualizing an image comprises the following steps of: (i) presenting navigation commands and a predetermined model of arrangement of unmanned aerial vehicles to unmanned aerial vehicles, each of which is provided with a housing or framework and projection device; (ii) in response to said navigation commands, directing said unmanned aerial vehicles from at least one parking station to a predetermined region of space so as to enable disposition of each of said directed unmanned aerial vehicles in a predetermined spatial location in accordance with said model of arrangement of unmanned aerial vehicles to form in the air at least one screen from said housings or frameworks of unmanned aerial vehicles; (iii) presenting data relating a static or dynamic image to the projection devices of the unmanned aerial vehicles so as to enable projection of said image on said screen; and (iv) presenting navigation commands to said unmanned aerial vehicles whose housings or frameworks form said screen so as to enable movement thereof as part of said formed screen to form at least one movable string of unmanned aerial vehicles.

The system for visualizing an image according to the first aspect of the present invention, the system for visualizing an image according to the second aspect of the present invention, the system for visualizing an image according to the third aspect of the present invention, the system for visualizing an image according to the fourth aspect of the present invention, the system for visualizing an image according to the fifth aspect of the present invention, the system for visualizing an image according to the sixth aspect of the present invention, the system for visualizing an image according to the seventh aspect of the present invention, the system for visualizing an image according to the eighth aspect of the present invention, the method for visualizing images according to the ninth aspect of the present invention, the method for visualizing images according to the ninth aspect of the present invention, the method for visualizing images according to the tenth aspect of the present invention, the unmanned aerial vehicle according to the eleventh aspect of the present invention, the method for visualizing images according to the twelfth aspect of the present invention, the method for visualizing images according to the thirteenth aspect of the present invention, the method for visualizing images according to the fourteenth aspect of the present invention, the method for visualizing images according to the fifteenth aspect of the present invention, and the method for visualizing images according to the sixteenth aspect of the present invention provide each a technical result of developing a versatile image visualisation means providing for scalability, possibility to form images indoors as well as in the open air, ease of transportation, possibility to automatically deploy and collapse the structure. Said advantages of the subject technical solution are not limiting. One skilled would appreciate additional advantages of the technical solution and individual embodiments thereof from the following detailed description and the accompanying drawings.

Furthermore, the system for visualizing an image according to the first aspect of the present invention, the system for visualizing an image according to the second aspect of the present invention, the system for visualizing an image according to the third aspect of the present invention, the system for visualizing an image according to the fourth aspect of the present invention, the system for visualizing an image according to the fifth aspect of the present invention, the system for visualizing an image according to the sixth aspect of the present invention, the system for visualizing an image according to the seventh aspect of the present invention, the system for visualizing an image according to the eighth aspect of the present invention, the method for visualizing images according to the ninth aspect of the present invention, the method for visualizing images according to the ninth aspect of the present invention, the method for visualizing images according to the tenth aspect of the present invention, the unmanned aerial vehicle according to the eleventh aspect of the present invention, the method for visualizing images according to the twelfth aspect of the present invention, the method for visualizing images according to the thirteenth aspect of the present invention, the method for visualizing images according to the fourteenth aspect of the present invention, the method for visualizing images according to the fifteenth aspect of the present invention, and the method for visualizing images according to the sixteenth aspect of the present invention provide each an additional technical result of expanding the range of image visualisation means. An additional technical result is development of a versatile image visualisation means providing for scalability, possibility to form images indoors as well as in the open air, ease of transportation, possibility to automatically deploy and collapse the structure. Said advantages of the subject technical solution are not limiting. One skilled would appreciate additional advantages of the technical solution and individual embodiments thereof from the following detailed description and the accompanying drawings.

BRIEF DESCRIPTION OF DRAWINGS

The accompanying drawings which are included to provide a further understanding of the principles of the present invention constitute a part hereof and are incorporated herein to illustrate the below embodiments and aspects of the present invention. The accompanying drawings, together with the description below, serve to explain the principles of the present invention. In the drawings:

FIG. 12 is a block diagram of a first embodiment of a method for visualizing an image;

FIG. 13 is a block diagram of a second embodiment of the method for visualizing an image;

FIG. 14 is a block diagram of a third embodiment of the method for visualizing an image;

FIG. 15 is a block diagram of a fourth embodiment of the method for visualizing an image;

FIG. 16 is a block diagram of a fifth embodiment of the method for visualizing an image;

FIG. 17 is a block diagram of a sixth embodiment of the method for visualizing an image;

FIG. 18 is a block diagram of a seventh embodiment of the method for visualizing an image; and FIG. 19 is a block diagram of an eighth embodiment of the method for visualizing an image.

DETAILED DESCRIPTION

Figure 1:
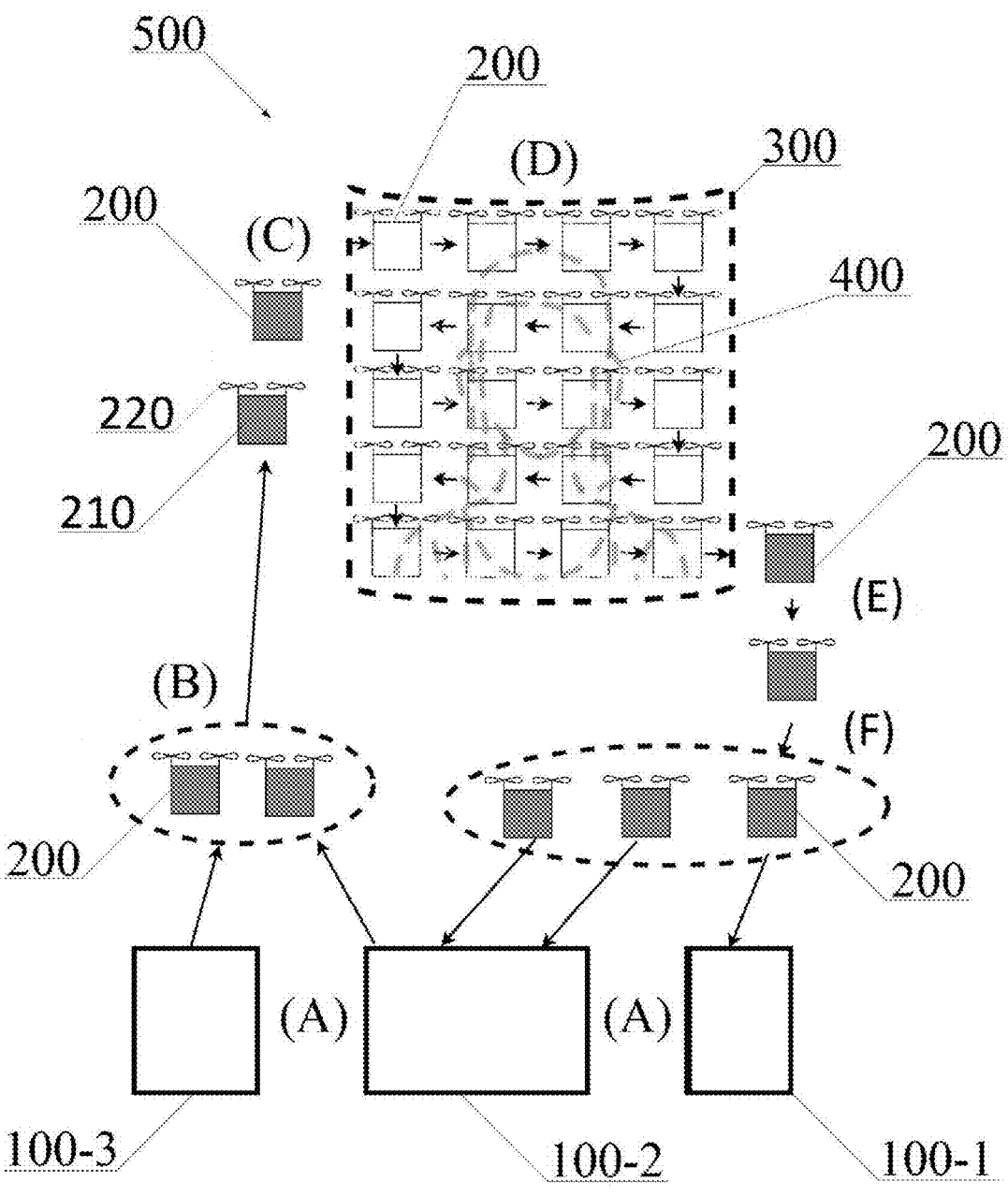
FIG. 1 is a schematic view of one of illustrative embodiments of the system for visualizing an image according to the present invention.

Hereinafter, various exemplary embodiments of the present invention are described with reference to the accompanying drawings; however, it should be understood that the description below does not define or limit the scope of the present invention.

In the following description, a detailed description of known functions and designs will be omitted as this unimportant information may obscure the concept of the present invention.

It is to be understood that in the following description the terms such as "first", "second", "upper", "lower", "lateral", "front", "rear", etc. are used solely for convenience, and they should not be interpreted as limiting terms. In particular, as used in the present invention, unless explicitly stated otherwise in the description herein, the terms "first", "second", "third" or the like are used to distinguish elements, components, parts, assemblies, modules, blocks, embodiments, or the like, to which they pertain, from one another and not meant to describe any particular relationship therebetween. Thus, for example, it should be understood that the use of the terms "first group" of unmanned aerial vehicles and "second group" of unmanned aerial vehicles is not intended to imply any particular order, type, chronology, hierarchy or ranking (for example) of/between groups of unmanned aerial vehicles in a plurality of unmanned aerial vehicles, nor is their use (by itself) intended to imply that "third group" of unmanned aerial vehicles, "fourth group" of unmanned aerial vehicles, etc. may further exist. Further, as is discussed herein in other contexts, reference to a "first group" and a "second group" does not preclude herein the two groups from being the groups of the same elements. Thus, for example, in some instances, unmanned aerial vehicles in a "first group" of unmanned aerial vehicles and in a "second group" of unmanned aerial vehicles may coincide in terms of design, while in other cases they may be different in terms of design.

References to an item in the singular should be understood to include such items in the plural, and vice versa, unless explicitly stated otherwise or clear from the context.

Grammatical conjunctions are intended to express any and all disjunctive and conjunctive combinations of conjoined clauses, sentences, words, and the like, unless otherwise stated or clear from the context. Thus, the term "or" should be understood to generally mean "and/or" and so forth.

Recitation of ranges of values herein is not intended to be limiting, referring instead individually to any and all values falling within the range, unless otherwise indicated herein, and each separate value within such a range is incorporated into the description as if it was individually recited herein.

Words "about", "approximately" or the like, when accompanying a numerical value, are to be construed as including any deviation as would be understood by one of ordinary skill in the art to operate satisfactorily for an intended purpose. Ranges of values and/or numeric values are provided herein as examples only, and do not constitute a limitation on the scope of the described embodiments.

Any and all examples provided herein, or at least a portion thereof, as well as corresponding phrases ("for example", "such as", "in particular" or the like), are used merely to facilitate understanding of the principles of the present invention and to provide for sufficient disclosure of the present invention; however, these phrases do not pose any limitations on the embodiments of the present invention, for description of which embodiments they are utilized herein, in particular they do not limit practical implementations of elements, components, parts, assemblies, modules, blocks, devices, means and/or the like utilized to disclose the principles of design and operation of the present invention. Terms and Definitions Used in the Description Herein The term "illustrative" means a non-limiting example, instance or illustration. In a similar manner, the terms "for example" and "by way of example" used herein set off lists of one or more non-limiting examples, instances or illustrations. As used herein, circuitry is "configured" to perform a function whenever the circuitry comprises the necessary hardware and code (if any is necessary) to perform the function, regardless of whether performance of the function is blocked or forbidden (for example, by an operator-configurable setting, factory trim, etc.).

As used in the present invention, the term "correspondence" and derivatives thereof (i.e. adjective, verb, adverb) does not necessarily mean exact conformity or exact equality in/to/between whatsoever in any respect but may imply a departure or deviation from said equality within specified limits. For example, the term "corresponding coordinates", unless the description herein clearly dictates otherwise, means not only that these coordinates may be exactly equal to one another or may exactly coincide with one another but also implies that said equality or coincidence of coordinates may be established with some error (for example, with the error of operation of a GPS system) or within the bounds of a predetermined geographic region surrounding an exact geographic point or region to which these coordinates belong, or an exact geographic location to which these coordinates belong.

As used in the present invention, the term "unmanned aerial vehicle" (UAV), unless the description herein clearly dictates otherwise, refers to an unmanned aircraft which is configured to fly or that is capable of moving by air in automatic mode, i.e. without involving a human or external control sources, or is capable of moving by air in semi-automatic mode, i.e. with receipt of at least a portion of control commands from a human (for example, a pilot, an operator, etc.) or an external source (for example, a control server or control device) via predetermined communication channels. Unlimited examples of UAVs are various multi-rotor UAVs, for example, multicopter drones; single-rotor UAVs, for example, unmanned helicopter; hybrid UAVs, for example, rotary wing drones, and the like.

As used in the present invention, the term "fuselage", unless the description herein clearly dictates otherwise, refers to a housing or framework of an unmanned aerial vehicle, where the type, shape, overall dimensions, design features and material of such housing are not specifically limited in any way.

As used in the present invention, the term "module", unless the description herein clearly dictates otherwise, refers to a functional element or a combination of functional elements of a device in the form of a part, node, block or other assembly unit that performs certain technical functions that provide for the functioning of the device. The module generally may be implemented in practice using a combination of known structural elements, a combination of known structural elements and known hardware, a combination of known structural elements and known software and hardware, or a combination of known hardware and known software.

Accordingly, for example, the control module may be implemented using hardware and software. As used in the present invention, the module of integrated control may be a physical device, an apparatus, or a plurality of modules implemented using hardware, for example, using an application-specific integrated circuit (ASIC) or a field-programmable gate array (FPGA), or a combination of hardware and software, for example, using a microprocessor system and a set of instructions implementing the functionality of the control module, which (when executed) transform the microprocessor system into an application-specific device or system (for example, automatic pilot system). Furthermore, each of the modules, or at least one of them, may also be implemented in the form of a combination of hardware and software, wherein some of the functionality described herein with respect to one of the modules may be implemented by means of hardware only, whereas other functionality described herein in relation to the same module or other module may be implemented by way of using hardware in combination with software.

As used in the present invention, the term "navigation command", unless the description herein clearly dictates otherwise, refers to an instruction directed to unmanned aerial vehicles being part of the system for visualizing an image. Navigation commands may be presented or provided by the flight control system of an unmanned aerial vehicle in the form of digital or analog data of instructions or control signals. Navigation commands may be generated by, without limitation, an automatic operator, an operator (whether locally or remotely situated), and/or an obstacle-avoidance system. Navigation commands may be communicated to, for example, a control module for controlling an unmanned aerial vehicle or a steering system of an unmanned aerial vehicle.

As used in the present invention, the term "manual control", unless the description herein clearly dictates otherwise, refers not only to control solely using human hands but also using human feet, fingers, voice, pupils or any suitable combination thereof. Thus, as used in the present invention, the term "manual control" refers to at least one of the following: buttons, levers, joysticks, toggle switches, pedals, touch screen, gesture control sensors, pupil-tracking scanners, microphone, etc.

As used in the present invention, the term "charging device", unless the description herein clearly dictates otherwise, refers to a device for replenishing the range of an unmanned aerial vehicle by way of recharging the battery thereof and/or by replenishing the fuel capacity thereof.

As used in the present invention, the term "database", unless the description herein clearly dictates otherwise, refers to any structured data set that does not depend on a specific structure, database management software, hardware of the computer that stores data, uses data or otherwise makes data available for use. The database may be present on the same hardware running the process that stores or uses the information stored in the database, or it may be present on separate hardware, for example, a dedicated server or on a plurality of servers.

As used in the present invention, the term "docking spot", unless the description herein clearly dictates otherwise, refers to a section of surface or a region of space in which there is performed the coupling of an unmanned aerial vehicle to a tractive coupling element.

As used in the present invention, the term "parking station", unless the description herein clearly dictates otherwise, means an unmovable or movable structure adapted to accommodate unmanned aerial vehicles, store unmanned aerial vehicles and/or replenish the range (for example, recharge) of unmanned aerial vehicles therein.

As used in the present invention, the term "control device" refers to computing equipment executing a computer program for enabling receipt of requests (for example, from other computing devices) over a communication network, execution or processing of such requests and/or transmission of such requests over a communication network (for example, to other computing devices). The computing equipment executing a computer program may be, without limitation, a single physical computer or a single physical computer system. As used in the present invention, the use of the term "control device" does not mean that each computational task (for example, received instructions or commands) or any other specific task will be received, executed, or cause performance by one and the same control device (i.e. by one and the same software and/or hardware), which means that any quantity of pieces of software or hardware may be involved in receiving/transmitting, executing, or may cause performance of any task or request, or the consequences of any task or request, where all that software and hardware may be implemented in the form of one or more control devices.

System for Visualizing Image

FIG. 1 is a schematic view of a generalized embodiment of a system 500 for visualizing an image according to the present invention on which embodiment each of the particular or alternative embodiments of the system 500 for visualizing an image described hereinafter are based. The system 500 may provide for visualisation in the air of a static image, a dynamic image, or any combination thereof. In particular, the system 500 may enable visualisation in the air, in particular in a predetermined or user-selected region of space, of a two-dimensional (2D) or three-dimensional (3D) image comprised only of static (unmovable) image elements, comprised only of dynamic (movable) image elements, or comprised of a predetermined combination of static (unmovable) image elements and dynamic (movable) image elements.

It should also be noted that the system 500 for visualizing an image shown in FIG. 1 and particular or alternative embodiments thereof described hereinafter generally have a similar or analogous structure or architecture, and therefore the similar or identical functional components being part of these systems 500 for visualizing an image are denominated in FIGS. 1 to 6 and in the text herein using the same reference numbers. For the convenience of description, all variations of the systems 500 for visualizing an image described herein with reference to FIGS. 1 to 5 are denominated in the text herein using the reference number (500).

As shown in FIG. 1, the system 500 for visualizing an image comprises three parking stations 100-1, 100-2, 100-3 which are denominated herein, for the convenience of description, with the reference number (100), and unmanned aerial vehicles 200 which are initially accommodated, stored or parked in the parking stations 100. Furthermore, the system 500 for visualizing an image is also comprised of a control device (not shown) connected via a communication network (not shown) to the parking stations 100 and to the unmanned aerial vehicles 200 in a manner to exchange data therewith and to control operation thereof.

The control device (not shown) being part of the system 500 for visualizing an image shown in FIG. 1 is configured to receive and process data from the unmanned aerial vehicles 200 and the parking stations 100, and is also configured to generate control instructions/commands or navigation instructions/commands based on said received data and results of processing thereof so as to enable presenting or direction of such generated control or navigation commands to at least one of the unmanned aerial vehicles 200 and/or to at least one of the parking stations 100, including in response to a request of said unmanned aerial vehicle 200 and/or a request of said parking station 100.

In some embodiments of the present invention, the data transfer protocols and/or technical means utilized to transfer data between the control device (not shown), unmanned aerial vehicles 200, and parking stations 100 may be at least partially different or may coincide. Furthermore, for data exchange there may be simultaneously used one or more communication protocols and corresponding technical means of communication.

In other embodiments of the present invention, for data exchange between the control device (not shown), unmanned aerial vehicles 200 and parking stations 100 in the system 500 there may be used one or more means of communication from the group of means of communication comprising: SW band radio antennas, USW radio antennas, UHF radio antennas, an optical communication module, half-duplex/simplex satellite communication module, 2G/3G/4G/LTE/5G cellular communication module, wireless network communication module or wired network communication module.

The control device (not shown) in the system 500 is a single server which may be configured in the form of, for example, the Dell PowerEdge™ server on which there may be used the Ubuntu Server or Windows Server operating system. In some embodiments of the present invention, the control device (not shown) in the system 500 may be any other suitable hardware and/or application software and/or system software, or a combination thereof. In other embodiments of the present invention, the functions of the control device (not shown) in the system 500 may be shared among multiple computing devices, for example, they may be performed using multiple connected to one another servers. Furthermore, the control device (not shown) in the system 500 may have access to at least one database via a communication network or in other manner, or may comprise at least one local database stored on a storage device of such control device.

In some embodiments of the present invention, the control device (not shown) in the system 500 may be configured to perform traffic management and provide for safety while movement of the unmanned aerial vehicles 200 by air, in particular, while presence of the unmanned aerial vehicles 200 in a predetermined region of space to which region said unmanned aerial vehicles 200 may be directed by said control device. Furthermore, the control device of the system 500 may be configured to receive and process a request for directing the unmanned aerial vehicles 200 from one or more parking stations 100 to a predetermined geographic region or a predetermined region of space and a request for disposing each of said directed unmanned aerial vehicles 200 in a predetermined spatial location in accordance with a predetermined model of arrangement of unmanned aerial vehicles 200, which model may be available to the control device of the system 500 and which model may be presented to the control device of the system 500 from an external source of data (not shown), wherein said requests may be presented each to the control device of the system 500 using, for example, a user device configured to establish communication with the control device of the system 500.

The communication network (not shown) to which the control device (not shown), parking stations 100 and unmanned aerial vehicles 200 are preferably communicatively coupled substantially allows the control device, parking stations 100 and unmanned aerial vehicles 200 to exchange between one another the system data and/or operational data which they use for implementing functions thereof or functional capabilities thereof described herein. Such communication network may be any suitable wireless communication link known in the prior art, such as a WiFi wireless technology-based communication link, 2G, 3G, 4G or 5G wireless technology-based communication link, LTE technology-based communication link, or the like.

In one of the embodiments of the present invention, the system 500 for visualizing an image may be comprised of two or more wireless communication networks implemented each similar to the above communication network (not shown) for performing exchange of data between the parking stations 100, unmanned aerial vehicles 200 and control device (not shown) in real-time mode or in real time.

In one of the embodiments of the present invention, the system 500 for visualizing an image may include at least one parking station 100 or one or more parking stations 100 (for example, one, two, three, four, five, six, seven, eight, nine, ten or more parking stations 100). It should be noted that in the case of using only one parking station 100 it must be configured to accommodate, park or store therein all the unmanned aerial vehicles 200 being part of the system 500. It should also be noted that in the case of using two or more parking stations 100, each of those parking stations must be configured to accommodate, park or store therein at least a predetermined portion of unmanned aerial vehicles of the plurality of unmanned aerial vehicles 200 being part of the system 500, wherein the quantity of unmanned aerial vehicles 200 accommodated in such parking stations 100, as well as shapes, sizes, types, specifications, etc. of such unmanned aerial vehicles 200, may be the same as well as different.

The parking stations 100 being part of the system 500 for visualizing an image shown in FIG. 1 are intended each to accommodate, store or park therein the unmanned aerial vehicles 200. It should be noted that for visualizing an image the system 500 may not use the parking stations 100 at all (in particular, it may at least partially utilize the unmanned aerial vehicles 200 present in the air at a predetermined distance from the region of space in which region it is contemplated to visualise an image, or the unmanned aerial vehicles 200 used for visualizing other images in nearby regions of space that are removed from said region of space to a distance being within a threshold value), may utilize only one parking station 100, or may utilize two or more parking stations 100 (i.e., three, four, five, six, seven, eight, nine, ten or more) which are geographically removed from one another or disposed at a distance from one another and which are present within the limits of the zone surrounding the region of space in which region it is contemplated to visualise an image. For example, the parking stations 100 may be disposed at a distance of several meters, tens of meters, hundreds of meters away from one another or several kilometers away from one another. It should be noted that the geographical disposition of the parking stations 100 must enable timely replacement of one or more unmanned aerial vehicles 200, including if or when necessary to move the image being visualised in the air in various directions and over various distances in relation to the region of space in which region said image was originally or initially visualised. For example, the parking stations 100 may be disposed every 10 m, 100 m, 500 m, 1 km or every 10 km, and so on. One skilled in the art would readily appreciate that the quantity of parking stations 100 and mutual disposition thereof may differ depending on specific geographical locations (in particular, depending on whether the region of space in which the image is contemplated to be visualised is in open air, within or beyond city limits, or the image is formed in the interior of a building, such as in a cinema hall or in a room). In particular, in large cities there may be a need for more parking stations 100 at shorter distances from one another, as opposed to small cities, areas between cities, or other possible locations beyond city limits. In order to visualise an image in the interior of a building, there may be sufficient one parking station 100 as well as multiple parking stations 100.

Any one of the parking stations 100 shown in FIG. 1 is a stationary structure provided with compartments for accommodating therein the unmanned aerial vehicles 200. In one of the embodiments of the present invention, the parking station 100 may be implemented in the form of a stand-alone structure or may be configured in the form of a housing installed on a building or in the interior of a building or other structure or other stationary object. In another embodiment of the present invention, the parking station 100 may be implemented in the form of a special housing or structure adapted to accommodate, store or park therein one or more unmanned aerial vehicles 200 and installed on a movable platform, for example, in the body of a truck, on a ferry, on an airplane, aerostat or other vehicle that enables altering of the geographic location of the parking station 100, thus allowing to quickly dispose the parking stations used as part of the system 500 in an appropriate quantity (including further to existing stationary parking stations) in close proximity to the region of space in which region it is contemplated to visualise an image. In yet another embodiment of the present invention, the parking station 100 may be a portable housing configured, for example, in the form of a backpack, suitcase or bag with wheels which housing may be moved by a person without the use of auxiliary technical means. In yet another embodiment of the present invention, the parking station 100 may be implemented in the form of a movable structure or a special vehicle whose body may be adapted to accommodate, store or park therein one or more unmanned aerial vehicles 200. The movable parking stations 100 may be moved between various geographic locations taking into account the most demanded locations for image visualisation using the unmanned aerial vehicles 200 and taking into account the needs for optimized replacements of the unmanned aerial vehicles 200 used for image visualisation. One of skill in the art would readily appreciate that some stationary or movable parking stations may be shared between two or more systems for visualizing images configured each similarly to the system 500.

It should be noted that the system 500 for visualizing an image may comprise parking stations of any type (for example, land stationary parking stations, water stationary parking stations, air stationary parking stations, land movable parking stations, water movable parking stations, air movable parking stations, and/or the like) configured each to park or temporarily store at least one unmanned aerial vehicle 200 being part of at least one system 500 or sharedly used by the system 500 and at least one other system for visualizing an image similar to the system 500.

Furthermore, each of the parking stations 100 being part of the system 500 for visualizing an image shown in FIG. 1 may be provided with a power source (not shown) which may be one or more batteries, a generator based on an internal combustion engine, a generator based on a hydrogen engine, a solar panel and any other suitable energy source known in the prior art, and may be provided with one or more charging devices (not shown) electrically connected each to said power source and enabling each connection thereto of at least one of the unmanned aerial vehicles 200 stored or parked in the parking station 100 so as to enable recharging, charging-up or replenishment of the range of said unmanned aerial vehicle 200. It should be noted that each of the charging devices (not shown) of the parking station 100 may be a wireless charging device, a wired charging device, or a charging dock. In particular, each charging device with which at least one of the parking stations 100 being part of the system 500 may be provided may be configured, for example, in the form of a device for supplying electrical energy, a device for supplying liquid or gaseous fuels, and/or etc. In one of the embodiments of the present invention, at least one of the charging devices (not shown) with which any one of the parking stations 100 being part of the system 500 may be provided may be hydraulically connected by means of a pump connected by a hydraulic line to a reservoir or container with fuel in a manner to enable intake of this fuel from said container so as to enable supply of said amount of intaken fuel to the fuel tank of an unmanned aerial vehicle 200, the fuel tank being hydraulically connected to the fuel-powered engine of the unmanned aerial vehicle 200, to replenish the range thereof (in particular, due to at least partial replenishment of fuel volume in the fuel tank of the unmanned aerial vehicle 200).

In some embodiments of the present invention, at least a portion of the unmanned aerial vehicles 200 used for visualizing an image may be part of the system 500 for visualizing an image as shown in FIG. 1, and the other portion of the unmanned aerial vehicles 200 used for visualizing an image may not be part of that system 500, wherein each of the parking stations 100 being part of the system 500 may be adapted or tailored to accommodate therein the unmanned aerial vehicles 200 with various modifications, dimensions, power plants and/or the like known in the prior art.

It should be noted that the unmanned aerial vehicles 200 being part of the system 500 for visualizing an image shown in FIG. 1 should include unmanned aerial vehicles 200 that may be present in the air in a predetermined region of space or may be directed to said region of space as well as unmanned aerial vehicles 200 accommodated in or on the parking stations 100 as well as any other unmanned aerial vehicles 200 which may be further directed (for example, as replacement or additional unmanned aerial vehicles 200) to said region of space or at least to one of said parking stations 100 from at least one other system for visualizing an image similar to the system 500, whereby one skilled in the art would readily appreciate that at least a portion of the unmanned aerial vehicles 200 being part of the system 500 may have different types, modifications, designs, dimensions, masses, power plants and/or the like.

Each of the unmanned aerial vehicles 200 shown in FIG. 1 as part of the system 500 comprises a housing, body or fuselage 210 of any suitable type, and also comprises two propulsion units 220, each of which is configured in the form of a propeller and which are disposed or installed on the fuselage 210 from the exterior side thereof, and a control module (not shown) installed in the interior of the fuselage 210 and configured to control the operation of the unmanned aerial vehicle 200, including the operation of propulsion units 220 thereof. Furthermore, each of the unmanned aerial vehicles 200 may include at least one of the following means of wireless communication: an SW band radio antenna, USW radio antenna, UHF radio antenna, optical communication module, half-duplex/simplex satellite communication module, 2G/3G/4G/LTE/5G communication cellular module, wireless network communication module between multiple unmanned aerial vehicles and/or radio repeaters, and the like.

The control module (not shown) being part of each of the unmanned aerial vehicles 200 shown in FIG. 1 is communicatively coupled by means of the above communication network (not shown) to a control device (not shown), thus allowing said control module to receive and process navigation commands and/or control commands from said control device so as to enable control of operation of said unmanned aerial vehicle 200 depending on said navigation commands and/or control commands. In particular, in response to navigation commands and/or control commands from the control device (not shown) being part of the system 500, the control module (not shown) of the unmanned aerial vehicle 200 may enable, for example, altering of speed or direction of flight of the unmanned aerial vehicle 200, direction of the unmanned aerial vehicle 200 from one of the parking stations 100 in which it was originally accommodated to a predetermined region of space, return of the unmanned aerial vehicle 200 to one of the parking stations 100 for storing and/or replenishing the range, direction of the unmanned aerial vehicle 200 from one predetermined region of space to another predetermined region of space, and/or the like. It should be noted that the regions of space in which there may be visualised an image using the unmanned aerial vehicles 200 being part of the system 500 shown in FIG. 1 may be known in advance to the control device (not shown) being part of the system 500 (for example, the coordinates of such regions of space may be pre-recorded in the memory of the control device), or may be communicated to said control device from an external source of data (for example, from database, server, user device, and the like). In particular, the region of space in which there must be visualised a predetermined image may be selected or defined by the user using input/output means (for example, buttons, on-screen buttons or on-screen keyboard on a touch screen, means of voice input, and the like) of the user device which may be configured in the form of a mobile phone, smartphone, laptop, personal computer or any other computing device suitable for such purposes known in the prior art and which may establish communication with the control device of the system 500 using the above or other communication network for transferring, to the control device of the system 500, data relating to the user-selected region of space in which there must be visualised an image, or data relating to user-entered or selected coordinates of such region of space.

The fuselage 210 of any of the unmanned aerial vehicles 200 being part of the system 500 shown in FIG. 1 may have any suitable shape and dimensions which are given in the prior art to any known unmanned aerial vehicle, and may be made of any suitable material known in the prior art and conventionally used for the manufacture of the housings of unmanned aerial vehicles (for example, of composite material). Thus, the type, shape, overall dimensions and material of the fuselage 210 in the unmanned aerial vehicle 200 are not specifically limited in any manner within the scope of the present invention. In particular, the fuselage 210 may have a shape similar to the body of a helicopter, one skilled in the art will however appreciate that the fuselage 210 may have any other shape similar to any other aircraft, for example, an airplane, shuttle, hang glider, paraglider, or any other aircraft known in the prior art. Furthermore, the fuselage 210 may have a shape similar to a bird or an insect and be an ornithopter or an entomopter.

In one of the embodiments of the present invention, the fuselage 210 of any one of the unmanned aerial vehicles 200 being part of the system 500 shown in FIG. 1 may be a framework or a bearing frame on which there is attached panelling or which may be at least partially surrounded by a shell, wherein the fuselage 210 may be further provided with a fin, wing, wings, propeller, propulsion unit, and/or the like, depending on the specific embodiment of the fuselage 210.

In another embodiment of the present invention, the fuselage 210 of any one of the unmanned aerial vehicles 200 being part of the system 500 shown in FIG. 1 may be made of metal, plastic, aggregate material (for example, composite sandwich panels), aluminum material (for example, aluminum sandwich panels), titanium material (for example, titanium sandwich panels) or any other suitable prior art material, including using any suitable combination of the above materials (for example, titanium sandwich panel with aluminum honeycomb core). The material of manufacture of the fuselage 210 in any one of the unmanned aerial vehicles 200 is not specifically limited in any manner in the present invention.

In yet another embodiment of the present invention, the fuselage 210 of any one of the unmanned aerial vehicles 200 being part of the system 500 shown in FIG. 1 may be an exoskeleton or other load-carrying structure that may be attached to a user or a pilot of said unmanned aerial vehicle 200 or may be put on on same.

In some embodiments of the present invention, the fuselage 210 of any one of the unmanned aerial vehicles 200 being part of the system 500 shown in FIG. 1 may be further provided with a landing gear which is substantially a supports system which may be necessary at least for accommodation of said unmanned aerial vehicle 200 in one of the parking stations 100, or is at least one support with which the fuselage 210 is provided. In particular, the landing gear of the unmanned aerial vehicle 200 may be of a skid type, a wheel type, a float type, or any other type known in the prior art. The type, shape, overall dimensions and material of the landing gear of the unmanned aerial vehicle 200 are not specifically limited in any manner within the scope of the present invention.

It should be noted that the landing gear of the unmanned aerial vehicle 200, depending on the specific embodiment thereof, may at least provide for (i) bearing of static loading from its own weight while parking of the unmanned aerial vehicle 200 in one of the parking systems 100, and (ii) shock absorption of dynamic loads arising while landing of the unmanned aerial vehicle 200 (including emergency landing) in one of the parking systems 100.

In one of the embodiments of the present invention, the unmanned aerial vehicles 200 in the system 500 for visualizing an image may not be provided with a landing gear at all. In one of the variations of such embodiment of the present invention, the bottom of the fuselage 210 in any one of the unmanned aerial vehicles 200 being part of the system 500 shown in FIG. 1 may be provided with a shock-absorbing pad (not shown) made of an elastic material (for example, rubber), which shock-absorbing pad may be attached to said bottom from the external side thereof, or with any other suitable support known in the prior art and used for unmanned aerial vehicles (in particular, for drones) in the prior art.

In another embodiment of the present invention, the fuselage 210 in any one of the unmanned aerial vehicles 200 being part of the system 500 for visualizing an image shown in FIG. 1 may be further provided with at least one wing (not shown) which may be configured integral to the fuselage 210, may be attached to the fuselage 210 from the exterior side thereof or at least partially embedded or integrated into the fuselage 210, wherein said wing may initially be in a folded or retracted state (initial position) and may be configured to deploy into an unfolded or extended state (operational position), respectively, under control of the above-described control device (not shown) being part of the system 500. It should be noted that the quantity of wings with which the fuselage 210 may be provided may be selected taking into account the mass-dimensional characteristics and structural features of the fuselage 210 to create additional lift in flight and reduce the load on the unmanned aerial vehicles 200 while movement thereof by air. It should also be noted that at least one of the wings with which the fuselage 210 in any one of the unmanned aerial vehicles 200 being part of the system 500 may be provided may be configured folding, telescopic, extendable, etc. to reduce the overall dimensions of said unmanned aerial vehicle 200 in the parking position in which it is present while being accommodated in one of the parking stations 100, wherein the deployment of said wing may be performed under control of the above control device (not shown) being part of the system 500 while takeoff of that unmanned aerial vehicle 200 from a parking station 100 in which it was accommodated.

In another embodiment of the present invention, the fuselage 210 in any one of the unmanned aerial vehicles 200 being part of the system 500 for visualizing an image shown in FIG. 1 may be further provided with wings to create additional lift in flight and at least one aircraft engine (not shown), and preferably two aircraft engines, to enable the movement of the unmanned aerial vehicle 200 by air (including in an emergency, for example, in the event of damage, failure and/or discharge of the unmanned aerial vehicle 200 used for visualizing an image) or increase the speed of movement of the unmanned aerial vehicle 200 by air (i.e. enabling the operation of aircraft engines further to the propulsion units 220 used to move the unmanned aerial vehicle 200 by air in a standard situation, or instead of same). It should be noted that each such aircraft engine may be, for example, a propeller engine, jet engine, combined aircraft engine or any other suitable aircraft engine known in the prior art. It should also be noted that in case of using two aircraft engines in the unmanned aerial vehicle 200 the designs and/or types thereof may coincide or be different from one another. Each such aircraft engine, with which the fuselage 210 may be further provided, may operate under control of the below-described control module (not shown) which may present control commands to the engine control driver so as to enable starting, stopping or altering of the operating mode of said aircraft engine (changing the operating parameters of the aircraft engine).

In some other embodiment of the present invention, the fuselage 210 in any one of the unmanned aerial vehicles 200 being part of the system 500 for visualizing an image shown in FIG. 1 may be further provided with at least one additional lift rotor (not shown) or rotor propulsion unit of any suitable type known in the prior art to enable the movement of the unmanned aerial vehicle 200 by air (including in an emergency, for example, in the event of damage, failure and/or complete discharge of the unmanned aerial vehicle 200 used for image visualisation) or increase the speed of movement of the unmanned aerial vehicle 200 by air (i.e. enabling the operation of the lift rotor or rotor propulsion unit further to the propulsion units 220 used to move the unmanned aerial vehicle 200 by air in a standard situation, or instead of same). Furthermore, in the given embodiment of the present invention, the fuselage 210 in the unmanned aerial vehicle 200 may further comprise a power plant (not shown) which may be defined, for example, by one or two turboshaft engines and which may be operably connected to each of the lift rotors of the unmanned aerial vehicle 200 so as to enable supply of power to said lift rotors for actuating same. Each such power plant of the unmanned aerial vehicle 200 operably connected to the lift rotors with which the fuselage 210 may be further provided in a manner to provide for transfer of driving force thereto may be operated under control of the below-described control module (not shown) which may present control commands to the power plant control driver so as to enable starting, stopping or altering of the operating mode of said power plant (altering of the operating parameters of the power plant) so as to enable altering of the state of those lift rotors.

In other embodiments of the present invention, the fuselage 210 in any one of the unmanned aerial vehicles 200 being part of the system 500 for visualizing an image shown in FIG. 1 may be further provided with measurement sensors (not shown) for measuring the flight parameters of the unmanned aerial vehicle 200, and the below-described control module (not shown) of the unmanned aerial vehicle 200 may be communicatively coupled to said measurement sensors and to the control device of the system 500 so as to enable presenting in real time of said measured flight parameters of the unmanned aerial vehicle 200 to said control device, and may be further configured to receive navigation commands from the control device of the system 500 generated by the control device of the system 500 in response to said measured flight parameters of the unmanned aerial vehicle 200. In response to navigation commands received by the control module (not shown) of the unmanned aerial vehicle 200 from the control device of the system 500, said control module generates and presents its own control commands providing for altering of the operation parameters of said unmanned aerial vehicle 200. In particular, in the given embodiment of the present invention, the control device of the system 500 may be further configured to present navigation commands to each of the unmanned aerial vehicles 200 being part of the system 500 shown in FIG. 1 to alter the course of movement and/or mode of operation thereof in the event that at least one of flight parameters thereof measured using the above measurement sensors does not correspond to a threshold value or is beyond the range of threshold values. It should be noted that the measurement sensors for measuring the flight parameters of the unmanned aerial vehicle 200 may be, for example, barometric altimeters, airspeed and Mach indicators, variometers, pitot tubes, central air data systems, pressure gauges, tachometers, thermometers, propulsion unit control systems, artificial horizons, heading instruments, and angle of attack/overload warning systems.

In other embodiments of the present invention, the fuselage 210 in any one of the unmanned aerial vehicles 200 being part of the system 500 for visualizing an image shown in FIG. 1 may be further provided with measurement sensors for measuring the parameters of state of said fuselage 210, and the below-described control module (not shown) of said unmanned aerial vehicle 200 may be communicatively coupled to said measurement sensors and to the control device of the system 500 so as to enable presenting in real time of said measured parameters of state of the fuselage 210 of the unmanned aerial vehicle 200 to said control device, and may be further configured to receive navigation commands from the control device of the system 500 generated by the control device of the system 500 in response to said measured parameters of state of the fuselage 210 of the unmanned aerial vehicle 200. In response to navigation commands received by the control module (not shown) of the unmanned aerial vehicle 200 from the control device of the system 500, said control module is configured to generate and present its own control commands enabling the replacement of said unmanned aerial vehicle 200 with other unmanned aerial vehicle from unmanned aerial vehicles 200 being part of the system 500 and accommodated in the corresponding parking stations 100. In particular, in the given embodiment of the present invention, the control device of the system 500 may be further configured to present navigation commands to each of the unmanned aerial vehicles 200 whose at least one of the parameters of state of the fuselage 210 does not correspond to a threshold value or is beyond the range of threshold values, and to present navigation commands to other unmanned aerial vehicle accommodated in one of the parking stations 100 being part of the system 100 so as to enable direction thereof from said parking station 100 to a spatial region in which there is present said unmanned aerial vehicle 200 to be replaced for performing replacement of the unmanned aerial vehicle 200 to be replaced with said other unmanned aerial vehicle 200. It should be noted that the sensors for measuring the parameters of state of the fuselage 210 of the unmanned aerial vehicle may be, for example, vibration sensors, force-sensing resistors, force sensors, and the like.

In some other embodiments of the present invention, the fuselage 210 in any one of the unmanned aerial vehicles 200 being part of the system 500 for visualizing an image shown in FIG. 1 may be further provided with measurement sensors for measuring the parameters of state of the structure of said unmanned aerial vehicle 200, and the below-described control module (not shown) of said unmanned aerial vehicle 200 may be communicatively coupled to said measurement sensors and to the control device of the system 500 so as to enable presenting in real time of said measured parameters of state of the structure of the unmanned aerial vehicle 200 to said control device, and may be further configured to receive navigation commands from the control device of the system 500 generated by the control device of the system 500 in response to said measured parameters of state of the structure of the unmanned aerial vehicle 200. In response to navigation commands received by the control module (not shown) of the unmanned aerial vehicle 200 from the control device of the system 500, said control module is configured to generate and present its own control commands enabling the replacement of said unmanned aerial vehicle 200 with other unmanned aerial vehicle from unmanned aerial vehicles 200 being part of the system 500 and accommodated in the corresponding parking stations 100. In particular, in the given embodiment of the present invention, the control device of the system 500 may be further configured to present navigation commands to each of the unmanned aerial vehicles 200 whose at least one of the parameters of state of the structure does not correspond to a threshold value or is beyond the range of threshold values, and to present navigation commands to other unmanned aerial vehicle accommodated in one of the parking stations 100 being part of the system 100 so as to enable direction thereof from said parking station 100 to a spatial region in which there is present said unmanned aerial vehicle 200 to be replaced for performing replacement of the unmanned aerial vehicle 200 to be replaced with said other unmanned aerial vehicle 200. It should be noted that the sensors for measuring the parameters of state of the structure of an unmanned aerial vehicle may be, for example, vibration sensors, force-sensing resistors, force sensors, and the like.

In some embodiments of the present invention, the fuselage 210 in any one of the unmanned aerial vehicles 200 being part of the system 500 for visualizing an image shown in FIG. 1 may be a framework (i.e. a skeleton of secured between one another load-bearing structural elements which is not provided with neither a roof, nor walls, nor floor) on which there are mounted or installed at least the below-described control module (not shown) of the unmanned aerial vehicle 200, propulsion units 220 and/or the like.

The control module (not shown) being part of each of the unmanned aerial vehicles 200 shown in FIG. 1 may be a combination of hardware and software that enable performance of predetermined functional capabilities described herein. In particular, the control module (not shown) of the unmanned aerial vehicle 200 may be a processor device or computing device configured to access control program instructions so as to enable execution thereof for implementing the relevant functional capabilities described herein.

Furthermore, the control module (not shown) in each of the unmanned aerial vehicles 200 being part of the system 500 for visualizing an image may be configured to access control program instructions so as to enable execution thereof for performing one of the following operations: (i) controlling the operation of the unmanned aerial vehicle 200 in a fully automatic mode (autopilot), (ii) controlling the operation of the unmanned aerial vehicle 200 in a semi-automatic mode comprising receiving at least a portion of the control commands from an operator who may be present in a remote control center (for example, in a mobile flight control center or stationary flight control center) and who may input said control commands by means of at least one of command input devices being part of the control elements in said control center, or (iii) controlling the operation of the unmanned aerial vehicle 200 in automatic mode with receipt of at least a portion of the control commands from an external source of control (for example, from a control device being part of the system 500, one of parking stations 100, a control device being part of other image visualisation system similar to the system 500, a satellite, a control tower, and/or the like) via a wireless data transfer channel established between said control module of the unmanned aerial vehicle 200 and said external source of control.

Any one of the unmanned aerial vehicles 200 being part of the system 500 for visualizing an image shown in FIG. 1 may be directed or moved by air, by means of the control module (not shown) of that unmanned aerial vehicle 200, from one of the parking stations 100 to a specific geographic region or a predetermined region of space in automatic mode (autopilot without operator intervention) in response to control commands or navigation commands of said control module or one of the above external sources of control (for example, the control device being part of the system 500), as well as in semi-automatic mode (autopilot with operator intervention) in response to operator control commands input by said operator using the above control elements present in a remote control center (not shown). In other words, an instance is possible where a decision relating to directing or moving by air each of the unmanned aerial vehicles 200 being part of the system 500 individually to a particular geographic region or a predetermined region of space may be made by the operator of that unmanned aerial vehicle 200 who may present, by means of the above control elements, to the control module of the unmanned aerial vehicle 200 the corresponding control command formed by the operator using said control elements by way of selecting one of the predetermined regions of space available for visualizing therein a predetermined image, or by way of setting the coordinates of said region of space, wherein said region of space may be present in the proximity of one or more of the parking stations 100 being part of the system 500.

It should be noted that the flight control of each of the unmanned aerial vehicles 200 being part of the system 500 may be performed, for example, using standard software and hardware used in the prior art to control unmanned aerial vehicles that are similar to the unmanned aerial vehicles 200 and supplied together with such unmanned aerial vehicles 200. In particular, the unmanned aerial vehicles 200 may be commercially available unmanned aerial vehicles 200 of any type and any modification provided with a built-in autopilot function and/or a built-in remote manual, or automatic, control function.

The control module (not shown) in any of the unmanned aerial vehicles 200 being part of the system 500 for visualizing an image may comprise one or more data transfer interfaces for transmitting and/or receiving signals/commands/requests/instructions. It should be noted that the data transfer interfaces, databases and other hardware may either be part of said control module, or may be implemented in the form of distinct modules or blocks communicatively coupled to said control module.

In the present invention, the control module (not shown) in each of the unmanned aerial vehicles 200 being part of the system 500 for visualizing an image shown in FIG. 1 may be communicatively connected via a communication network (not shown) to an external source of control in the form of the above control device being part of the system 500. In particular, the control module (not shown) in each of the unmanned aerial vehicles 200 is pre-programmed to communicate with the control device (not shown) being part of the system 500 for obtaining or receiving therefrom control or navigation commands and is pre-programmed to execute said received navigation or control commands for providing for proper functioning of said unmanned aerial vehicle 200 in accordance with the task at hand, in particular, for altering the operating parameters of such unmanned aerial vehicle 200, altering the direction of flight (movement by air) of such unmanned aerial vehicle 200, altering or displacing the spatial location of such unmanned aerial vehicle 200, and/or the like.

In particular, the control module of each of the unmanned aerial vehicles 200 may comprise a processor configured to execute computer-readable control commands or navigation commands in an automatic mode or at least partially based on commands received from an operator or other external source of control via at least one wireless communication channel.

Thus, in the present invention, the control device (not shown) which is part of the system 500 and which is communicatively coupled to the unmanned aerial vehicles 200 being part of the system 500 is substantially configured to direct all unmanned aerial vehicles 200 or at least a portion thereof from at least one parking station of the parking stations 100 being part of the system 500 to a region of space limited or defined by specific geographical coordinates so as to enable accommodation of each of said directed unmanned aerial vehicles 200 in a predetermined spatial location in accordance with a predetermined model of arrangement of the unmanned aerial vehicles 200 in the air.

The model of arrangement of the unmanned aerial vehicles which model is used to arrange the unmanned aerial vehicles 200 in a predetermined region of space to which those unmanned aerial vehicles 200 are directed may be brought into accordance with a predetermined region of space, in particular, it may be set automatically depending on a predetermined or user-selected region of space in which it is desired to visualise an image. Alternatively, the model of arrangement of the unmanned aerial vehicles 200 may be selected or defined by the user separately from the region of space in which it is desired to visualise an image using, for example, the above user device. It should also be noted that each of the spatial locations corresponding to a specific model of arrangement of unmanned aerial vehicles has predetermined geographic coordinates, a predetermined distance from the surface of the ground, water or other terrain object, and also has other parameters further characterizing said spatial location (for example, a predetermined displacement with respect to all contiguous spatial locations in which the remaining unmanned aerial vehicles 200 must be disposed in accordance with a specific model of arrangement of unmanned aerial vehicles 200).

The model of arrangement of unmanned aerial vehicles comprises at least data relating to the types and/or specifications of unmanned aerial vehicles 200 which may be used for implementing same, data relating to the shape, size and/or geometry of a two-dimensional (2D) or three-dimensional (3D) object which may be formed in the air while appropriate disposition of unmanned aerial vehicles 200 and which is contemplated to be used for visualizing an image in one fashion or another (see the description hereinafter), data relating to the mutual disposition of unmanned aerial vehicles 200 in a predetermined region of space while forming a two-dimensional or three-dimensional object in the air in accordance with said model of arrangement of unmanned aerial vehicles, data relating to the spatial locations to be occupied by the unmanned aerial vehicles 200 to form a two-dimensional or three-dimensional object in the air, data relating to the mutual disposition of unmanned aerial vehicles 200 as part of a two-dimensional or three-dimensional object to be formed in the air, data relating to the features of terrain in which a two-dimensional or three-dimensional object may be formed in the air in accordance with said model of arrangement of unmanned aerial vehicles, data relating to free space required to form the two-dimensional or three-dimensional object in the air in accordance with said model of arrangement of unmanned aerial vehicles, and/or the like.

Furthermore, the model of arrangement of unmanned aerial vehicles may contemplate continuous or periodic movement of the two-dimensional or three-dimensional object formed in the air using the unmanned aerial vehicles 200 with respect to the region of space in which said object was originally formed. Furthermore, the model of arrangement of unmanned aerial vehicles may contemplate continuous or periodic movement of at least one portion or more portions of the two-dimensional or three-dimensional object formed in the air using the unmanned aerial vehicles 200 in the region of space in which said object was originally formed.

Furthermore, the control module (not shown) in each of the unmanned aerial vehicles 200 being part of the system 500 for visualizing an image shown in FIG. 1 may have access to one or more local or remote databases (not shown), measurement devices or sensors (not shown) installed on the exterior and interior of the fuselage 210 and/or to on-board monitoring and control systems of said unmanned aerial vehicle 200.

To the control module (not shown) in each of the unmanned aerial vehicles 200 being part of the image visualisation system 500 shown in FIG. 1 there may be originally communicated at least the following data used by that control module while performing the functions thereof: (a) the geographic coordinates of each of regions of space in which regions images may be visualised; (b) images which may be visualised using the unmanned aerial vehicles 200 being part of the system 500; and (c) models of arrangement of unmanned aerial vehicles, each of which models is brought into accordance with one of the images being visualised and each of which models provides for disposition of unmanned aerial vehicles 200 at predetermined spatial locations with respect to one another. It should be noted that the above data may be communicated to the control module of an unmanned aerial vehicle 200 by way of inputting same manually by the operator so as to provide for recording same into the local database of an unmanned aerial vehicle 200 by way of transferring same in the form of a data packet from an external source of control (for example, from a control device being part of the system 500) via a wireless data transfer channel established between the control module of an unmanned aerial vehicle 200 and that external source of control, or may be received by the communication module of an unmanned aerial vehicle 200 from a remote data store (for example, from a website, database, data server, etc.), to which the communication module may have access, in response to a request received from the communication module of an unmanned aerial vehicle 200, or the like.

While forming the two-dimensional (2D) or three-dimensional (3D) object using the unmanned aerial vehicles 200 directed by the control device (not shown) being part of the system 500 so as to provide for appropriate disposition thereof in a predetermined spatial region in accordance with a predetermined model of arrangement of unmanned aerial vehicles, each of the unmanned aerial vehicles 200, in response to navigation commands from said control device (not shown), may enter into detachable interaction with at least one other unmanned aerial vehicle of the unmanned aerial vehicles 200 used for forming said object. Thus, the unmanned aerial vehicles 200 must be provided each with multiple means of interaction or at least one means of interaction to enable detachable interaction with one another while forming a desired two-dimensional or three-dimensional object in the air.

Alternatively, while forming the two-dimensional (2D) or three-dimensional (3D) object using the unmanned aerial vehicles 200 directed by the control device (not shown) being part of the system 500 so as to provide for appropriate disposition thereof in a predetermined spatial region, in accordance with a predetermined model of arrangement of unmanned aerial vehicles, each of the unmanned aerial vehicles 200, in response to navigation commands from said control device (not shown), may occupy and maintain for a predetermined period of time a strictly defined spatial position in which that unmanned aerial vehicle 200 does not physically interact with any one of the rest of the unmanned aerial vehicles 200 used for forming said object in the air. In such alternative embodiment of the present invention, the unmanned aerial vehicles 200 may further comprise at least an obstacle detection sensor (for example, LIDAR, ultrasonic sensor, IR sensor, radar, video sensor, and the like), a positioning sensor (for example, gyroscope sensor, GPS, GLONASS, radar, and the like) and/or other similar sensors for preventing collisions of such unmanned aerial vehicles 200 in the air in the course of forming the desired two-dimensional or three-dimensional object which is contemplated to be used for image visualisation, and in the course of presence of these unmanned aerial vehicles 200 as part of an object formed in the air.

Non-limiting examples of means for providing for detachable interaction of the unmanned aerial vehicles 200 between one another while forming a two-dimensional or three-dimensional object (for example, the below-described aggregate display 300) which is contemplated to be used for visualizing an image are the following connecting elements with which the fuselage 220 of each of the unmanned aerial vehicles 200 must be provided in the corresponding docking spots: various suitable mechanical connecting or fastening means (brackets, grips, fasteners, mounting slots, cams, hooks, latches, tongue-and-groove joints, and the like), electromechanical means under control of the control module (for example, electromechanical means of docking for docking by a mating element to be docked, electromechanical means of gripping for gripping a mating element to be gripped, or the like), electromagnetic means under control of the control module, magnetic means, vacuum grips under control of the control module, and/or the like. It should be noted that if a first unmanned aerial vehicle 200 is provided with any connecting element of the above mechanical connecting or fastening means, electromechanical means, electromagnetic means, magnetic means, and vacuum grips, then a second unmanned aerial vehicle 200, in order to detachably interact with the first unmanned aerial vehicle 200, must be provided with an appropriate type of mating connecting element enabling formation of a detachable connection with the connecting element of the first unmanned aerial vehicle 200.

In one of the embodiments of the present invention, the means for providing for detachable interaction of the unmanned aerial vehicles 200 between one another while forming a two-dimensional or three-dimensional object (for example, the below-described aggregate display 300) may be configured in the form of the above-described connecting or fastening means, wherein the fastening means in each of the unmanned aerial vehicles 200 may be configured to deploy, unfold or expand so as to enable mutual detachable connection of said unmanned aerial vehicles 200. In one of the variations of the given embodiment of the present invention, the fastening means in the unmanned aerial vehicles 200 being part of the system 500 may be configured to extend from the corresponding fuselages 210 of those unmanned aerial vehicles 200 for providing for mutual detachable connection of said unmanned aerial vehicles 200.

In some embodiments of the present invention, the system 500 for visualizing an image may further comprise an aerial lattice structure (not shown) configured to accommodate thereon the unmanned aerial vehicles 200 directed by the control device to a given region of space so as to provide for formation of a two-dimensional or three-dimensional object (for example, the below-described aggregate display 300). Thus, in the given embodiment of the present invention, the aerial lattice structure may be the basis of a two-dimensional or three-dimensional object (for example, the below-described aggregate display 300) formed from unmanned aerial vehicles 200. In one of the variations of the given embodiment, the lattice aerial structure of the system 500 may be provided with landing platforms configured to accommodate thereon the unmanned aerial vehicles 200 directed by the control device of the system 500 to a predetermined spatial region while forming a predetermined two-dimensional or three-dimensional object (for example, the below-described aggregate display 300). In another variation of the given embodiment of the present invention, the lattice aerial structure of the system 500 may be provided with fastening means configured to interact with the unmanned aerial vehicles 200 directed by the control device of the system 500 to a predetermined spatial region while forming a predetermined two-dimensional or three-dimensional object (for example, the below-described aggregate display 300). In yet another variation of the given embodiment of the present invention, each of the unmanned aerial vehicles 200 directed by the control device of the system 500 to a predetermined spatial region for forming a two-dimensional or three-dimensional object (for example, the below-described aggregate display 300) may be provided with fastening means configured to interact with the lattice aerial structure of the system while forming said two-dimensional or three-dimensional object.

Furthermore, the fuselage 210 in each of the unmanned aerial vehicles 200 being part of the system 500 shown in FIG. 1 is provided with one or more on-board power sources (not shown), each of which may be one or more batteries and which may be installed on or in the interior of the fuselage 210. It should be noted that the propulsion units 220 in each of the unmanned aerial vehicles 200 being part of the system 500 shown in FIG. 1 are electrically connected to the power source (not shown) for actuation thereof so as to enable movement of the unmanned aerial vehicle 200 by air.

In one of the embodiments of the present invention, the fuselage 210 in each of the unmanned aerial vehicles 200 being part of the system 500 shown in FIG. 1 may comprise two or more distinct or electrically coupled to one another on-board power sources, each of which comprises one or more batteries. In another embodiment of the present invention, each power source (not shown) may be at least one of a group comprising: a generator based on an internal combustion engine, a generator based on a hydrogen engine, a solar panel and any other suitable energy source known in the prior art and disposed on or in the interior of the fuselage 210. In yet another embodiment of the present invention, the power source (not shown) may be configured to connect to an external power source (not shown), for example, to an electrical network.

Thus, while accommodating any of the discharged unmanned aerial vehicles 200 being part of the system 500 for visualizing an image shown in FIG. 1 in one of the parking stations 100 being part of the system 500, the power source of said unmanned aerial vehicle 200 may be connected to the power source of said parking station 100 using a charging device (not shown) of that parking station 100, the charging device being electrically connected to said power source of the parking station 100, so as to provide for charging or replenishment of the range of said unmanned aerial vehicle 200.

In other words, the control device of the system 500 may be further configured to direct each discharged unmanned aerial vehicle of the unmanned aerial vehicles 200 used for visualizing an image to one of the parking stations 100 so as to enable connection thereof to one of the charging devices with which said parking station 100 may be provided, for replenishment of the range of the discharged unmanned aerial vehicle. Furthermore, while unforming the two-dimensional or three-dimensional object the control device of the system 500 may also be further configured to direct each unmanned aerial vehicle 200 which was used for forming said two-dimensional or three-dimensional object in the air to one of the parking stations 100 so as to enable connection thereof to one of the charging devices with which said parking station 100 may be provided while accommodating the directed unmanned aerial vehicle 100 in or on said parking station 100, thus allowing to replenish the range of said unmanned aerial vehicle 200. Furthermore, the control device of the system 500 may be further configured to present navigation commands to the unmanned aerial vehicles 200 having been used for forming the two-dimensional or three-dimensional object in the air upon expiration of a predetermined period of time so as to enable direction of said unmanned aerial vehicles 200 to the corresponding parking stations 100, including for replenishment of the range thereof in the above-described manner.

It should be noted that any one of the power sources in any one of the unmanned aerial vehicles 200 being part of the system 500 shown in FIG. 1 may be used not only for supplying power energy to the propulsion units 220 of said unmanned aerial vehicle 200 for movement thereof by air but also for supplying power to the control module (not shown) of that unmanned aerial vehicle 200, to various sensors and measurement devices used in that unmanned aerial vehicle 200 and described herein and to other movable and/or electronic components used in the unmanned aerial vehicle 200 and described herein; one skilled in the art would however readily appreciate that said components may as well have each its own power source installed each in the interior of the housing of the corresponding component.

In one of the embodiments of the present invention, at least one of the parking stations 100 being part of the system 500 for visualizing an image may be provided with a charging device configured, for example, in the form of a device for supplying electrical energy, a device for supplying liquid or gaseous fuels and/or a similar device for replenishing the range of the unmanned aerial vehicle 200, and the unmanned aerial vehicles 200 being part of the system 500 may be configured to be serially or parallelly operably connected to one another (for example, electrically and/or via a fuel supply line) while being accommodated in or on said parking station so as to enable connection thereof to said charging device (not shown) for substantially simultaneous charging thereof (for example, charging or charging-up of batteries in such unmanned aerial vehicles 200) and/or substantially simultaneous replenishment of the range thereof (for example, charging of batteries and/or refilling of fuel tanks with fuel in such unmanned aerial vehicles 200).

Furthermore, each of the unmanned aerial vehicles 200 being part of the system 500 may further comprise at least one of the following sensors: an obstacle detection sensor (LiDAR, ultrasonic sensor, IR sensor, radar, video sensor, and the like), a positioning sensor (gyroscope sensor, GPS, GLONASS, radar, and the like), and other suitable sensors known in the prior art, wherein each of said sensors may be configured to present readings thereof in real time to the control module (not shown) of said unmanned aerial vehicle 200 or to the control device (not shown) being part of the system 500. Furthermore, each of the unmanned aerial vehicles 200 being part of the system 500 may further comprise a battery charge level sensor configured to measure the battery charge capacity of the unmanned aerial vehicle 200 and to present in real time said battery charge capacity to the control module (not shown) of said unmanned aerial vehicle 200 or the control device (not shown) being part of the system 500.

In another embodiment of the present invention, each of the unmanned aerial vehicles 200 being part of the system 500 may be provided with at least one power source and may be further configured to present in real time the data relating to the range to the control device of the system 500 or to the control module of said unmanned aerial vehicle 200, and said control module or said control device may be further configured to receive data in real time relating to the battery charge level from each of the unmanned aerial vehicles 200 so as to enable replacement of at least one of said unmanned aerial vehicles 200 with at least one of the unmanned aerial vehicles 200 accommodated in the parking stations 100 in the event that the charge capacity of each unmanned aerial vehicle 200 to be replaced is below a predetermined threshold value.

In one of the embodiments of the present invention, the control module (not shown) in each of the unmanned aerial vehicles 200 used for forming a two-dimensional or three-dimensional object which is contemplated to be used for visualizing an image may be configured to receive data relating to the range of said unmanned aerial vehicle 200 and may enable withdrawal of said unmanned aerial vehicle 200 from interaction with at least one other unmanned aerial vehicle 200 used for forming the two-dimensional or three-dimensional object in the event that the range of said unmanned aerial vehicle 200 is below a predetermined threshold value (i.e. the battery of the unmanned aerial vehicle 200 is completely discharged or has an insufficient charge level that is less than a predetermined threshold value, and/or in the fuel tank of the unmanned aerial vehicle 200 there is no fuel or there is an insufficient fuel level that is less than a predetermined threshold value), so as to enable direction thereof to one of the parking stations 100 corresponding to a predetermined spatial region in which said two-dimensional or three-dimensional object was formed.

It should be noted that in the given embodiment of the present invention, while accommodation on or in the parking station 100 the power source (not shown) of the discharged unmanned aerial vehicle 200 may be electrically connected to the charging device with which said parking station 100 may be provided for replenishment of the range of that unmanned aerial vehicle 200, for example, by way of replenishment of the battery charge of the unmanned aerial vehicle 200, replenishment of fuel in the fuel tank of the unmanned aerial vehicle 200, replenishment of a working medium (liquid, solid or gaseous working medium) used in the generator of the unmanned aerial vehicle 200 operating using said working medium, and/or the like.

It should also be noted that in the given embodiment of the present invention, the control module (not shown) of the discharged unmanned aerial vehicle 200 may be further configured to present a request to the control device (not shown) being part of the system 500 for recharging or replenishment of the range of said discharged unmanned aerial vehicle 200. The control device of the system 500, in turn, in response to the request for recharging or replenishment of the range of the discharged unmanned aerial vehicle 200, the request being received from the control module (not shown) of said discharged unmanned aerial vehicle 200, may be further configured to present a request to the parking stations 100 being part of the system 500 for identifying a free charging device, and each of the parking stations 100 being part of the system 500 may be configured to present data relating to the free charging devices to the control device of the system 500 in response to said request for identifying a free charging device. In response to data relating to the free charging devices from the parking stations 100 being part of the system 500 the control device of the system 500 may be further configured to present control instructions to the control module of the discharged unmanned aerial vehicle 200 so as to enable direction of said discharged unmanned aerial vehicle 200 (requiring recharging or replenishment of the range) under control of the control module of the unmanned aerial vehicle 200 or the control device of the system 500 to one of the identified free charging devices (not shown) while accommodation of the discharged unmanned aerial vehicle 200 in the parking station 100 with said free charging device.

In one of the embodiments of the present invention, the fuselage 220 in each of the unmanned aerial vehicles 200 being part of the system shown in FIG. 1 may be further provided with a location determination module (for example, a GPS system, a GLONASS system, a Beidou system, or any other suitable location determination system known in the prior art) configured to determine the spatial coordinates of said unmanned aerial vehicle 200 in real time, and may be configured to present certain spatial coordinates to the control device of the system 500 in real time, and the control device of the system 500, in turn, may be further configured to present navigation commands to the unmanned aerial vehicles 200 in real time for altering the course of movement thereof in the event that it is determined, based on the spatial coordinates thereof, that the distance therebetween is less than a predetermined threshold value, thus preventing or eliminating the possibility of collision of unmanned aerial vehicles 200 with one another while direction thereof to a predetermined region of space, while disposition thereof in the corresponding spatial locations in said spatial region in accordance with a specific model of arrangement of the unmanned aerial vehicles 200 and/or while return thereof from said spatial region to the corresponding parking stations 100.

In another embodiment of the present invention, the fuselage 220 in each of the unmanned aerial vehicles 200 being part of the system 500 shown in FIG. 1 may be further provided with a detection device (not shown) configured to identify or detect in the operating area at least one other unmanned aerial vehicle of the unmanned aerial vehicles 200 used in a predetermined spatial region for forming a desired two-dimensional or three-dimensional object which is contemplated to be used in the future for image visualisation by one of the methods described herein, and to determine the distance to each of said detected unmanned aerial vehicles 200. In such embodiment of the present invention, the detection device (not shown) may be further connected to the control module (not shown) of the unmanned aerial vehicle 200 so as to present thereto data relating to the detected unmanned aerial vehicles occurred in the operating area of the detection device, and data relating to distances from the detected unmanned aerial vehicles 200 to said unmanned aerial vehicle 200, and the control module, in turn, may be further configured to alter the spatial location, the course of movement and/or the mode of operation of said unmanned aerial vehicle 200 in the event that the distance to at least one of the detected unmanned aerial vehicles 200 is less than a predetermined threshold value. Alternatively, in the present embodiment, the control module (not shown) of the unmanned aerial vehicle 200 may be configured to present data relating to detected unmanned aerial vehicles occurred in the operating area of the detection device and data relating to the distances between the detected unmanned aerial vehicles 200 and said unmanned aerial vehicle 200 to the control device of the system 500, and said control device, in turn, may be further configured to alter the spatial location, the course of movement and/or the mode of operation of said unmanned aerial vehicle 200 in the event that the distance to at least one of the detected unmanned aerial vehicles 200 is less than a predetermined threshold value. It should be noted that in the given embodiment of the present invention, the detection device (not shown) may be a photo camera, video camera, LIDAR, radar, IR sensor, ultrasonic sensor, RFID tag, and the like. In one of the variations of the given embodiment of the present invention, the detection device may be configured in the form of an image capturing device configured to capture images in the field of view in real time so as to enable identifying in said field of view at least one other unmanned aerial vehicle of the unmanned aerial vehicles 200 used in a predetermined spatial region for forming a desired two-dimensional or three-dimensional object which is contemplated to be further used for visualizing an image using one of the methods described herein, and to enable determination of distance to each of said detected unmanned aerial vehicles 200. In the given variation of the embodiment of the present invention, the control module of the unmanned aerial vehicle 200 or the control device of the system 500 may in a similar fashion enable altering of the spatial location, course of movement and/or mode of operation of said unmanned aerial vehicle 200 in the event that the distance to at least one of the detected unmanned aerial vehicles 200 is less than a predetermined threshold value, wherein such image capturing device (not shown) may be a photo camera, video camera, video recorder, video radar, and the like.

In yet another embodiment of the present invention, the fuselage 220 in each of the unmanned aerial vehicles 200 being part of the system 500 shown in FIG. 1 may be further provided with at least one robotic manipulator or grip (not shown) being under control of the control module (not shown) of said unmanned aerial vehicle 200, wherein the fuselage 210 may be further provided with an image capturing device (not shown) configured to capture images in the field of view in real time so as to enable identifying in said field of view at least one of the unmanned aerial vehicles 200 present in a predetermined spatial region and further connected to said control module so as to present thereto data relating to identified unmanned aerial vehicles, and the control module in turn may be further configured to actuate said grip in response to said data relating to identified unmanned aerial vehicles, the data being received from said grip, so as to enable performance of a detachable gripping of said identified unmanned aerial vehicle 200. It should be noted that in the given embodiment of the present invention, such image capturing device may be a photo camera, video camera, video recorder, video radar, and the like. It should also be noted that, in this embodiment of the present invention, the unmanned aerial vehicles being gripped by the grip may include the unmanned aerial vehicles 200 released from at least one of the parking stations 100 being part of the system 500 and directed to a predetermined spatial region, the unmanned aerial vehicles from parking stations being part of other system for visualizing an image similar to the system 500, and/or any other unmanned aerial vehicles which may be directed to a predetermined region of space for forming a desired two-dimensional or three-dimensional object within the scope of the subject technology described herein.

In one of the embodiments of the present invention, at least two of the unmanned aerial vehicles 200 being part of the system 500 shown in FIG. 1 may be configured to mechanically connect to one another to form an aggregate unmanned aerial vehicle. Such aggregate unmanned aerial vehicles are configured each to detachably interact with one another and/or with at least one of the rest of the unmanned aerial vehicles 200. It should be noted that such aggregate unmanned aerial vehicle (not shown) formed from several unmanned aerial vehicles 200 mechanically connected to one another may be originally accommodated in a linked or docked state in one of the parking stations 100 or may be from distinct unmanned aerial vehicles 200 directed from the corresponding parking stations 100 to a predetermined spatial region. It should be noted that the unmanned aerial vehicles 200 forming such aggregate unmanned aerial vehicle (not shown) may be mechanically connected to one another in a horizontal plane and/or vertical plane to form an aerial structure of connected to one another unmanned aerial vehicles 200 which has any shape and geometric dimensions suitable for the interaction of such aggregate unmanned aerial vehicle (not shown) with at least one other similar aggregate unmanned aerial vehicle and/or with at least one distinct unmanned aerial vehicle 200 which are suitable for free movement of such aggregate unmanned aerial vehicle (not shown) in one of the parking stations 100 and which are suitable for free movement of such aggregate unmanned aerial vehicle (not shown) by air individually or as part of a two-dimensional or three-dimensional object used for image visualisation. Such aggregate unmanned aerial vehicle (not shown) may respond to control commands/instructions as integral whole, i. e. the operation of unmanned aerial vehicles 200 in such aggregate unmanned aerial vehicle may be synchronized (for example, using the control device of the system 500 or the control module of one of the unmanned aerial vehicles 200 forming such aggregate unmanned aerial vehicle). Furthermore, the unmanned aerial vehicles 200 forming such aggregate unmanned aerial vehicle (not shown) may be electrically connected to one another to form a single power supply circuit and an aggregate power source (for example, the aggregate power source may be formed from batteries of connected to one another unmanned aerial vehicles 200) supplying power to or powering all said unmanned aerial vehicles 200 substantially simultaneously, thus making it possible to consider the range not of each such unmanned aerial vehicle 200 individually but rather the range of an aggregate unmanned aerial vehicle (not shown) as a whole. It should also be noted that the process of mutual mechanical connection of the unmanned aerial vehicles 200 may be started or launched in response to control commands presented by the control device of the system 500 for visualizing an image or the control module of one of the unmanned aerial vehicles 200 forming such aggregate unmanned aerial vehicle to said unmanned aerial vehicles 200. Furthermore, mutual mechanical connection between the unmanned aerial vehicles 200 forming the aggregate unmanned aerial vehicle (not shown) may be implemented immediately between the housings or bodies of the unmanned aerial vehicles 200 to be connected as well as by means of a connecting structure (not shown) with which there may be secured together or connected said unmanned aerial vehicles 200 to be connected (for example, using fastening or connecting means known in the prior art) and which said unmanned aerial vehicles 200 to be connected are collectively capable of carrying by air. Such connecting structure may be configured in the form of a ground structure to which the unmanned aerial vehicles 200 to be connected to one another may be secured or connected while presence thereof on the ground surface, wherein said connecting structure may be configured expandable or deployable, thus allowing said unmanned aerial vehicles 200 to expand or deploy said connecting structure on the ground surface as well as in the air while application thereto the tractive forces from the unmanned aerial vehicles 200. Furthermore, such connecting structure may be configured in the form of an aerial structure which is configured to independently move or fly in the air and to which the unmanned aerial vehicles 200 to be connected to one another may be secured or connected while presence thereof in the air, wherein said connecting structure may be configured expandable or deployable, thus allowing said unmanned aerial vehicles 200 to expand or deploy said connecting structure in the air while applying thereto the tractive forces from the unmanned aerial vehicles 200.

It should also be noted that the above aggregate unmanned aerial vehicle (not shown) may be formed from unmanned aerial vehicles 200 accommodated in at least one parking station of the parking stations 100 being part of the system 500, unmanned aerial vehicles 200 directed to a predetermined spatial region from at least one of the parking stations 100 being part of the system 500, unmanned aerial vehicles 200 being present in a predetermined spatial region as part of a two-dimensional or three-dimensional object used for visualizing an image, and/or unmanned aerial vehicles released from at least one of the parking stations being part of at least one other system for visualizing an image similar to the system 500.

When discharged, the aggregate unmanned aerial vehicle (not shown) being part of the formed two-dimensional or three-dimensional object used for image visualisation may be replaced with other (charged) aggregate unmanned aerial vehicle in the course of image visualisation or in the course of accommodation of said discharged aggregate unmanned aerial vehicle in one of the parking stations 100. While replacing a discharged aggregate unmanned aerial vehicle (not shown) with a charged aggregate unmanned aerial vehicle, said discharged aggregate unmanned aerial vehicle may be directed to one of the parking stations 100 to be accommodated therein or thereon so as to enable further storage in said parking station 100 and/or to enable replenishment of the range of such aggregate unmanned aerial vehicle. Alternatively, while replacing a discharged aggregate unmanned aerial vehicle (not shown) with a charged aggregate unmanned aerial vehicle, the unmanned aerial vehicles 200 being part of said discharged aggregate unmanned aerial vehicle (not shown) withdrawn from a two-dimensional or three-dimensional object formed in the air in a predetermined spatial region may be removed from interaction with one another (i.e., they may fly away from one another so as to uniform such aggregate unmanned aerial vehicle into distinct unmanned aerial vehicles 200) so as to enable direction of each of same to one of the parking stations 100, thus allowing to accommodate the discharged unmanned aerial vehicles 200 in the parking stations 200 so as to enable further storage thereof in those parking stations 100 and/or enable replenishment of the range of at least one of those unmanned aerial vehicles 200.

First Embodiment of Unmanned Aerial Vehicle

Figure 2:
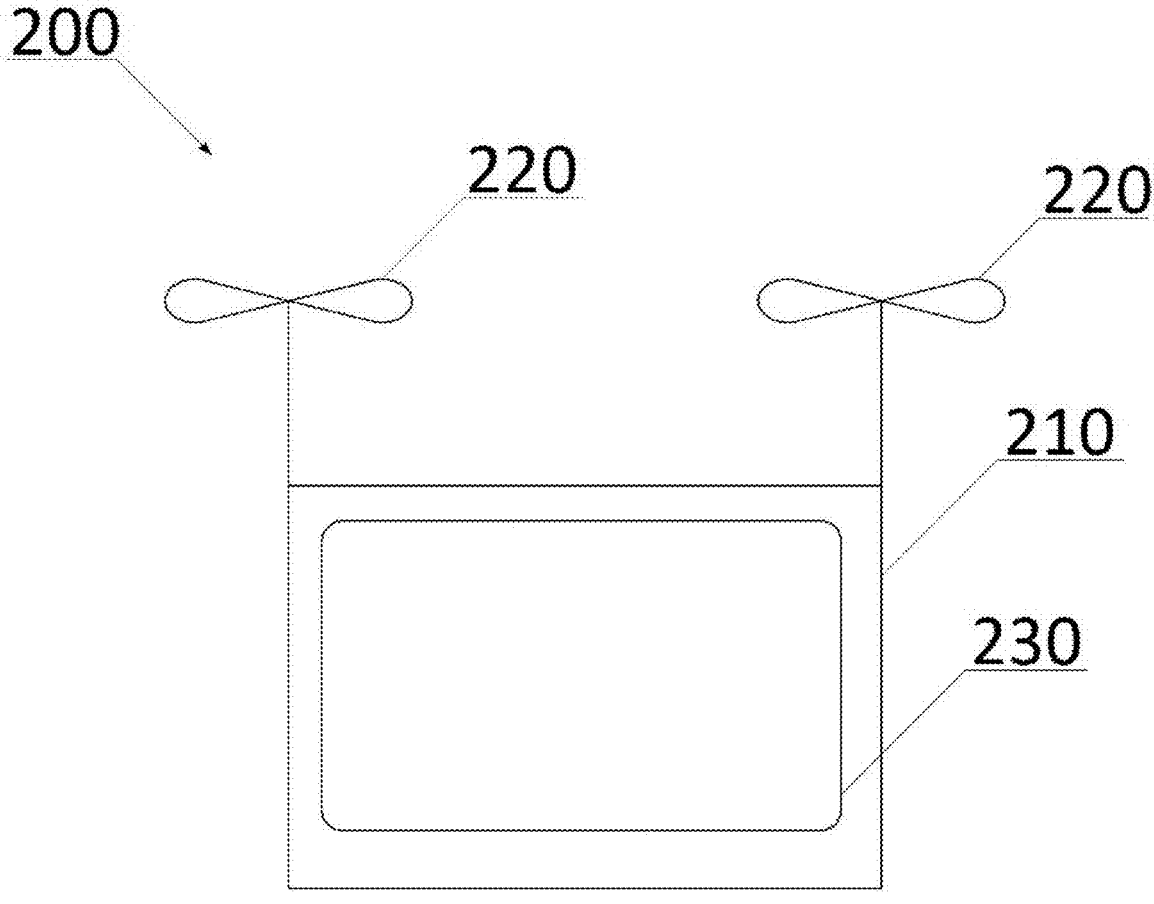
FIG. 2 is a schematic view of a first illustrative embodiment of an unmanned aerial vehicle used as part of the system for visualizing an image shown in FIG. 1.

FIG. 2 is a schematic view of one of illustrative embodiments (first embodiment) of an unmanned aerial vehicle in the form of which there may be implemented each of the above unmanned aerial vehicles 200 used in the system 500 for visualizing an image shown in FIG. 1.

The unmanned aerial vehicle 200 shown in FIG. 2 comprises a fuselage 210 and two propulsion units 220 installed or secured on the fuselage 210 and is provided with a display device or display 230 which is configured to display a static or dynamic image and is communicatively connected to the control module (not shown) of the unmanned aerial vehicle 200 which in turn is configured to establish a connection so as to enable exchange of data with the above control device (not shown) being part of the system 500, wherein said control module is further configured to control the operation of the display 230, including in response to data or control instructions received from the control device of the system 500.

In one of the embodiments of the present invention, the unmanned aerial vehicle 200 shown in FIG. 2 may be provided with at least one display 230, in particular it may be provided with two, three, four, five, six, seven, eight, nine, ten or more displays 230 configured each to display a static or dynamic image when turned on or actuated, wherein said displays 230 may be secured on the fuselage 210 such that there are no interspaces therebetween or that they are disposed at a predetermined distance from one another. It should be noted that in such embodiment of the present invention, the displays 230 in each unmanned aerial vehicle 200 shown in FIG. 2 may be disposed coplanar with one of the sides of the fuselage 230, may be disposed at an angle with respect to one another on one of the sides of the fuselage 230, or may be disposed on different sides of the fuselage 230.

While directing the unmanned aerial vehicles 200 according to FIG. 2 to a predetermined spatial region, the control device of the system 500 which control device controls the operation of those unmanned aerial vehicles 200 by way of presenting control and/or navigation commands to the control modules thereof enables disposition of each of said directed unmanned aerial vehicles 200 in a predetermined spatial location in accordance with a predetermined model of arrangement of unmanned aerial vehicles (described above) known to the control device of the system 500 to form in the air at least one aggregate display 300 shown in FIG. 1 of the displays 230 each of which corresponds to one of those unmanned aerial vehicles 200, wherein said formed aggregate display 300 is substantially one of specific embodiments of the above two-dimensional or three-dimensional object formed in the air while implementing the above system 500 for visualizing an image. Thus, in a given spatial region in the air there may be parallelly or sequentially formed two or more composite displays 300 using the displays 230 being part of the unmanned aerial vehicles 200 directed by the control device of the system 500 from the corresponding parking stations 100 to said spatial region.

In one of the embodiments of the present invention, the unmanned aerial vehicles 200 whose displays 230 are used to form the aggregate display 300 may be disposed in the air in predetermined spatial locations thereof corresponding to a specific model of arrangement of unmanned aerial vehicles such that said displays 230 may be disposed at a distance from one another (i.e. to form interspaces therebetween in which there is precluded the possibility of image visualisation) or may be disposed immediately adjacent to one another to form a generally continuous showing or displaying region for image visualisation.

In another embodiment of the present invention, the unmanned aerial vehicles 200 whose displays 230 are used to form the aggregate display 300 may be disposed in the air in predetermined spatial locations thereof corresponding to a specific model of arrangement of unmanned aerial vehicles such that said displays 230 may form in the air a substantially two-dimensional aggregate display 300 in which the unmanned aerial vehicles 200 are present in one and the same plane and which generally has the shape of a known two-dimensional geometric object (for example, shape of a rectangle, square, triangle, trapezoid, parallelogram, circle, oval, or the like) or any other suitable two-dimensional shape, or a three-dimensional display that generally has the shape of a known three-dimensional geometric object (for example, a cube, pyramid, parallelepiped, sphere, or the like) or any other suitable three-dimensional shape.

In yet another embodiment of the present invention, the unmanned aerial vehicles 200 whose displays 230 are used to form the aggregate display 300 may be disposed in the air in predetermined spatial locations thereof corresponding to a specific model of arrangement of unmanned aerial vehicles such that said displays 230 may form in the air an aggregate display 300 having any curvilinear shape, concave shape, convex shape, irregular shape, or the like.

In some other embodiment of the present invention, the unmanned aerial vehicles 200 whose displays 230 are used to form the aggregate display 300 may be disposed in the air in predetermined spatial locations thereof corresponding to a specific model of arrangement of unmanned aerial vehicles such that said displays 230 forming in the air the aggregate display 300 are displaced in space with respect to one another along at least one of the three coordinate axes (x, y, z), for example along one of the two coordinate axes corresponding to the vertical and horizontal axes, or along the both of those coordinate axes simultaneously so that the aggregate display 300 may have a concave shape, a convex shape, an irregular shape, or a curvilinear shape.

In some embodiments of the present invention, each of the unmanned aerial vehicles 200 may be further configured to present, in real time, data relating to the operation of the display 230 thereof to the control device of the system 500 so as to enable replacement thereof with at least one other unmanned aerial vehicle 200 being part of the system 500 from at least one of the parking stations 100 being part of the system 500 in the event of a breakdown or failure of said display 230, wherein said process of replacement may be substantially performed similar to the above process of replacement of a discharged unmanned aerial vehicle 200 with a charged unmanned aerial vehicle 200.

Each of the displays 230 in the unmanned aerial vehicles 200 may be one of a group of displays comprising: an LCD display, LED display, OLED display, AMOLED display, DLP display, TFT display, IPS display, TN display, STN display, CSTN display, FSTN display, DSTN display, DLP display, TFD display, LTPS display, UFB display, CRT display, PDP display, laser display, and the like.

The control device (not shown) of the system 500 is configured to present data relating to an image to the unmanned aerial vehicles 200 which have been directed to a predetermined spatial region and whose displays 230 are used to form the aggregate display 300 so as to enable displaying of the image 400 at least on a portion of said aggregate display 300. It should be noted that depending on the predefined features or parameters of the image 400, it may be displayed on the entire showing or displaying region of the aggregate display 300, the region being formed by all displays 230 being part of the aggregate display 300, as well as only on a portion of the showing or displaying region of the aggregate display 300 formed by a portion of the displays 230 being part of the aggregate display 300.

In one of the embodiments of the present invention, the control device (not shown) of the system 500 may be further configured to present navigation commands to the unmanned aerial vehicles 200 whose displays 230 form the aggregate display 400 for the collective movement of said unmanned aerial vehicles 200 in the air so as to maintain a predetermined model of arrangement of unmanned aerial vehicles, thus allowing to uniformly move in the air the formed image 400 in the air without deforming same or degrading the quality thereof.

Each image 400 which may be visualised on the aggregate display 300 may be brought into accordance with a specific model of arrangement of unmanned aerial vehicles. In particular, the image 400 being visualised may be defined automatically depending on a predefined or user-selected model of arrangement of unmanned aerial vehicles and/or a predefined or user-selected spatial region in which it is desired to visualise said image 400. Alternatively, the image 400 to be visualised on the aggregate display 300 may be user-selected or defined separately from the region of space in which it is desired to visualise the image and/or separately from the model of arrangement of unmanned aerial vehicles, in particular using, for example, the above user device. It should be noted that the image 400 which is to be visualised on the aggregate display 300 and which the control device of the system 500 presents as part of data relating to the image to the control modules of the unmanned aerial vehicles 200 whose displays 230 form the aggregate display 300 may be preliminarily loaded or recorded by the operator into a local database being part of the control device of the system 500, or may be transferred as a data packet from an external source of data (for example, from a web-site, database, data server, and the like) via a wireless data transfer channel established between the control device of the system 500 and that external data source in response to a request of the control device of the system 500 which request, in turn, may be generated, for example, in response to a request of the user device using which the user may select said image in the list of selectable images which may be visualised on the aggregate display 300.

The image 400 displayed on the aggregate display 400 may be a still or static image (for example, a photograph, drawing, picture, and the like). Furthermore, the image 400 displayed on the aggregate display 400 may be a motional or dynamic image (for example, a clip, presentation, video film, animated image, and the like). Furthermore, the image 400 displayed on the aggregate display 400 may be any combination of a static image and a dynamic image.

The image 400 displayed on the aggregate display 400 may be a two-dimensional image, a three-dimensional image, or a combination thereof, wherein such two-dimensional or three-dimensional image may be at least partially motional.

Furthermore, the image 400 may be a combination or a mix of multiple distinct or identical individual images, wherein a portion of said individual images may correspond to the main image, and the remaining portion of said individual images may correspond to the background for said main image.

As shown in FIG. 1, the unmanned aerial vehicles 200 whose displays 230 form the aggregate display 300 form one movable string of unmanned aerial vehicles, in which string said unmanned aerial vehicles 200 move one after another along a predetermined trajectory, wherein the beginning of said movable string corresponds to the entry point of an unmanned aerial vehicle 200 into the plurality of unmanned aerial vehicles forming the aggregate display 300 (for example, in the course of initially forming said aggregate display 300, in the course of adding a new unmanned aerial vehicle 200 for altering the shape or dimensions of the aggregate display 300 or in the course of replacing a discharged unmanned aerial vehicle 200 with a charged unmanned aerial vehicle 200), and the end of said string corresponds to the exit point of an unmanned aerial vehicle 200 from the plurality of unmanned aerial vehicles forming the aggregate display 300 (for example, in the course of unforming said aggregate display 300, in the course of removing an unmanned aerial vehicle 200 for altering the shape or dimensions of the aggregate display 300, or in the course of directing a discharged unmanned aerial vehicle 200 to one of the parking stations 100).

In particular, as shown in FIG. 1, the unmanned aerial vehicles 200 whose displays 230 form the aggregate display 300 form a predetermined number of sequentially disposed horizontal or vertical rows (i.e., an array of unmanned aerial vehicles 200) in each of which the unmanned aerial vehicles 200 perform movement one after another towards the end of the row so as to enable transition to a next row upon reaching the end of a previous row, wherein, upon reaching the end of the last row (i.e., the final position in the last row) corresponding to the exit point, the control device of the system 500 enables direction of each unmanned aerial vehicle 200 to one of the parking stations 100, and, simultaneously with the exiting of an unmanned aerial vehicle 200 through the exit point, the control device of the system 500 enables disposition of another unmanned aerial vehicle directed to a predetermined region of space, in which region there is formed said aggregate display 300, from one of the parking stations 100, at the beginning of the first row corresponding to the entry point. It should be noted that the control module of the unmanned aerial vehicle 200 or the control device of the system 500 enables turning on of the display 230 related to said unmanned aerial vehicle 200 at the moment of time when said unmanned aerial vehicle 200 occupies the initial position in the movable string thereof while entering through the entry point, and enables turning off of said display 230 at the moment of time when said unmanned aerial vehicle 200 exits from the movable string thereof through the exit point.

Furthermore, as shown in FIG. 1, the unmanned aerial vehicles 200 with replenished range may take off from the corresponding parking stations 100 being part of the system 500 substantially simultaneously or sequentially at short intervals of time to form in the air a group of two, three, or more unmanned aerial vehicles, wherein the control device of the system 500 enables a sequential line-up of unmanned aerial vehicles 200 with replenished range from said group into a string of unmanned aerial vehicles with replenished range, the string being directed to the entry point to the plurality of unmanned aerial vehicles forming the aggregate display 300 in a predetermined region of space.

Furthermore, as shown in FIG. 1, the unmanned aerial vehicles 200 to be replaced (i.e., the unmanned aerial vehicles 200 with insufficient range or discharged unmanned aerial vehicles 200) may sequentially fly out of a plurality of unmanned aerial vehicles forming the aggregate display 300 in a predetermined region of space through the exit point sequentially at predetermined intervals of time to form in the air a string of unmanned aerial vehicles to be replaced, the string being directed towards the parking stations 100 being part of the system 500, wherein, upon approaching said parking stations 100, the unmanned aerial vehicles 200 of said string of unmanned aerial vehicles to be replaced may exit that string to form a group of two, three or more unmanned aerial vehicles, wherein the control device of the system 500 enables substantially simultaneous or sequential direction of the unmanned aerial vehicles 200 to be replaced from said group to the corresponding parking stations 100 with free or unoccupied charging devices.

In one of the embodiments of the present invention, the unmanned aerial vehicles 200 whose displays 230 form the aggregate display 300 may form one or more movable strings of unmanned aerial vehicles (for example, two, three, four, five, six, seven, eight, nine, ten and more such strings of unmanned aerial vehicles) in each of which strings said unmanned aerial vehicles 200 move one after another along a predetermined trajectory, wherein each of said movable strings may have a beginning thereof corresponding to the entry point of an unmanned aerial vehicle 200 into said movable string and an exit thereof corresponding to the exit point of an unmanned aerial vehicle 200 from said movable string. It should be noted that in one of the variations of such embodiment of the present invention, at least a portion of the movable strings of unmanned aerial vehicles may have a common entry point and/or exit point. In these embodiments of the present invention, the movable strings of unmanned aerial vehicles may partially intersect with one another as well as not intersect with one another, wherein said movable strings may be combined with one another such that the displays 230 being part of those movable strings of unmanned aerial vehicles and forming the aggregate display 300 may provide for displaying an integral image 400 (i.e., without any darkened interspaces between different portions of the image 400), may provide for displaying the image 400 with darkened interspaces between different portions of the image 400, or may provide for two or more identical or different images similar each to the image 400.

In another embodiment of the present invention, the control device of the system 500 may be further configured to stop the movable string of unmanned aerial vehicles for a predetermined period of time (for example, one, two, three, five, ten seconds) sufficient for the emergency withdrawal of at least one of unmanned aerial vehicles 200 forming said movable string at a place or point of that movable string corresponding to the current spatial location of said at least one unmanned aerial vehicle 200 and different from the above entry point and exit point in the event of receipt, from at least one unmanned aerial vehicle 200, of data relating to a breakdown or malfunction of the display 230, early exhaustion of the range, a rapid decrease in the range, a breakdown or malfunction of at least one of the propulsion units 220, problems of the software control system of an unmanned aerial vehicle 200, unexpected collision of an unmanned aerial vehicle 200 with another object, and/or the like.

In another embodiment of the present invention, each of the unmanned aerial vehicles 200 used to form the aggregate display 300 may be provided with two displays, each of which may be similar to the above display 230 and which may be disposed on said unmanned aerial vehicle 200 such that they face opposite directions relative to one another, wherein, while forming the aggregate display 300, one of said displays 230 may form one of the two opposite sides of the aggregate display 300, and the other one of said displays 230 may form the other side of the aggregate display 300. In such embodiment of the present invention, the control device of the system 500 may enable displaying of one and the same image 400 from the both sides of the aggregate display 300, displaying of the image 400 only from one side of the aggregate display 300, or displaying of different images 400 on the opposite sides of the aggregate display 300.

In yet another embodiment of the present invention, each of the unmanned aerial vehicles 200 used to form the aggregate display 300 may be provided with two or more displays, each of which may be similar to the above display 230 and which may be disposed on said unmanned aerial vehicle 200 such that they face different directions relative to one another, whereby, while forming the aggregate display 300, each of said displays 230 may define one of the sides of the composite display 300. In such embodiment of the present invention, the control device of the system 500 may enable displaying of one and the same image 400 from different sides of the aggregate display 300, displaying of the image 400 only from one side of the aggregate display 300, or displaying of different images 400 on different sides of the aggregate display 300.

According to one of the embodiments of the present invention, the unmanned aerial vehicles 200 whose displays 230 form the aggregate display 300 may form a predetermined quantity of sequentially disposed horizontal or vertical rows in each of which the unmanned aerial vehicles 200 may perform movement one after another towards the end of the row so as to enable return to the beginning of said row in case of going beyond the limits thereof of said end of the row, wherein the unmanned aerial vehicles 200 moving one after another and the corresponding returning unmanned aerial vehicles define a distinct closed string of unmanned aerial vehicles, and the control device of the system 500 enables displaying of the corresponding portion of the image 400 on the displays 230 of the unmanned aerial vehicles moving one after another and enables turning off or darkening of the displays 230 of the returning unmanned aerial vehicles 200. In other words, the unmanned aerial vehicles 200 moving one after another substantially correspond to the visible portion of the movable string (i.e., the displays 230 are turned on), and the corresponding returning unmanned aerial vehicles 200 substantially correspond to the invisible portion of the movable string (i.e., the displays 230 are turned off or darkened). It should be noted that the unmanned aerial vehicles 200 with turned off or darkened displays 230 may return to the beginning of rows thereof from that side of the aggregate display 300 which is not enabled to display the image 400, wherein, once the unmanned aerial vehicle 200 enters through the entry point the beginning of row thereof, then the controller of the system 500 enables turning on of the display 230 thereof so as to provide for displaying thereon the corresponding portion of the image, and once the unmanned aerial vehicle 200 exits the end of row thereof through the exit point, then the control device of the system 500 enables turning off of the display 230 thereof (i.e., the display 230 ceases participation in displaying of the image 400 or a portion thereof till the moment of entry of that unmanned aerial vehicle 200 into the beginning of row thereof through the entry point). In one variation of the given embodiment of the present invention, the control device of the system 500 may further enable replacement of each discharged unmanned aerial vehicle 200 with a charged unmanned aerial vehicle 200 from one of the parking stations being part of the system 500 while return of the discharged unmanned aerial vehicle 200 to the beginning of a corresponding one of the rows of unmanned aerial vehicles used to form the aggregate display 300, i. e. during the period of time when the discharged unmanned aerial vehicle 200 is present as part of an invisible portion of the movable string thereof, wherein said invisible portion of the movable string may have at least one exit spot for directing the discharged unmanned aerial vehicle 200 to one of the parking stations 100 for replenishment of the range thereof and at least one entry point for returning said unmanned aerial vehicle 200 with a replenished range (i.e. in a charged state).

According to another embodiment of the present invention, the control device of the system 500 may further enable direction of each discharged unmanned aerial vehicle 200 to one of the parking stations 100 for replenishment of the range thereof using a charging device on said parking station 100 and enable return of said unmanned aerial vehicle 200 with replenished range so as to provide for replacement of one of other discharged unmanned aerial vehicles 200.

According to yet another embodiment of the present invention, the control device of the system 500 may enable replacement of each discharged unmanned aerial vehicle 200 being part of the aggregate display 300 with a charged unmanned aerial vehicle 200 (i.e. with an unmanned aerial vehicle 200 with a full range or at least partially replenished range) while presence of said discharged unmanned aerial vehicle 200 in a spatial location in a predetermined spatial region, the spatial location being located at the shortest distance from the place of charging thereof, in particular, to one of the parking stations 100 with a free charging device.

According to another embodiment of the present invention, the control device of the system 500 may be further configured to present navigation commands to the unmanned aerial vehicles 200 whose displays 230 form the aggregate display 300 so as to enable re-arrangement in the air of those unmanned aerial vehicles 200 for altering the shape and/or size of the aggregate display 300.

According to other embodiments of the present invention, the unmanned aerial vehicles 200 whose displays 230 form the aggregate display 300 may be divided into at least two groups, wherein the unmanned aerial vehicles 200 in one of said at least two groups may have a movement speed and/or movement direction that are different from those of the unmanned aerial vehicles 200 in the other group of said at least two groups.

According to other embodiments of the present invention, the unmanned aerial vehicles 200 whose displays 230 form the aggregate display 300 may be divided into at least two groups, wherein the displays 230 with which the unmanned aerial vehicles 200 are provided in one of said at least two groups may have distinct overall dimensions, refresh rate and/or brightness different from those of the displays 230 of the unmanned aerial vehicles 200 in the other group of said at least two groups.

According to some embodiments of the present invention, the unmanned aerial vehicles 200 whose displays 230 form the aggregate display 300 may maintain the spatial location thereof for a predetermined period of time, in particular, for a period of time corresponding to the duration of displaying of the image 400 or the duration of displaying of at least a portion of said image 400.

According to some other embodiments of the present invention, the unmanned aerial vehicles 200 whose displays 230 form the aggregate display 300 may be divided into at least two groups, and the control device of the system 500 may enable displaying, on a portion of the aggregate display 300 formed from the displays 230 of the unmanned aerial vehicles 200 belonging to one of said at least two groups, of an image different from that displayed on the other portion of the aggregate display 300 formed from the displays 230 of the unmanned aerial vehicles 200 belonging to the other group of said at least two groups.

According to some other embodiments of the present invention, the unmanned aerial vehicles 200 whose displays 230 form the aggregate display 300 may be divided into at least two groups, and the control device of the system 500 may enable displaying of one and the same image 400 on one portion of the aggregate display 300 formed from the displays 230 of the unmanned aerial vehicles 200 belonging to one of said at least two groups and on the other portion of the aggregate display 300 formed from the displays 230 of the unmanned aerial vehicles 200 belonging to the other group of said at least two groups.

According to various embodiments of the present invention, at least two of the unmanned aerial vehicles 200 to be directed to a predetermined region of space to form the aggregate display 300 may be configured to mechanically connect to one another to form an aggregate unmanned aerial vehicle (not shown) configured to detachably interact with at least one other unmanned aerial vehicle of said unmanned aerial vehicles 200 being part of the system 500 while forming the aggregate display 300 and/or to detachably connect to at least one other aggregate unmanned aerial vehicle while forming the aggregate display 300, wherein the control device may enable formation of the aggregate display 300 from the displays 230 of said aggregate unmanned aerial vehicles and/or from a combination of the displays 230 of said aggregate unmanned aerial vehicles with the displays 230 of individual unmanned aerial vehicles 200.

In one embodiment of the present invention, the control device of the system 500 may enable direction of charged unmanned aerial vehicles 200 to a given region of space in a quantity corresponding to the quantity of unmanned aerial vehicles 200 whose displays 230 form the composite display 300 so as to enable substantially simultaneous replacement thereof with said charged unmanned aerial vehicles 200. In particular, in the given embodiment of the present invention, the control device of the system 500 may further enable formation, in a predetermined region of space, of a replacement aggregate display from charged unmanned aerial vehicles 200, the replacement aggregate display being a copy of the aggregate display to be replaced, so as to enable replacement of the aggregate display to be replaced with the replacement aggregate display, wherein the control device of the system 500 may substantially simultaneously present control commands to the unmanned aerial vehicles 200 whose displays 230 form the aggregate display to be replaced so as to provide for turning off, darkening or hiding of those displays 230 and substantially simultaneously present control commands to the unmanned aerial vehicles 200 whose displays 230 form the replacement aggregate display so as to provide for turning on of those displays 230, thus either completely eliminating interruptions in displaying of the image 400 on the aggregate display 300, or minimizing duration thereof. In one variation of the given embodiment of the present invention, the control device of the system 500 may further enable displaying, on the replacement aggregate display, of an image 400 coinciding with an image 400 displayed by the replaced aggregate display, or of an image being a continuation of the visual sequence of the image 400 displayed by the replaced aggregate display. In another variation of the given embodiment of the present invention, the control device of the system 500 may further enable replacement of an aggregate display to be replaced with a replacement aggregate display upon expiration of a predetermined period of time.

In another embodiment of the present invention, the unmanned aerial vehicles 200 whose displays 230 form the aggregate display 300 may be divided into at least two groups in each of which the displays of the unmanned aerial vehicles form one of the portions of the aggregate display, wherein the control device further enables formation, in said region of space, of at least one replacement portion of the aggregate display from charged unmanned aerial vehicles directed to said region of space so as to enable replacement of the portion to be replaced of the aggregate display with said replacement portion of the aggregate display. While replacement of a portion to be replaced of the aggregate display with a replacement portion of the aggregate display, the control device substantially simultaneously presents control commands to unmanned aerial vehicles whose displays form the portion to be replaced of the aggregate display so as to provide for turning off, darkening or hiding those displays, and control commands to unmanned aerial vehicles whose displays form a replacement portion of the aggregate display so as to provide for turning on of those displays.

In yet another embodiment of the present invention, each of the unmanned aerial vehicles 200 may be provided with at least one power source and may be further configured to present, in real time, data relating to the range to the control device of the system 500, thus enabling direction (for example, in response to navigation commands of the control device of the system 500) of each discharged unmanned aerial vehicle of the unmanned aerial vehicles 200 whose displays form the aggregate display 300 to one of the parking stations 100 being part of the system 500, and further enabling re-arrangement of the remaining unmanned aerial vehicles 200 whose displays 230 are involved in formation of the aggregate display 300 for altering or maintaining the shape and/or size of the aggregate display 300.

In another embodiment of the present invention, the control device of the system 500 may be further configured to direct, to a predetermined region of space, additional unmanned aerial vehicles 200 from at least one of the parking stations 100 being part of the system 500 so as to enable integration thereof into the structure of the aggregate display 300 for altering the shape and/or size of that aggregate display 300.

In some embodiment of the present invention, the unmanned aerial vehicles 200 whose displays 230 form the aggregate display 300 may be divided into groups in each of which the displays 230 of the unmanned aerial vehicles 200 may form one of the portions of the aggregate display 300, wherein, while forming the aggregate display 300, the control device of the system 500 may enable arrangement of said unmanned aerial vehicles 200 such that at least one of said portions of the aggregate display 300 may have a shape and/or size that are different from the remaining portions of the aggregate display 300.

In some other embodiment of the present invention, each of the unmanned aerial vehicles 200 may be provided with at least one power source, and said system 500 may further comprise a laser projection unit (not shown) configured to emit a laser beam, wherein each of the unmanned aerial vehicles 200 may be provided with a laser emission receiver/converter (not shown) electrically connected to the power source and configured to convert the received laser beam into an electric current so as to enable charging of said power source. In the given embodiment of the present invention, each of the unmanned aerial vehicles 200 may be further configured to present, in real time, data relating to the range to the control device of the system 500, and the control device of the system 500, in turn, may be further configured to control the operation of the laser projection unit (not shown) so as to enable direction of the laser beam to the unmanned aerial vehicle 200 whose range is below a predetermined threshold value.

In some other embodiment of the present invention, the control device of the system 500 may be configured to present navigation commands to the unmanned aerial vehicles 200 whose displays 230 form the aggregate display 300 for directing same to at least one of the parking stations 100 being part of the system 500 upon expiration of a predetermined period of time.

In other embodiments of the present invention, the control device of the system 500 may be configured to substantially simultaneously or sequentially present navigation commands to the unmanned aerial vehicles 200 whose displays 230 form the aggregate display 300 for directing same to at least one of the parking stations 100 being part of the system 500.

In other embodiments of the present invention, the control device of the system 500 may be configured to present navigation commands to the unmanned aerial vehicles 200 whose displays 230 form the aggregate display 300 for directing same in groups or one after another to at least one of the parking stations 100 being part of the system 500.

In some embodiments of the present invention, the control device of the system 500 may be further configured to present navigation commands to charged unmanned aerial vehicles 200 (i.e., unmanned aerial vehicles 200 with the range replenished using charging devices at the parking stations 100) so as to enable return thereof to the initial spatial locations thereof for re-forming the same aggregate display 300.

In some other embodiments of the present invention, the unmanned aerial vehicles 200 whose displays 230 form the aggregate display 300 may be configured to automatically move to at least one of the parking stations being part of the system 500 upon expiration of a predetermined period of time.

In some other embodiments of the present invention, the unmanned aerial vehicles 200 whose displays 230 form the aggregate display 300 may be configured to automatically move to at least one of the parking stations being part of the system 500 substantially simultaneously or sequentially.

In various embodiments of the present invention, the unmanned aerial vehicles 200 whose displays 230 form the aggregate display 300 may be configured to automatically move in groups or one after another to at least one of the parking stations being part of the system 500.

According to one of the embodiments of the present invention, the charged unmanned aerial vehicles 200 may be configured to automatically return to the initial spatial locations thereof for re-forming the same aggregate display 300.

According to another embodiment of the present invention, each of the unmanned aerial vehicles 200 may be provided with at least two displays 230 disposed on said unmanned aerial vehicle 200 such that they are arranged at an angle with respect to one another, wherein, while forming the aggregate display 300, said displays 230 may form distinct sides of the aggregate display 300.

According to another embodiment of the present invention, the control device of the system 500 may enable displaying of one and the same image 400 from all sides of said aggregate display 300, displaying of the image 400 from at least one side of said aggregate display 300, or displaying of different images on different sides of said aggregate display 300.

According to yet another embodiment of the present invention, the control device of the system 500 may be further configured to present navigation commands to the unmanned aerial vehicles 200 whose displays 230 form the aggregate display 300 so as to enable re-arrangement of those unmanned aerial vehicles 200 for dividing said aggregate display 300 into at least two individual display portions for visualizing an image.

According to some embodiment of the present invention, the control device of the system 500 may further enable disposition of the unmanned aerial vehicles 200 directed to a predetermined region of space in response to navigation commands of the control device of the system 500 in predetermined spatial locations in accordance with a predetermined model of arrangement of unmanned aerial vehicles so as to enable formation in the air of at least two aggregate displays, each of which may correspond to the above aggregate display 300. In one of the variations of the given embodiment of the present invention, the control device of the system 500 may be further configured to present navigation commands to the unmanned aerial vehicles 200 whose displays 230 form at least two aggregate displays 300 so as to enable re-arrangement of those unmanned aerial vehicles 200 for combining said aggregate displays 300 into at least one integral display portion for visualizing an image.

Figure 3:
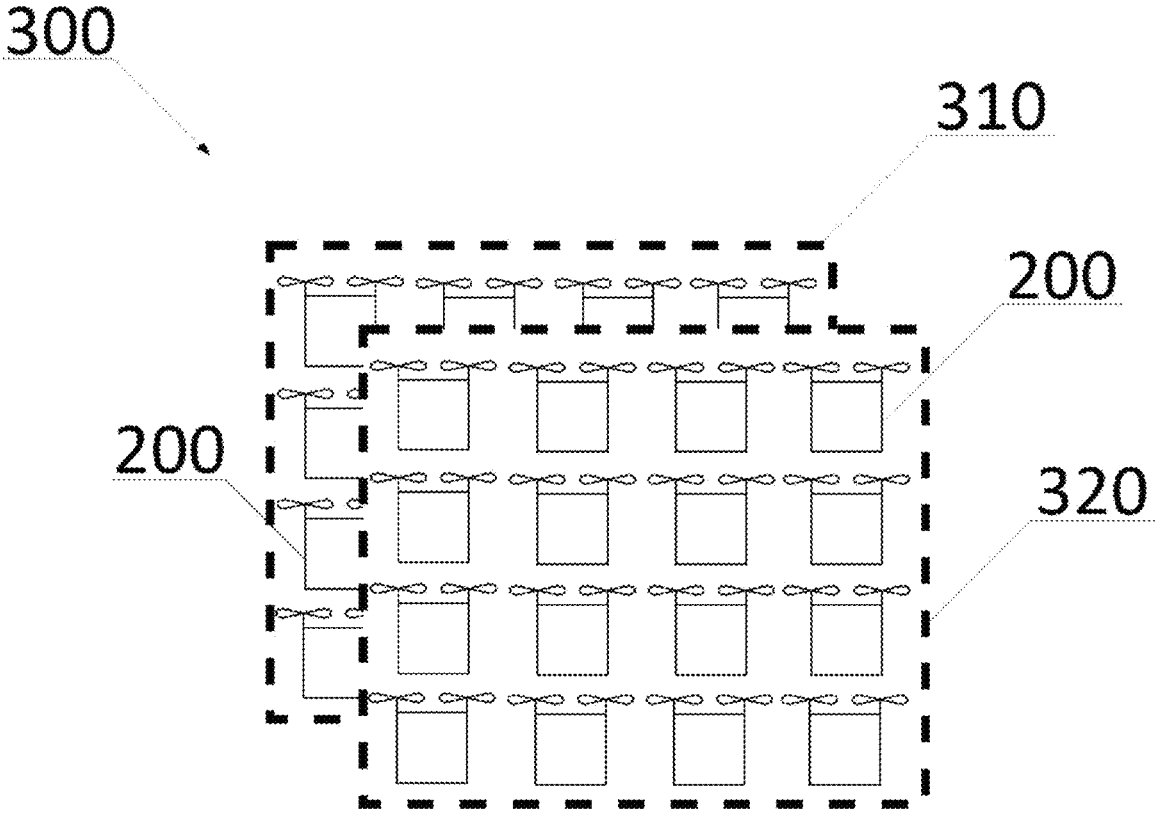
FIG. 3 is a schematic view of an illustrative embodiment of a multi-layer aggregate display formed using the unmanned aerial vehicles according to FIG. 2.

FIG. 3 is a schematic view of one of the illustrative embodiments of a multi-layer aggregate display 300 formed while implementing the image visualisation system 500 shown in FIG. 1 using the above unmanned aerial vehicles 200 shown in FIG. 2.

The unmanned aerial vehicles 200 directed to a predetermined region of space may be divided into two groups, wherein the displays 230 of the unmanned aerial vehicles 200 of the first group may form the first layer 310 of the aggregate display 300, and the displays 230 of the unmanned aerial vehicles 200 of the second group may form the second layer 320 of the aggregate display. In particular, the first layer 310 of the aggregate display 300 may be configured generally parallel to the second layer 320 of the aggregate display 300 (see FIG. 3).

Furthermore, the control device of the system 500 may enable displaying, on the displays 230 of the first layer 310 of the aggregate display 300, of an image different from or coinciding with an image displayed on the displays 230 of the second layer 320 of the aggregate display 300. Alternatively, the control device of the system 500 may enable displaying of the main image on the displays 230 of the first layer 310 of the aggregate display 300 and may enable displaying, on the displays 230 of the second layer 320 of the aggregate display 300, of other image being a background image for said main image.

In one of the embodiments of the present invention, the unmanned aerial vehicles 200 to be directed to a predetermined region of space for forming the aggregate display 300 may be divided into groups, in each of which the displays 230 of the unmanned aerial vehicles 200 may form one of the layers of the aggregate display, wherein the control device of the system 500 may further enable displaying, on each of said formed layers of the aggregate display 300, one of the aggregate portions of a three-dimensional image, one and the same two-dimensional image, or distinct two-dimensional images.

Second Embodiment of Unmanned Aerial Vehicle

Figure 4:
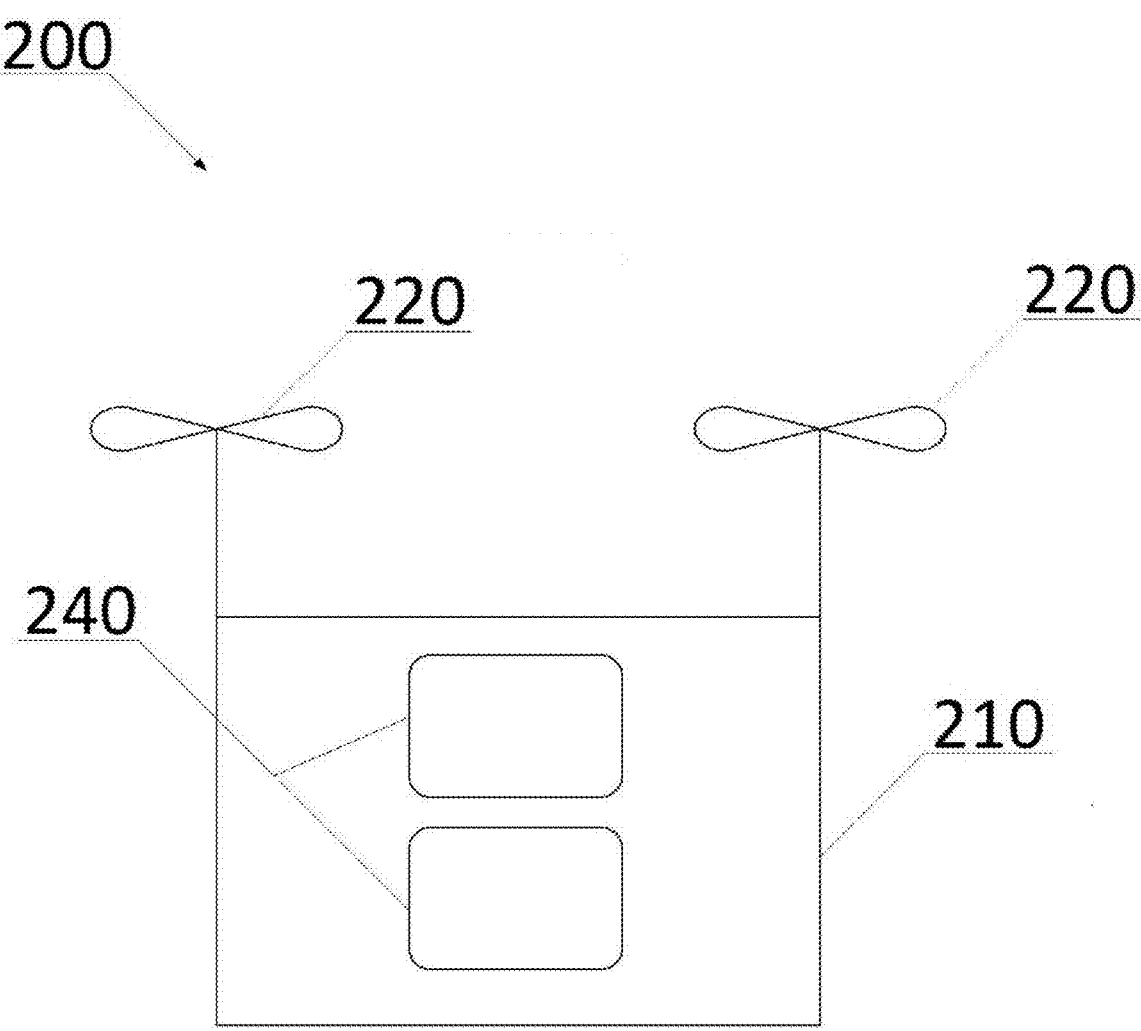
FIG. 4 is a schematic view of a second illustrative embodiment of an unmanned aerial vehicle used as part of the system for visualizing an image shown in FIG. 1.

FIG. 4 is a schematic view of yet another illustrative embodiment (second embodiment) of an unmanned aerial vehicle in the form of which there may be implemented each of the above unmanned aerial vehicles 200 used in the system 500 for visualizing an image shown in FIG. 1. The unmanned aerial vehicle 200 shown in FIG. 4 comprises a fuselage 210 and two propulsion units 220 installed or secured on the fuselage 210 and is provided with two controllable light sources 240, each of which is configured to emit light with a variable wavelength and is communicatively connected to the control module (not shown) of the unmanned aerial vehicle 200 which in turn is configured to establish a connection so as to enable exchange of data with the above control device (not shown) being part of the system 500, wherein said control module is further configured to control the operation of the light sources 240, including in response to data or control instructions received from the control device of the system 500. It should be noted that the unmanned aerial vehicle 200 shown in FIG. 4 may be comprised of three or more controllable light sources 240 (for example, three, four, five, six, seven, eight, nine, ten, or more controllable light sources 240) configured each to emit light with a variable wavelength. It should also be noted that the light sources 240 may be installed or secured exteriorly to as well as in the interior of the fuselage 210 of an unmanned aerial vehicle, including using suitable connecting or fastening means known in the prior art.

While using the unmanned aerial vehicles 200 shown in FIG. 4 as part of the above system 500 for visualizing an image, the control device of the system 500 communicatively coupled to such unmanned aerial vehicles 200 substantially in a similar manner enables direction of at least a portion of said unmanned aerial vehicles 200 from the parking stations 100 to a predetermined region of space so as to enable disposition of each of said directed unmanned aerial vehicles 200 in a predetermined spatial location in accordance with a predetermined model of arrangement of unmanned aerial vehicles to form in the air at least one display from said light sources, wherein each of the light sources forming said at least one display corresponds to at least one pixel of said display. Furthermore, the control device of the system 500 is further configured to present data relating to an image to the unmanned aerial vehicles 200 according to FIG. 4 so as to enable altering of the emission wavelength of the light sources of said unmanned aerial vehicles 200 for displaying said image on said display. Thus, in a predetermined spatial region in the air there may be parallelly or sequentially formed two or more displays using the controllable light sources 240 being part of the unmanned aerial vehicles 200 directed by the control device of the system 500 from the corresponding parking stations 100 to said spatial region.

Furthermore, similarly to the above unmanned aerial vehicles 200 shown in FIG. 2, the unmanned aerial vehicles 200 according to FIG. 4 whose light sources form the display form one or more movable strings of unmanned aerial vehicles, each of which strings similarly has the beginning thereof corresponding to the entry point into the plurality of unmanned aerial vehicles forming the display and the end thereof corresponding to the exit point from the plurality of unmanned aerial vehicles forming the display. Those skilled in the art would readily appreciate that some of the embodiments of the present invention described above with reference to FIG. 1, FIG. 2 and FIG. 3 are also applicable to the unmanned aerial vehicles 200 shown in FIG. 4 and to the system 500 for visualizing an image which is based on the use of those unmanned aerial vehicles 200 according to FIG. 4. It should be noted that the control device of the system 500 may be further configured to alter the wavelength with which the light sources 240 forming the display emit light in real time so as to enable displaying of a predetermined static or dynamic image on said display. Furthermore, each of the light sources 240 forming the display in each of the unmanned aerial vehicles 200 may be configured to emit white-color light, red-color light, green-color light, or blue-color light.

In one of the embodiments of the present invention, each controllable light source 240 in each of the unmanned aerial vehicles 200 according to FIG. 4 may be a multi-color LED module configured to emit white-color light, red-color light, green-color light, or blue-color light or light being a combination of two or more of said colors, or a group of four light sources configured each to emit white-color light, red-color light, green-color light, or blue-color light, or light being a combination of two or more of said colors.

In another embodiment of the present invention, the controllable light sources 240 may be disposed in each unmanned aerial vehicle 200 shown in FIG. 4 such that they emit light in opposite directions, in distinct directions, or in one and the same direction.

In yet another embodiment of the present invention, the controllable light sources 240 may be disposed in each unmanned aerial vehicle 200 shown in FIG. 4 such that they emit light in pairwise opposite directions, in distinct directions, or in one and the same direction.

In another embodiment of the present invention, the controllable light sources 240 may be disposed in each unmanned aerial vehicle 200 shown in FIG. 4 such that they emit light at predetermined angles, or each of same emit light in one of the following directions: in upward direction, in downward direction, in left direction, and in right direction.

In some embodiment of the present invention, the controllable light sources 240 in each of the unmanned aerial vehicles 200 according to FIG. 4 may be configured to lighten or illuminate the fuselage 210. In one variation of the given embodiment, the fuselage 210 of the unmanned aerial vehicle 200 lightened or illuminated by the light sources 240 may have the shape of a ball or is a ball-like framework. In another variation of the given embodiment, the fuselage 210 of the unmanned aerial vehicle 200 lightened or illuminated by the light sources 240 may have the shape of a spheroid or may be a framework in the form of a spheroid, wherein said framework may be further provided with a shell and in said framework there may be installed at least one air propulsion unit (in particular, instead of the propulsion units 220, instead of one of the propulsion units 220, or further to the propulsion units 220).

In some other embodiment of the present invention, at least one of the parking stations 100 may be provided with at least one storage facility (not shown) configured to accommodate the unmanned aerial vehicles 200 according to FIG. 4 to form a stack. In one variation of the given embodiment, the storage facility (not shown) may be provided with a wireless charging device (not shown) configured to charge the unmanned aerial vehicles 200 accommodated in the storage facility. In another variation of the given embodiment, the storage facility (not shown) may be provided with a charging device (not shown) and the unmanned aerial vehicle 200 according to FIG. 4 may be further configured to serially or parallelly electrically connect to one another while being accommodated in the storage facility so as to enable connection thereof to said charging device for simultaneous replenishment of the range thereof. In yet another variation of the given embodiment, the storage facility (not shown) may be provided with charging devices (not shown), and each of the unmanned aerial vehicles 200 according to FIG. 4 may be configured to connect to one of the charging devices while being accommodated in the storage facility, each of the unmanned aerial vehicles 200 according to FIG. 4 may be further provided with a gyroscope (not shown) configured to determine the spatial position of the unmanned aerial vehicle 200, and may be configured to alter the spatial position thereof in the storage facility (not shown) depending on the readings of the gyroscope.

Those skilled in the art would readily appreciate that some of the embodiments of the present invention described above with reference to FIG. 1 and FIG. 4 are also applicable to the unmanned aerial vehicles 200 shown in FIG. 2 and to the system 500 for visualizing an image which is shown in FIG. 1 and is based on the use of those unmanned aerial vehicles 200 according to FIG. 2.

Third Embodiment of Unmanned Aerial Vehicle

Figure 5:
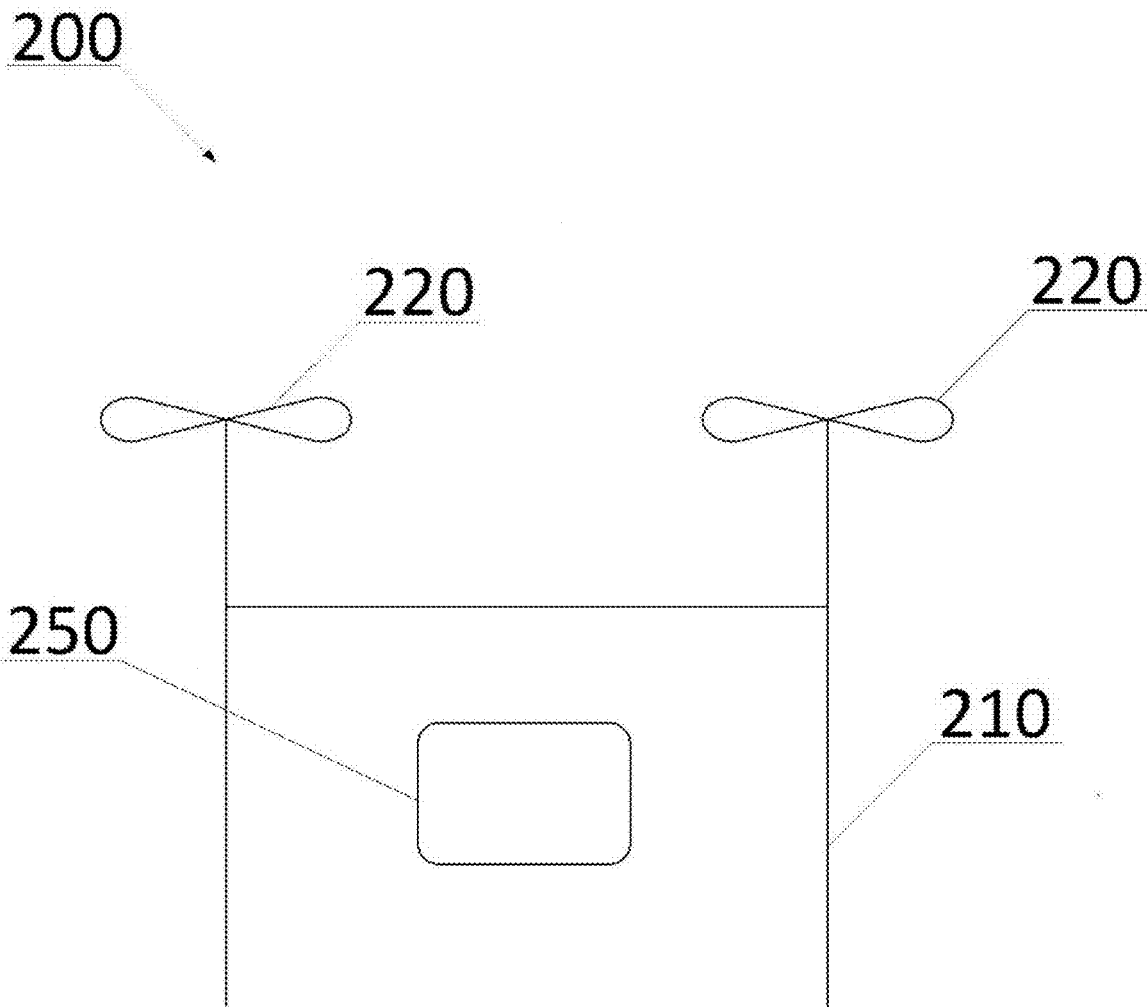
FIG. 5 is a schematic view of a third illustrative embodiment of an unmanned aerial vehicle used as part of the system for visualizing an image shown in FIG. 1.

FIG. 5 is a schematic view of yet another illustrative embodiment (third embodiment) of an unmanned aerial vehicle in the form of which there may be implemented each of the above unmanned aerial vehicles 200 used in the system 500 for visualizing an image shown in FIG. 1. The unmanned aerial vehicle 200 shown in FIG. 5 comprises a fuselage 210 and two propulsion units 220 installed or secured on the fuselage 210, and is provided with a screen 250 configured to project thereon an image. It should be noted that the unmanned aerial vehicle 200 shown in FIG. 5 may be comprised of one or more screens 250, in particular it may be comprised of two, three, four, five, six, seven, eight, nine, ten or more screens 250 configured each to project thereon an image. It should also be noted that the screen 250 may be installed or secured exteriorly to as well as in the interior of the fuselage 210 of the unmanned aerial vehicle according to FIG. 5, including using suitable connecting or fastening means known in the prior art.

While using the unmanned aerial vehicles 200 shown in FIG. 5 as part of the above system 500 for visualizing an image, the control device of the system 500 communicatively coupled to such unmanned aerial vehicles 200 substantially in a similar manner enables direction of at least a portion of said unmanned aerial vehicles 200 from the parking stations 100 to a predetermined region of space so as to enable disposition of each of said directed unmanned aerial vehicles 200 in a predetermined spatial location in accordance with a predetermined model of arrangement of unmanned aerial vehicles to form in the air at least one aggregate screen from said distinct screens. Thus, in a predetermined spatial region in the air there may be parallelly or sequentially formed two or more aggregate screens using the screens 250 being part of the unmanned aerial vehicles 200 directed by the control device of the system 500 from the corresponding parking stations 100 to said spatial region.

Furthermore, the system 500 for visualizing an image which is based on the use of the unmanned aerial vehicles 200 according to FIG. 5 further comprises a projection device (not shown) for projecting an image, which projection device is communicatively connected to the control device of the system 500, which control device is configured to control the operation of the projection device (not shown) and to communicate with that projection device (not shown).

Furthermore, the control device of the system 500 which is based on the use of the unmanned aerial vehicles 200 according to FIG. 5 is further configured to present data relating to an image to a projection device (not shown) so as to enable projection of said image on the above aggregate screen. Furthermore, similarly to the above unmanned aerial vehicles 200 shown in FIG. 2, the unmanned aerial vehicles 200 according to FIG. 5 whose screens form the aggregate screen form one or more movable strings of unmanned aerial vehicles, each of which strings similarly has the beginning thereof corresponding to the entry point into the plurality of unmanned aerial vehicles forming the aggregate screen and the end thereof corresponding to the exit point from the plurality of unmanned aerial vehicles forming the aggregate screen. Those skilled in the art would readily appreciate that some of the embodiments of the present invention described above with reference to FIG. 1, FIG. 2, FIG. 3 and FIG. 4 are also applicable to the unmanned aerial vehicles 200 shown in FIG. 5 and to the system 500 for visualizing an image which is based on the use of those unmanned aerial vehicles 200 according to FIG. 5.

Fourth Embodiment of Unmanned Aerial Vehicle

Figure 6:
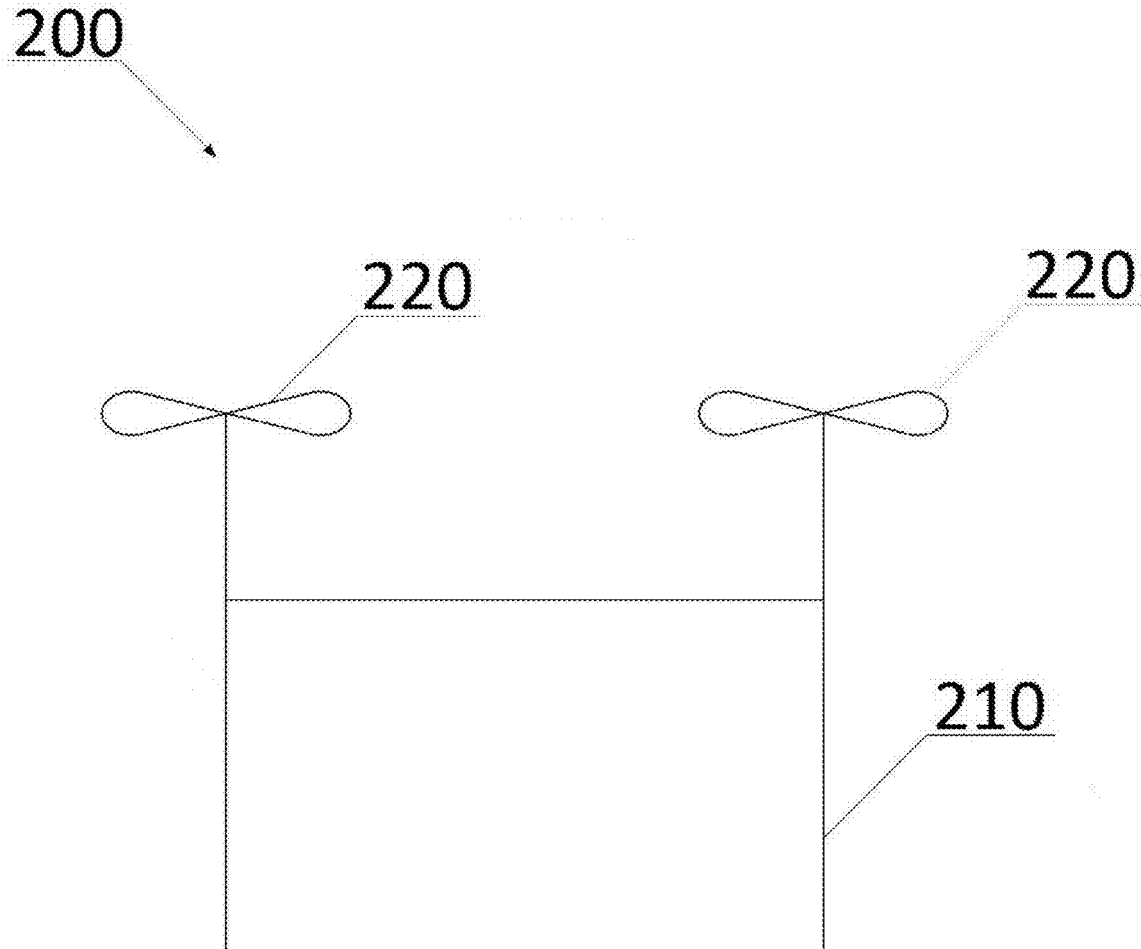
FIG. 6 is a schematic view of a fourth illustrative embodiment of an unmanned aerial vehicle used as part of the system for visualizing an image shown in FIG. 1.

FIG. 6 is a schematic view of yet another illustrative embodiment (fourth embodiment) of an unmanned aerial vehicle in the form of which there may be implemented each of the above unmanned aerial vehicles 200 used in the system 500 for visualizing an image shown in FIG. 1.

The unmanned aerial vehicle 200 shown in FIG. 6 comprises a fuselage 210 configured in the form of a housing or framework which performs the function of a surface for projecting thereon an image, and two propulsion units 220 installed or secured on or in the fuselage 210. In particular, the fuselage 210 in each of the unmanned aerial vehicles 200 according to FIG. 6 may be made of a material known in the prior art, suitable for projecting thereon an image.

While using the unmanned aerial vehicles 200 shown in FIG. 6 as part of the above system 500 for visualizing an image, the control device of the system 500 communicatively coupled to such unmanned aerial vehicles 200 substantially in a similar manner enables direction of at least a portion of said unmanned aerial vehicles 200 from the parking stations 100 to a predetermined region of space so as to enable disposition of each of said directed unmanned aerial vehicles 200 in a predetermined spatial location in accordance with a predetermined model of arrangement of unmanned aerial vehicles to form in the air at least one screen from said distinct fuselages 210. Thus, in a predetermined spatial region in the air there may be parallelly or sequentially formed two or more screens using the fuselages 210 being part of the unmanned aerial vehicles 200 directed by the control device of the system 500 from the corresponding parking stations 100 to said spatial region.

Furthermore, the system 500 for visualizing an image which is based on the use of the unmanned aerial vehicles 200 according to FIG. 6 further comprises a projection device (not shown) for projecting an image, which projection device is communicatively connected to the control module (not shown) of the unmanned aerial vehicle 200 according to FIG. 6, which control module, in turn, is configured to establish connection so as to communicate with the above control device (not shown) being part of the system 500, wherein said control module is further configured to control the operation of the projection device (not shown), including in response to data or control instructions received from the control device of the system 500.

Furthermore, the control device of the system 500 which is based on the use of the unmanned aerial vehicles 200 according to FIG. 6 is further configured to present data relating to an image to a projection device (not shown) so as to enable projection of said image on the above aggregate screen. Furthermore, similarly to the above unmanned aerial vehicles 200 shown in FIG. 2, the unmanned aerial vehicles 200 according to FIG. 6 whose fuselages 210 form a screen form one or more movable strings of unmanned aerial vehicles, each of which strings similarly has the beginning thereof corresponding to the entry point into the plurality of unmanned aerial vehicles forming the screen from the fuselages 210 thereof and the end thereof corresponding to the exit point from the plurality of unmanned aerial vehicles forming the screen from the fuselages 210 thereof. Those skilled in the art would readily appreciate that some of the embodiments of the present invention described above with reference to FIG. 1, FIG. 2, FIG. 3 and FIG. 4 are also applicable to the unmanned aerial vehicles 200 shown in FIG. 6 and to the system 500 for visualizing an image which is based on the use of those unmanned aerial vehicles 200 according to FIG. 6.

Fifth Embodiment of Unmanned Aerial Vehicle

Figure 7:
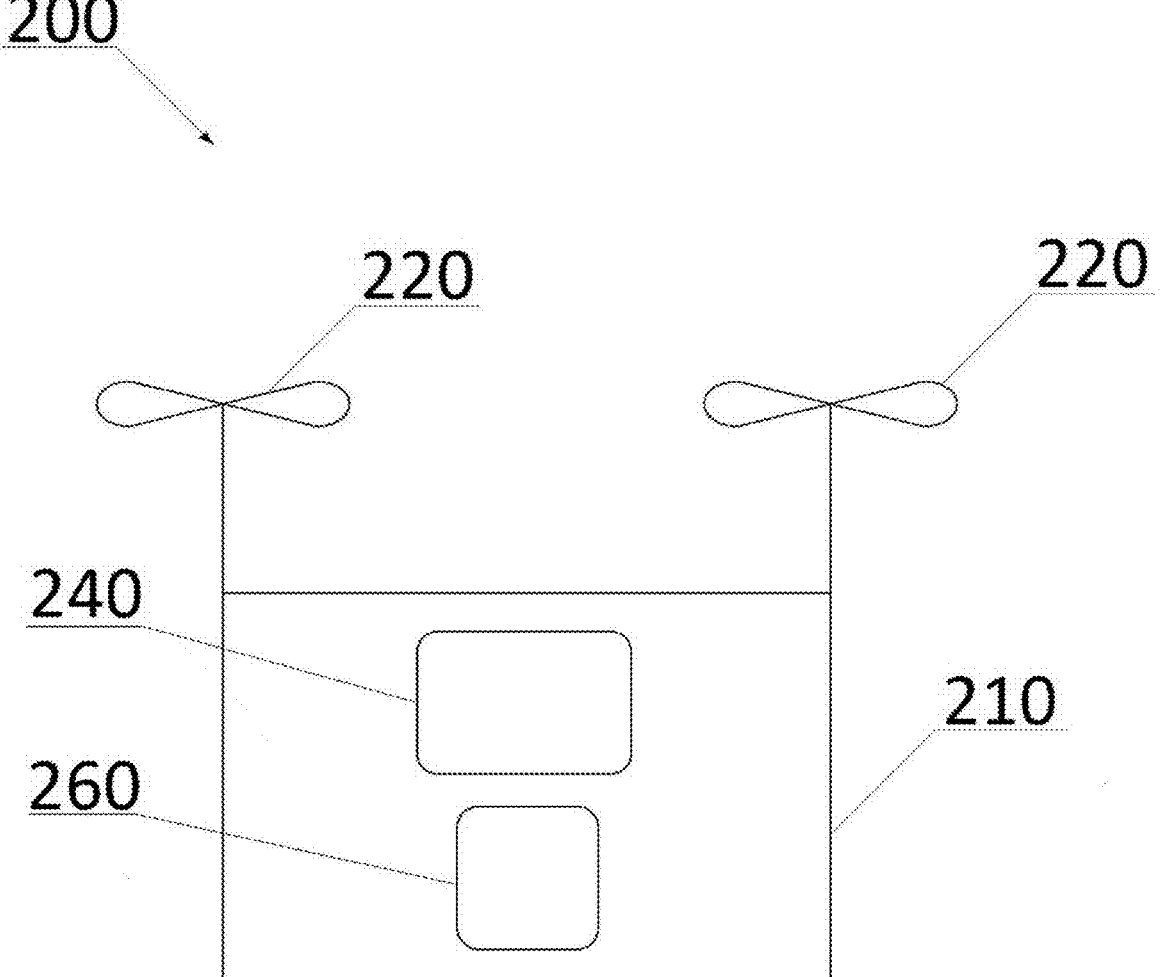
FIG. 7 is a schematic view of a fifth illustrative embodiment of an unmanned aerial vehicle used as part of the system for visualizing an image shown in FIG. 1.

FIG. 7 is a schematic view of yet another illustrative embodiment (fifth embodiment) of an unmanned aerial vehicle in the form of which there may be implemented each of the above unmanned aerial vehicles 200 used in the system 500 for visualizing an image shown in FIG. 1.

The unmanned aerial vehicle 200 shown in FIG. 7 comprises a fuselage 210 and two propulsion units 220 installed or secured on the fuselage 210, and is provided with a controllable light source 240 which is configured to emit light with a variable wavelength and a white light source 260 configured to emit white-color light, wherein the controllable light source 240 and the white light source 260 are communicatively coupled to a control module (not shown) of the unmanned aerial vehicle 200 which, in turn, is configured to establish a connection so as to enable exchange of data with the above control device (not shown) being part of the system 500, wherein said control module is further configured to control the operation of the controllable light source 240 and the white light source 260, including in response to data or control instructions received from the control device of the system 500. It should be noted that the unmanned aerial vehicle 200 shown in FIG. 7 may be comprised of one or more controllable light sources 240 (for example, two, three, four, five, six, seven, eight, nine, ten, or more controllable light sources 240) configured each to emit light with a variable wavelength, and one or more white light sources 260 (for example, two, three, four, five, six, seven, eight, nine, ten or more white light sources 260) configured each to emit white-color light. It should also be noted that the controllable light sources 240 and white-color light sources 260 may be installed or secured exteriorly to as well as in the interior of the fuselage 210 of an unmanned aerial vehicle, including using suitable connecting or fastening means known in the prior art.

While using the unmanned aerial vehicles 200 shown in FIG. 7 as part of the above system 500 for visualizing an image, the control device of the system 500 communicatively coupled to such unmanned aerial vehicles 200 substantially in a similar manner enables direction of at least a portion of said unmanned aerial vehicles 200 from the parking stations 100 to a predetermined region of space so as to enable disposition of each of said directed unmanned aerial vehicles 200 in a predetermined spatial location in accordance with a predetermined model of arrangement of unmanned aerial vehicles to form in the air at least one display from said light sources (i.e., from a mix or combination of the controllable light sources 240 and white-color light sources 260), wherein each of said light sources forming said at least one display corresponds to at least one pixel of said digital display. Thus, in a predetermined spatial region in the air there may be parallelly or sequentially formed two or more displays using the controllable light sources 240 and white-color light sources 260 being part of the unmanned aerial vehicles 200 directed by the control device of the system 500 from the corresponding parking stations 100 to said spatial region.

Furthermore, the control device of the system 500 is further configured to present data relating to an image to the unmanned aerial vehicles 200 according to FIG. 7 so to enable emission of white-color light by the while light sources 260 and to enable altering of emission wavelength of the controllable light sources 240 of said unmanned aerial vehicles 200 for displaying said image on a display formed from a mix or combination of controllable light sources 240 and white light sources 260. Furthermore, similarly to the above unmanned aerial vehicles 200 shown in FIG. 2, the unmanned aerial vehicles 200 according to FIG. 7 whose light sources form the display form one or more movable strings of unmanned aerial vehicles, each of which strings similarly has the beginning thereof corresponding to the entry point into the plurality of unmanned aerial vehicles forming the display and the end thereof corresponding to the exit point from the plurality of unmanned aerial vehicles forming the display. It should be noted that the control device of the system 500 may be further configured to alter the wavelength with which the light sources 240 forming the display emit light in real time so as to enable displaying of a predetermined static or dynamic image on said display. Furthermore, each of the controllable light sources 240 forming the display in each of the unmanned aerial vehicles 200 may be configured to emit white-color light, red-color light, green-color light, or blue-color light. Those skilled in the art would readily appreciate that some of the embodiments of the present invention described above with reference to FIG. 1, FIG. 2 and FIG. 3 are also applicable to the unmanned aerial vehicles 200 shown in FIG. 7 and to the system 500 for visualizing an image which is based on the use of those unmanned aerial vehicles 200 according to FIG. 7.

Sixth Embodiment of Unmanned Aerial Vehicle

Figure 8:
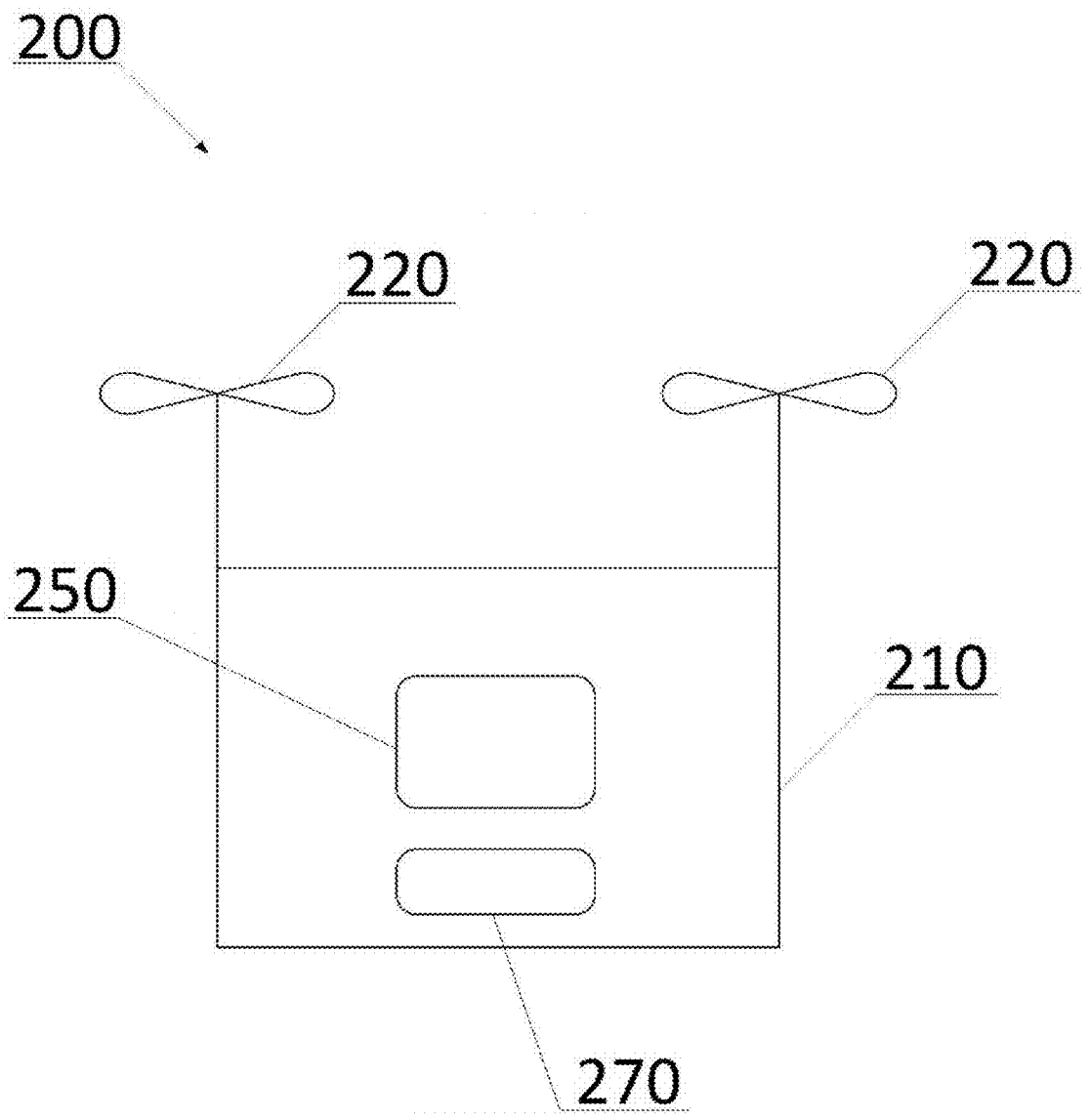
FIG. 8 is a schematic view of a sixth illustrative embodiment of an unmanned aerial vehicle used as part of the system for visualizing an image shown in FIG. 1.

FIG. 8 is a schematic view of yet another illustrative embodiment (sixth embodiment) of an unmanned aerial vehicle in the form of which there may be implemented each of the above unmanned aerial vehicles 200 used in the system 500 for visualizing an image shown in FIG. 1. The unmanned aerial vehicle 200 shown in FIG. 8 comprises a fuselage 210 and two propulsion units 220 installed or secured on the fuselage 210, and is provided with a screen 250 configured to project thereon an image and a projector or projection device 270 installed or disposed in or on the fuselage 210 so as to project an image onto the screen 250. It should be noted that the unmanned aerial vehicle 200 shown in FIG. 8 may be comprised of one or more screens 250, in particular it may be comprised of two, three, four, five, six, seven, eight, nine, ten or more screens 250 configured each to project thereon an image, whereby, for projecting an image onto said screens 250, there may be used one and the same projection device 270 or two or more projection devices 270. It should also be noted that the unmanned aerial vehicle 200 shown in FIG. 8 may be comprised of one or more projection devices 270, in particular, one, two, three, four, five, six, seven, eight, nine, ten or more projection devices 270 configured each to project an image onto at least one of the screens 250, on at least two screens 250 or multiple screens 250. Furthermore, the screen 250 may be installed or secured exteriorly to as well as in the interior of the fuselage 210 of the unmanned aerial vehicle according to FIG. 8, including using suitable connecting or fastening means known in the prior art.

While using the unmanned aerial vehicles 200 shown in FIG. 8 as part of the above system 500 for visualizing an image, the control device of the system 500 communicatively coupled to such unmanned aerial vehicles 200 substantially in a similar manner enables direction of at least a portion of said unmanned aerial vehicles 200 from the parking stations 100 to a predetermined region of space so as to enable disposition of each of said directed unmanned aerial vehicles 200 in a predetermined spatial location in accordance with a predetermined model of arrangement of unmanned aerial vehicles to form in the air at least one aggregate screen from said distinct screens. Thus, in a predetermined spatial region in the air there may be parallelly or sequentially formed two or more aggregate screens using the screens 250 being part of the unmanned aerial vehicles 200 directed by the control device of the system 500 from the corresponding parking stations 100 to said spatial region.

Furthermore, the projection device 270 in each of the unmanned aerial vehicles 200 shown in FIG. 8 is communicatively coupled to a control module (not shown) of that unmanned aerial vehicle 200 according to FIG. 8 which, in turn, is configured to establish a connection so as to enable exchange of data with the above control device (not shown) being part of the system 500, wherein said control module is further configured to control the operation of the projection device (not shown), including in response to data or control instructions received from the control device of the system 500.

Furthermore, the control device of the system 500 which is based on the use of the unmanned aerial vehicles 200 according to FIG. 8 is further configured to present data relating to an image to the projection device 270 of each of the unmanned aerial vehicles 200 so as to enable projection of said image on the above aggregate screen. Furthermore, similarly to the above unmanned aerial vehicles 200 shown in FIG. 2, the unmanned aerial vehicles 200 according to FIG. 8 whose screens form the aggregate screen form one or more movable strings of unmanned aerial vehicles, each of which strings similarly has the beginning thereof corresponding to the entry point into the plurality of unmanned aerial vehicles forming the aggregate screen and the end thereof corresponding to the exit point from the plurality of unmanned aerial vehicles forming the aggregate screen. Those skilled in the art would readily appreciate that some of the embodiments of the present invention described above with reference to FIG. 1, FIG. 2, FIG. 3 and FIG. 4 are also applicable to the unmanned aerial vehicles 200 shown in FIG. 8 and to the system 500 for visualizing an image which is based on the use of those unmanned aerial vehicles 200 according to FIG. 8.

Seventh Embodiment of Unmanned Aerial Vehicle

Figure 9:
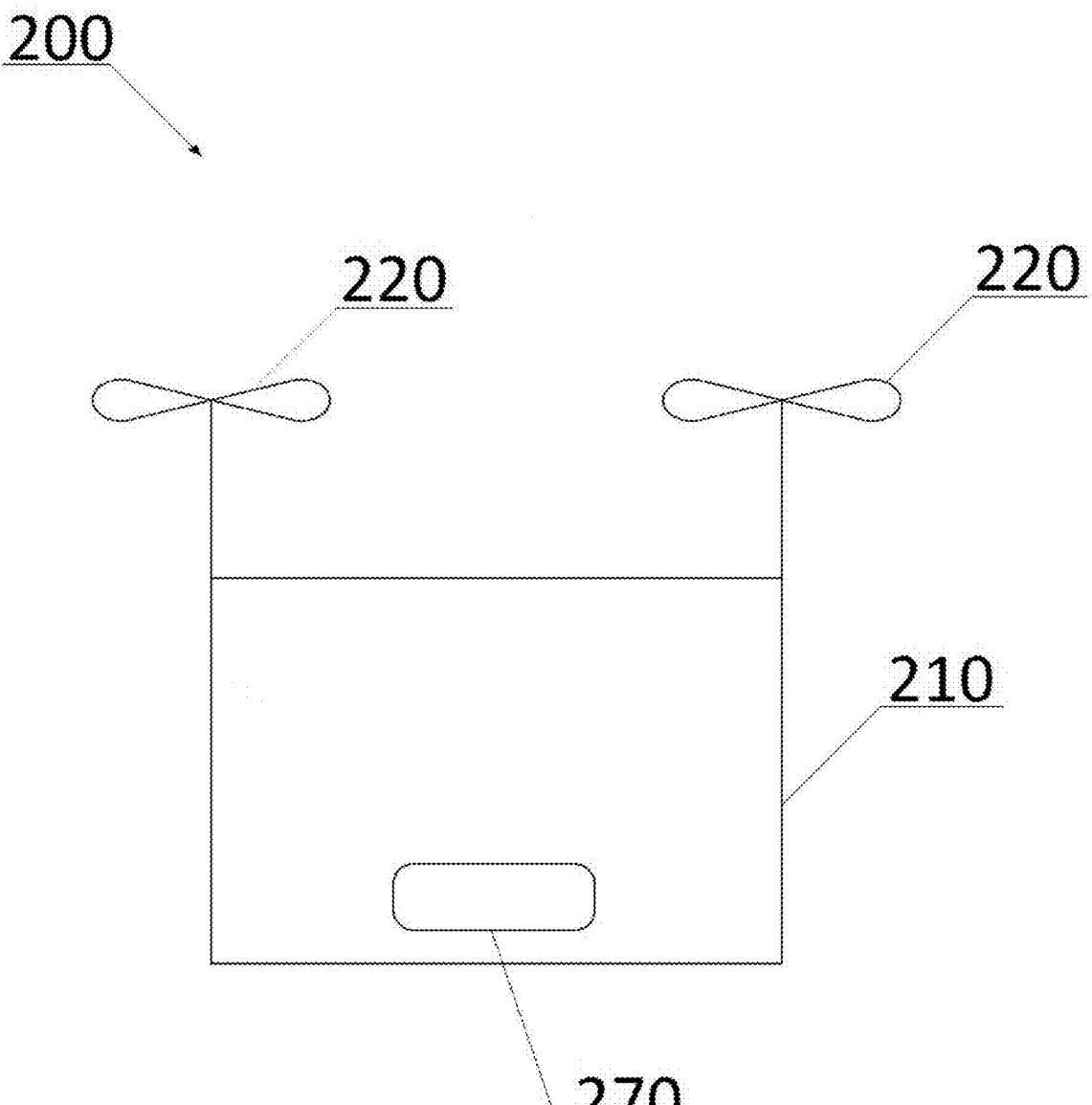
FIG. 9 is a schematic view of a seventh illustrative embodiment of an unmanned aerial vehicle used as part of the system for visualizing an image shown in FIG. 1.

FIG. 9 is a schematic view of yet another illustrative embodiment (seventh embodiment) of an unmanned aerial vehicle in the form of which there may be implemented each of the above unmanned aerial vehicles 200 used in the system 500 for visualizing an image shown in FIG. 1.

The unmanned aerial vehicle 200 shown in FIG. 9 comprises a fuselage 210 configured in the form of a housing or framework which performs the function of a surface for projecting thereon an image, and two propulsion units 220 installed or secured on or in the fuselage 210. In particular, the fuselage 210 in each of the unmanned aerial vehicles 200 according to FIG. 9 may be made of a material known in the prior art, suitable for projecting thereon an image. Furthermore, the unmanned aerial vehicle 200 shown in FIG. 9 is comprised of a projector or projection device 270 installed or disposed in or on the fuselage 210 so as to project an image onto the fuselage 210 of that unmanned aerial vehicle 200. It should be noted that the unmanned aerial vehicle 200 shown in FIG. 9 may be comprised of one or more projection devices 270, in particular, one, two, three, four, five, six, seven, eight, nine, ten or more projection devices 270 configured each to project an image onto at least one region of the fuselage 210, at least two regions of the fuselage, or multiple distinct regions of the fuselage 210.

While using the unmanned aerial vehicles 200 shown in FIG. 9 as part of the above system 500 for visualizing an image, the control device of the system 500 communicatively coupled to such unmanned aerial vehicles 200 substantially in a similar manner enables direction of at least a portion of said unmanned aerial vehicles 200 from the parking stations 100 to a predetermined region of space so as to enable disposition of each of said directed unmanned aerial vehicles 200 in a predetermined spatial location in accordance with a predetermined model of arrangement of unmanned aerial vehicles to form in the air at least one screen from the fuselages 210 of said directed unmanned aerial vehicles 200. Thus, in a predetermined spatial region in the air there may be parallelly or sequentially formed two or more screens using the fuselages 210 being part of the unmanned aerial vehicles 200 directed by the control device of the system 500 from the corresponding parking stations 100 to said spatial region.

Furthermore, the projection device 270 in each of the unmanned aerial vehicles 200 shown in FIG. 9 is communicatively coupled to a control module (not shown) of that unmanned aerial vehicle 200 according to FIG. 8 which, in turn, is configured to establish a connection so as to enable exchange of data with the above control device (not shown) being part of the system 500, wherein said control module is further configured to control the operation of the projection device (not shown), including in response to data or control instructions received from the control device of the system 500.

Furthermore, the control device of the system 500 which is based on the use of the unmanned aerial vehicles 200 according to FIG. 9 is further configured to present data relating to an image to the projection device 270 of each of the unmanned aerial vehicles 200 so as to enable projection of said image on the above screen. Furthermore, similarly to the above unmanned aerial vehicles 200 shown in FIG. 2, the unmanned aerial vehicles 200 according to FIG. 9 whose fuselages 210 form a screen form one or more movable strings of unmanned aerial vehicles, each of which strings similarly has the beginning thereof corresponding to the entry point into the plurality of unmanned aerial vehicles forming the screen from the fuselages 210 thereof and the end thereof corresponding to the exit point from the plurality of unmanned aerial vehicles forming the screen from the fuselages 210 thereof. Those skilled in the art would readily appreciate that some of the embodiments of the present invention described above with reference to FIG. 1, FIG. 2, FIG. 3 and FIG. 4 are also applicable to the unmanned aerial vehicles 200 shown in FIG. 9 and to the system 500 for visualizing an image which is based on the use of those unmanned aerial vehicles 200 according to FIG. 9.

Eighth Embodiment of Unmanned Aerial Vehicle

Figure 10:
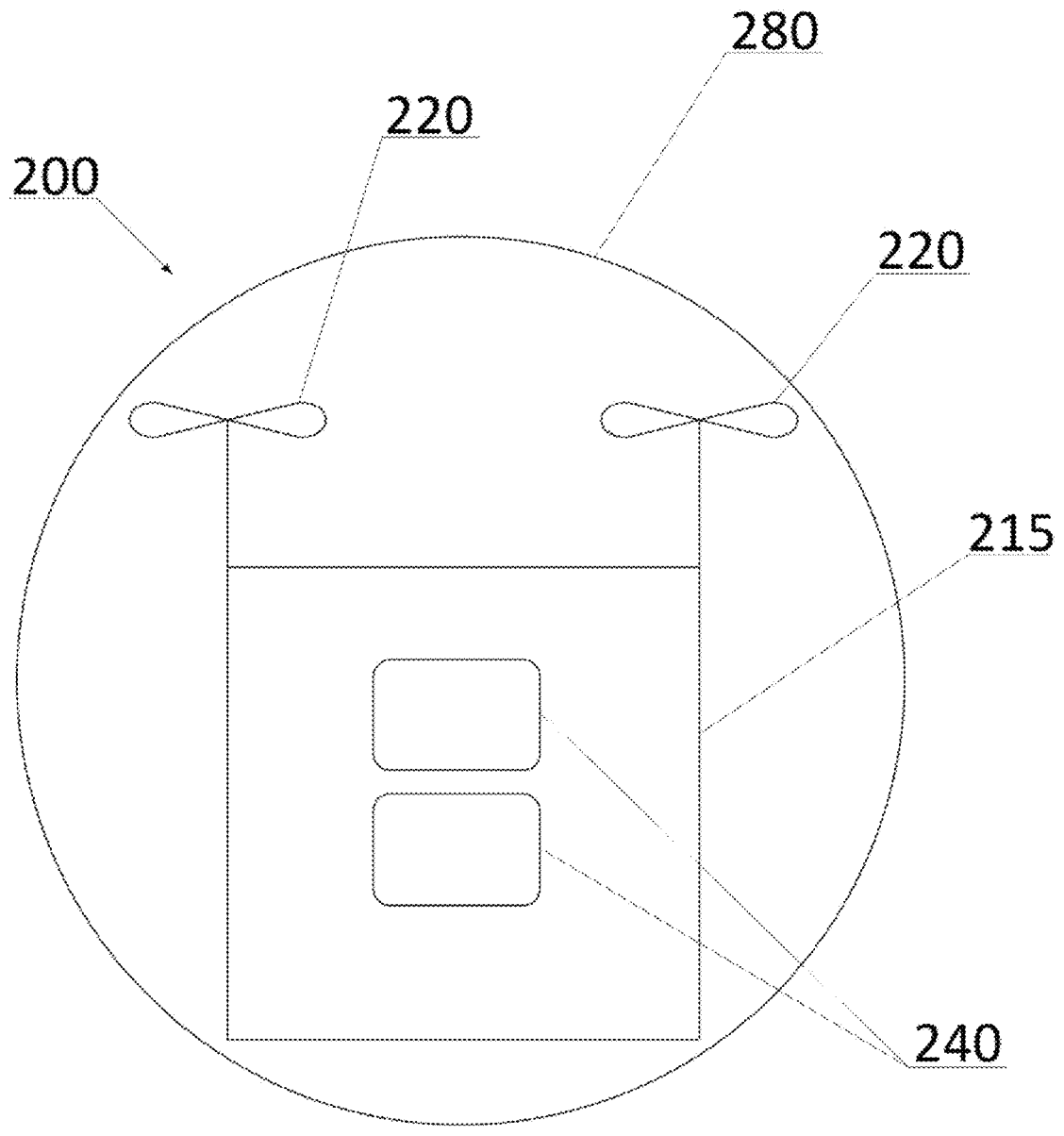
FIG. 10 is a schematic view of an eighth illustrative embodiment of an unmanned aerial vehicle used as part of the system for visualizing an image shown in FIG. 1.

FIG. 10 is a schematic view of yet another illustrative embodiment (eighth embodiment) of an unmanned aerial vehicle in the form of which there may be implemented each of the above unmanned aerial vehicles 200 used in the system 500 for visualizing an image shown in FIG. 1.

The unmanned aerial vehicle 200 shown in FIG. 10 comprises an internal housing 215 which may be configured in the form of a framework, frame, skeleton, or other load-carrying structure, and two propulsion units 220 installed or secured on or in the internal housing 215. In particular, the internal housing 215 in each of the unmanned aerial vehicles 200 according to FIG. 10 may be made of any suitable material known in the prior art, for example, aluminium. Furthermore, the unmanned aerial vehicle 200 shown in FIG. 10 may be provided with one or more propulsion units 220 enabling movement by air or flight of said unmanned aerial vehicle 200 by, for example, one, two, three, four, five, six, seven, eight, nine, ten, and more propulsion units 220, wherein the quantity of propulsion units 220 may depend, for example, on the mass, shape, and/or size of each specific unmanned aerial vehicle 200 according to FIG. 10 individually.

Furthermore, the unmanned aerial vehicle 200 shown in FIG. 10 comprises an external housing 280 in which there are enclosed at least the above internal housing 215 and propulsion units 220. Thus, as shown in FIG. 10, the external housing 280 substantially encompasses or surrounds the internal housing 215 with the propulsion units 220 so that the internal housing 215 and the propulsion units 220 are present within the internal space of the external housing 280. It should be noted that the external housing 280 in the unmanned aerial vehicle 200 according to FIG. 10 may at least partially surround the internal housing 215 with the propulsion units 220 (i.e., may be configured discontinuous) or may completely surround the internal housing 215 with the propulsion units 220 (i.e., may be configured continuous). It should also be noted that the external housing 280 in the unmanned aerial vehicle 200 according to FIG. 10 may be configured, for example, in the form of a framework, frame, skeleton, or any other suitable structure known in the prior art and used as an external housing for unmanned aerial vehicles similar to the unmanned aerial vehicles 200 described herein.

Furthermore, the unmanned aerial vehicle 200 shown in FIG. 10 comprises two controllable light sources 240, each of which is configured to emit light with a variable wavelength so as to enable lightening or illumination of the external housing 280, in particular of at least one portion or one region of that external housing 280. Thus, the external housing 280 in the unmanned aerial vehicle 200 according to FIG. 10 substantially performs the function of a surface for projecting thereon an image, in particular at least a portion of the image 400. It should be noted that the unmanned aerial vehicle 200 shown in FIG. 4 may be comprised of three or more controllable light sources 240 (for example, three, four, five, six, seven, eight, nine, ten, or more controllable light sources 240) configured each to emit light with a variable wavelength. It should also be noted that the controllable light sources 240 may be installed or secured exteriorly to as well as in the interior of the internal housing 215 of an unmanned aerial vehicle, including using suitable connecting or fastening means known in the prior art. Furthermore, the external housing 280 in the unmanned aerial vehicle 200 according to FIG. 10 may be made of any material known in the prior art, suitable for projecting thereon an image.

Furthermore, the unmanned aerial vehicle 200 shown in FIG. 10 is also comprised of a control module (not shown) which is operably coupled to controllable light sources 240 so as to enable altering of emission wavelength of said light sources 240 for displaying at least a portion of a static or dynamic image by means of said light sources 240 on the surface of the external housing 280. In one of the embodiments of the present invention, onto the surface of the external housing 280 of each of the unmanned aerial vehicles 200 there may be applied a special coating, onto which the controllable light sources 240 of that unmanned aerial vehicle 200 will emit or direct pencils or beams of light with distinct wavelength so as to provide for projection of a predetermined image onto said coating. In another embodiment of the present invention, to the surface of the external housing 280 of each of the unmanned aerial vehicles 200 there may be attached or fitted, to form an integral whole, a special element or component (for example, in the form of a plate, cloth, etc.) made of any suitable material known in the prior art onto which the controllable light sources 240 of that unmanned aerial vehicle 200 will emit or direct pencils or beams of light with distinct wavelength so as to provide for projection of a predetermined image onto said coating.

While using the unmanned aerial vehicles 200 shown in FIG. 10 as part of the above system 500 for visualizing an image, the control device of the system 500 communicatively coupled to such unmanned aerial vehicles 200 substantially in a similar manner enables direction of at least a portion of said unmanned aerial vehicles 200 from the parking stations 100 to a predetermined region of space so as to enable disposition of each of said directed unmanned aerial vehicles 200 in a predetermined spatial location in accordance with a predetermined model of arrangement of unmanned aerial vehicles to form in the air at least one display from the external housings 280 of said directed unmanned aerial vehicles 200. Thus, in a predetermined spatial region in the air there may be parallelly or sequentially formed two or more displays using the external housings 280 being part of the unmanned aerial vehicles 200 directed by the control device of the system 500 from the corresponding parking stations 100 to said spatial region.

Furthermore, the controllable light sources 240 in each of the unmanned aerial vehicles 200 shown in FIG. 9 are communicatively coupled each to a control module (not shown) of that unmanned aerial vehicle 200 according to FIG. 10 which, in turn, is configured to establish a connection so as to enable exchange of data with the above control device (not shown) being part of the system 500, wherein said control module is further configured to control the operation of each of the controllable light sources 240, including in response to data or control instructions received from the control device of the system 500.

Furthermore, similarly to the above unmanned aerial vehicles 200 shown in FIG. 2, the unmanned aerial vehicles 200 according to FIG. 10 whose external housings 280 form a display form one or more movable strings of unmanned aerial vehicles, each of which strings similarly has the beginning thereof corresponding to the entry point into the plurality of unmanned aerial vehicles forming the display from the external housings 280 thereof and the end thereof corresponding to the exit point from the plurality of unmanned aerial vehicles forming the display from the external housings 280 thereof.

In one of the embodiments of the present invention, the external housing 280 in each of the unmanned aerial vehicles 200 according to FIG. 10 may have the shape of a sphere, may be a ball-like framework which further may be provided with a shell configured to allow projection thereon of an image using the controllable light sources 240, the image being visually visible from the external side of said shell. In one variation of the given embodiment, the shell of the ball-like framework, in the form of which there may be configured the external housing 280 in each unmanned aerial vehicle 200 according to FIG. 10 being part of the system 500, may be connected to said framework so as to rotate with respect thereto and to lighten or illuminate said shell by the controllable light sources 240 of said unmanned aerial vehicle 200.

Those skilled in the art would readily appreciate that some of the embodiments of the present invention described above with reference to FIG. 1, FIG. 2, FIG. 3 and FIG. 4 are also applicable to the unmanned aerial vehicles 200 shown in FIG. 10 and to the system 500 for visualizing an image which is based on the use of those unmanned aerial vehicles 200 according to FIG. 10.

Figure 11:
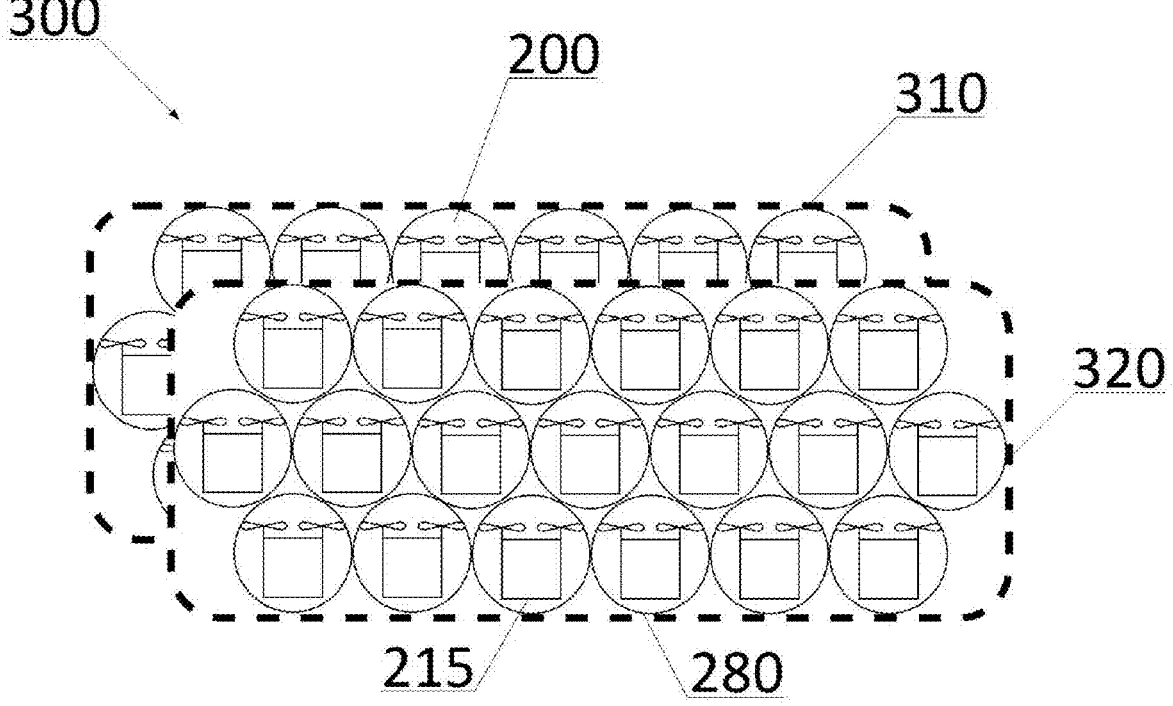
FIG. 11 is a schematic view of an illustrative embodiment of a multi-layer aggregate display formed using the unmanned aerial vehicles according to FIG. 10.

FIG. 11 is a schematic view of one of the illustrative embodiments of a multi-layer aggregate display 300 formed while implementing the image visualisation system 500 shown in FIG. 1 using the above unmanned aerial vehicles 200 shown in FIG. 10.

The unmanned aerial vehicles 200 according to FIG. 10 directed to a predetermined region of space may be divided into two groups, wherein the displays 230 of the unmanned aerial vehicles 200 according to FIG. 10 of the first group may form the first layer 310 of the aggregate display 300, and the displays 230 of the unmanned aerial vehicles 200 according to FIG. 10 of the second group may form the second layer 320 of the aggregate display. In particular, the first layer 310 of the aggregate display 300 may be configured generally parallel to the second layer 320 of the aggregate display 300 (see FIG. 11).

Furthermore, the control device of the system 500 may enable displaying, on the displays 230 of the first layer 310 of the aggregate display 300, of an image different from or coinciding with an image displayed on the displays 230 of the second layer 320 of the aggregate display 300. Alternatively, the control device of the system 500 may enable displaying of the main image on the displays 230 of the first layer 310 of the aggregate display 300 and may enable displaying, on the displays 230 of the second layer 320 of the aggregate display 300, of other image being a background image for said main image.

Functioning of System for Visualizing Image

FIG. 1 also shows for illustrative purposes six essential positions (A, B, C, D, E, F) which each unmanned aerial vehicle 200 in the system 500 for visualizing an image may take while moving by air or flying from a starting point of flight to an end point of flight in a single flight cycle of such unmanned aerial vehicle 200.

In the position (A) in FIG. 1, each of the unmanned aerial vehicles 200 being part of the system 500 is accommodated for the purpose of parking or replenishing the range in a corresponding one of the parking stations 100 being part of the system 500 and awaits the receipt of navigation and/or control commands from the control device being part of the system 500. The position (A) substantially corresponds to the starting point of movement by air or flight of said unmanned aerial vehicle 200 and corresponds to the beginning of a cycle of movement by air or flight of such unmanned aerial vehicle 200.

In the position (B) in FIG. 1, which each of the unmanned aerial vehicles 200 being part of the system 500 may take after being present in the position (A) in response to navigation commands of the control device of the system 500, which, in turn, may be generated, for example, in response to a request of the user device, the unmanned aerial vehicles 200 with a full range (if used for the first time in the given cycle) or a replenished range (if used repeatedly in the given cycle) in a required quantity corresponding to a predetermined model of arrangement of unmanned aerial vehicles and sufficient for forming an image 400 are released from the corresponding parking stations 100, wherein the departure of the unmanned aerial vehicles 200 from one and the same parking station 100 may be performed sequentially, and the departure of unmanned aerial vehicles 200 from distinct parking stations 100 may be performed substantially simultaneously), thus causing formation in the air, in a region of space located at some distance from the parking stations 100, of a group of two, three or more unmanned aerial vehicles (see. FIG. 1 on the left).

In the position (C) in FIG. 1, which each of the unmanned aerial vehicles 200 being part of the system 500 may take after being present in the position (B) in response to navigation commands of the control device of the system 500, the unmanned aerial vehicles 200 of the group of unmanned aerial vehicles formed in the above position (B) sequentially or by turns line up into a string of approaching unmanned aerial vehicles, the string being directed or headed in the direction of the entry point into the plurality of unmanned aerial vehicles forming the aggregate display 300 in a predetermined region of space.

In the position (D) in FIG. 1, which each of the unmanned aerial vehicles 200 being part of the system 500 may take after being present in the position (C) in response to the navigation commands of the control device of the system 500, each of the unmanned aerial vehicles 200 from the string of approaching unmanned aerial vehicles which is formed in the above position (C) enters through the entry point the plurality of unmanned aerial vehicles forming the aggregate display 300 in a predetermined region of space so as to provide for, first, occupying of a spatial location corresponding to the beginning of the very first row of the plurality of rows forming the array of unmanned aerial vehicles 200 used to form the aggregate display 300, and corresponding to the beginning of the movable string of unmanned aerial vehicles, in which string the unmanned aerial vehicles 200 forming the aggregate display 300 move one after another along a predetermined trajectory towards the end of the very last row of said plurality of rows forming the array of unmanned aerial vehicles 200. It should be noted that the control module of the unmanned aerial vehicle 200 or the control device of the system 500 further presents control commands to the display 230 of that unmanned aerial vehicle 200 for turning same on at the moment of time when said unmanned aerial vehicle 200 is in the initial position in the movable string thereof while entering through the entry point. In the course of moving as part of the movable string of unmanned aerial vehicles within the contours of the aggregate display 300, each of the unmanned aerial vehicles 200 forming the aggregate display 300 sequentially takes new spatial locations in accordance with said trajectory of movement of said movable string so as to provide for transition to a next row upon reaching the end of a previous row until said unmanned aerial vehicle 200 reaches the end of the last row in the array of unmanned aerial vehicles 200, the end corresponding to the exit point from the plurality of unmanned aerial vehicles forming the aggregate display 300 in a predetermined region of space and corresponding to the end of the movable string of unmanned aerial vehicles, in which the unmanned aerial vehicles 200 form the aggregate display 300.

In the position (E) in FIG. 1, which each of the unmanned aerial vehicles 200 being part of the system 500 may take after being present in the position (D) in response to navigation commands of the control device of the system 500, the unmanned aerial vehicles 200 sequentially or by turns exiting through the exit point from the plurality of the unmanned aerial vehicles forming the aggregate display 300 line up into a string of unmanned aerial vehicles directed or headed in the direction of the parking stations 100. It should be noted that the control module of the unmanned aerial vehicle 200 or the control device of the system 500 further presents control commands to the display 230 of that unmanned aerial vehicle 200 for turning same on or darkening at the moment of time when said unmanned aerial vehicle 200 exits the movable string thereof through the exit point from the plurality of unmanned aerial vehicles forming the aggregate display 300.

In the position (F) in FIG. 1, which each of the unmanned aerial vehicles 200 being part of the system 500 may take after being present in the position (E) in response to the navigation commands of the control device of the system 500, the unmanned aerial vehicles 200 of the string of returning unmanned aerial vehicle formed from the unmanned aerial vehicles 200 having exited through the exit point from the plurality of unmanned aerial vehicles forming the aggregate display 300, while approaching the parking stations 100, leave that string of returning unmanned aerial vehicles to form at least one group of two, three or more returning unmanned aerial vehicles 200.

Finally, as shown in FIG. 1, the control device of the system 500 enables substantially simultaneous or sequential direction of the unmanned aerial vehicles 200 to be replaced from the group of returning unmanned aerial vehicles having been formed in the above position (E) to the corresponding parking stations 100 with free or unoccupied charging devices. Thus, finally, each of the unmanned aerial vehicles 200 again takes the position (A), before which performed is turning off of any additional aircraft engines or propulsion units (if any) and folding of a wing/wings (if any), followed by transition to performing the landing or landing procedure of that unmanned aerial vehicle 200 into or onto the corresponding one of the parking stations 100, and in which said unmanned aerial vehicle 200 is present in an unmovable state with turned off propulsion units 220. Upon taking the position (A), the power supply unit of the unmanned aerial vehicle 200 is connected to the charging device of the parking station 100 so as to enable replenishment of the range of that unmanned aerial vehicle 200 and enable subsequent storage of that unmanned aerial vehicle 200 in the parking station until the moment of receipt, from the control device of the system 500, of new navigation commands for takeoff from the parking station 100 thereof and direction to a predetermined region of space to form therein the aggregate display 300.

Method for Visualizing Image

FIG. 12 is a block diagram illustrating the basic operations of a method 600 for visualizing an image, wherein the method 600 for visualizing an image shown in FIG. 12 may be performed using a system 500 for visualizing an image which is based on the unmanned aerial vehicle shown in FIG. 2 and which may be implemented in accordance with any one of the relevant embodiments of the present invention described herein (i.e., the embodiments of the present invention pertaining to the unmanned aerial vehicle 200 according to FIG. 2 and the embodiments of the system 500 for visualizing an image which is based on the use of the unmanned aerial vehicles 200 according to FIG. 2 for visualizing a desired image).

In particular, the method 600 for visualizing an image shown in FIG. 12 comprises the following four main operations or the following four main steps 610, 620, 630 and 640, wherein the step 610 comprises presenting navigation commands and a predetermined model of arrangement of unmanned aerial vehicles to the unmanned aerial vehicles 200, each of which is provided with at least one display 230; the step 620 comprises, in response to said navigation commands, directing said unmanned aerial vehicles 200 from at least one parking station 100 to a predetermined region of space so as to enable disposition of each of said directed unmanned aerial vehicles 200 in a predetermined spatial location in accordance with said model of arrangement of unmanned aerial vehicles to form in the air at least one aggregate display 300 from said displays 230; the step 630 comprises presenting data relating a static or dynamic image to the unmanned aerial vehicles 200 so as to enable displaying of said image 400 on said aggregate display 300; and the step 640 comprises presenting navigation commands to said unmanned aerial vehicles 200 whose displays 230 form said aggregate display 300 so as to enable movement thereof as part of said aggregate display to form at least one movable string of unmanned aerial vehicles.

In one of the embodiments of the present invention, the method 600 for visualizing an image shown in FIG. 12 may comprise additional steps of: (i) receiving, by means of the control device of the system 500, data relating to the range from each of the unmanned aerial vehicles 200 whose displays 230 form the aggregate display 300; (ii) detecting, by means of the control device of the system 500, each discharged unmanned aerial vehicle whose range is less than a threshold value among said unmanned aerial vehicles 200, based on said data relating to the range; and (iii) directing, by means of the control device of the system 500, a charged unmanned aerial vehicle from the parking station 100 for replacing said discharged unmanned aerial vehicle.

In another embodiment, the method 600 for visualizing an image shown in FIG. 12 further comprises directing the discharged unmanned aerial vehicle to the parking station so as to enable replenishment of the range thereof. Furthermore, the method 600 for visualizing an image shown in FIG. 12 further comprises directing the unmanned aerial vehicle with a replenished range to a predetermined region of space so as to enable replacement of one of the discharged unmanned aerial vehicles whose displays 230 form the aggregate display 300.

In yet another embodiment, the method 600 for visualizing an image shown in FIG. 12 further comprises presenting, by means of the control device of the system 500, navigation commands to the unmanned aerial vehicles 200 whose displays 230 form the aggregate display 300 so as to enable rearrangement of those unmanned aerial vehicles 200 for altering the shape and/or size of the aggregate display 300.

In another embodiment, the method 600 for visualizing an image shown in FIG. 12 further comprises presenting, by means of the control device of the system 500, navigation commands to the unmanned aerial vehicles 200 whose displays 230 form the aggregate display 300 so as to enable rearrangement of those unmanned aerial vehicles 200 for dividing said aggregate display 300 into at least two individual display portions for visualizing an image.

In some embodiment, in the method 600 for visualizing an image shown in FIG. 12, the directed unmanned aerial vehicles 200 while being disposed in predetermined spatial locations in accordance with a predetermined model of arrangement of unmanned aerial vehicles form in the air at least two aggregate displays 300.

In some other embodiment, the method 600 for visualizing an image shown in FIG. 12 further comprises presenting, by means of the control device of the system 500, navigation commands to the unmanned aerial vehicles 200 whose displays 230 form the aggregate display 300 so as to enable rearrangement of those unmanned aerial vehicles 200 for combining two or more (multiple) aggregate displays 300 into at least one integral display portion for visualizing an image.

FIG. 13 is a block diagram illustrating the basic operations of a method 650 for visualizing an image, wherein the method 650 for visualizing an image shown in FIG. 13 may be performed using a system 500 for visualizing an image which is based on the unmanned aerial vehicle shown in FIG. 4 and which may be implemented in accordance with any one of the relevant embodiments of the present invention described herein (i.e., the embodiments of the present invention pertaining to the unmanned aerial vehicle 200 according to FIG. 4 and the embodiments of the system 500 for visualizing an image which is based on the use of the unmanned aerial vehicles 200 according to FIG. 4 for visualizing a desired image).

In particular, the method 650 for visualizing an image shown in FIG. 13 comprises the following four main operations or the following four main steps 660, 670, 680 and 690, wherein the step 660 comprises presenting navigation commands and a predetermined model of arrangement of unmanned aerial vehicles to unmanned aerial vehicles 200, each of which is provided with at least two controllable light sources 240, each of which is configured to emit light with a variable wavelength; the step 670 comprises, in response to said navigation commands, directing said unmanned aerial vehicles 200 from at least one parking station 100 to a predetermined region of space so as to enable disposition of each of said directed unmanned aerial vehicles 200 in a predetermined spatial location in accordance with said model of arrangement of unmanned aerial vehicles to form in the air at least one display from said controllable light sources 240, each of which corresponds to at least one pixel of said display; the step 680 comprises presenting data relating to a static or dynamic image to the unmanned aerial vehicles 200 so as to enable altering of the emission wavelength of the light sources of said unmanned aerial vehicles 200 for displaying said image 400 on said display; and the step 690 comprises presenting navigation commands to said unmanned aerial vehicles 200 whose light sources 240 form said display so as to enable movement thereof as part of said display to form at least one movable string of unmanned aerial vehicles.

FIG. 14 is a block diagram illustrating the basic operations of a method 700 for visualizing an image, wherein the method 700 for visualizing an image shown in FIG. 14 may be performed using a system 500 for visualizing an image which is based on the unmanned aerial vehicle shown in FIG. 7 and which may be implemented in accordance with any one of the relevant embodiments of the present invention described herein (i.e., the embodiments of the present invention pertaining to the unmanned aerial vehicle 200 according to FIG. 7 and the embodiments of the system 500 for visualizing an image which is based on the use of the unmanned aerial vehicles 200 according to FIG. 7 for visualizing a desired image).

In particular, the method 700 for visualizing an image shown in FIG. 14 comprises the following four main operations or the following four main steps 710, 720, 730 and 740, wherein the step 710 comprises presenting navigation commands and a predetermined model of arrangement of unmanned aerial vehicles to unmanned aerial vehicles 200, each of which is provided with at least one white-color light source 260 configured to emit white-color light and at least one controllable light source 240 configured to emit light with a variable wavelength; the step 720 comprises, in response to said navigation commands, directing said unmanned aerial vehicles 200 from at least one parking station 100 to a predetermined region of space so as to enable disposition of each of said directed unmanned aerial vehicles 200 in a predetermined spatial location in accordance with said model of arrangement of unmanned aerial vehicles to form in the air at least one display from said light sources 240, 250, each of which corresponds to at least one pixel of said display; the step 730 comprises presenting data relating to a static or dynamic image to the unmanned aerial vehicles 200 so as to enable emission of white-color light by said white light source 260 and to enable altering of emission wavelength of said controllable light sources 240 of the unmanned aerial vehicles 200 for displaying said image on said display; and the step 740 comprises presenting navigation commands to said unmanned aerial vehicles 200 whose light sources 240, 260 form said display so as to enable movement thereof as part of said display to form at least one movable string of unmanned aerial vehicles.

FIG. 15 is a block diagram illustrating the basic operations of a method 750 for visualizing an image, wherein the method 750 for visualizing an image shown in FIG. 15 may be performed using a system 500 for visualizing an image which is based on the unmanned aerial vehicle shown in FIG. 5 and which may be implemented in accordance with any one of the relevant embodiments of the present invention described herein (i.e., the embodiments of the present invention pertaining to the unmanned aerial vehicle 200 according to FIG. 5 and the embodiments of the system 500 for visualizing an image which is based on the use of the unmanned aerial vehicles 200 according to FIG. 5 for visualizing a desired image).

In particular, the method 750 for visualizing an image shown in FIG. 15 comprises the following four main operations or the following four main steps 760, 770, 780 and 790, wherein the step 760 comprises presenting navigation commands and a predetermined model of arrangement of unmanned aerial vehicles to the unmanned aerial vehicles 200, each of which is provided with at least one screen 250; the step 770 comprises, in response to said navigation commands, directing said unmanned aerial vehicles 200 from at least one parking station 100 to a predetermined region of space so as to enable disposition of each of said directed unmanned aerial vehicles 200 in a predetermined spatial location in accordance with said model of arrangement of unmanned aerial vehicles to form in the air at least one aggregate screen from said screens 250; the step 780 comprises presenting data relating a static or dynamic image to a projection device (not shown) so as to enable projection of said image on said aggregate screen; and the step 790 comprises presenting navigation commands to said unmanned aerial vehicles 200 whose screens 250 form said aggregate screen so as to enable movement thereof as part of said aggregate screen to form at least one movable string of unmanned aerial vehicles.

FIG. 16 is a block diagram illustrating the basic operations of a method 800 for visualizing an image, wherein the method 800 for visualizing an image shown in FIG. 16 may be performed using a system 500 for visualizing an image which is based on the unmanned aerial vehicle shown in FIG. 6 and which may be implemented in accordance with any one of the relevant embodiments of the present invention described herein (i.e., the embodiments of the present invention pertaining to the unmanned aerial vehicle 200 according to FIG. 6 and the embodiments of the system 500 for visualizing an image which is based on the use of the unmanned aerial vehicles 200 according to FIG. 6 for visualizing a desired image).

In particular, the method 800 for visualizing an image shown in FIG. 16 comprises the following four main operations or the following four main steps 810, 820, 830 and 840, wherein the step 810 comprises presenting navigation commands and a predetermined model of arrangement of unmanned aerial vehicles to the unmanned aerial vehicles 200, each of which is provided with a housing or framework in the form of a fuselage 210; the step 820 comprises, in response to said navigation commands, directing said unmanned aerial vehicles 200 from at least one parking station 100 to a predetermined region of space so as to enable disposition of each of said directed unmanned aerial vehicles 200 in a predetermined spatial location in accordance with said model of arrangement of unmanned aerial vehicles to form in the air at least one screen from said housings or frameworks in the form of the fuselage 210; the step 830 comprises presenting data relating a static or dynamic image to a projection device (not shown) being part of the system 500 so as to enable projection of said image on said formed screen; and the step 840 comprises presenting navigation commands to said unmanned aerial vehicles 200 whose housings or frameworks in the form of the fuselage 210 form said screen so as to enable movement thereof as part of said formed screen to form at least one movable string of unmanned aerial vehicles.

FIG. 17 is a block diagram illustrating the basic operations of a method 850 for visualizing an image, wherein the method 850 for visualizing an image shown in FIG. 17 may be performed using a system 500 for visualizing an image which is based on the unmanned aerial vehicle shown in FIG. 7 and which may be implemented in accordance with any one of the relevant embodiments of the present invention described herein (i.e., the embodiments of the present invention pertaining to the unmanned aerial vehicle 200 according to FIG. 7 and the embodiments of the system 500 for visualizing an image which is based on the use of the unmanned aerial vehicles 200 according to FIG. 7 for visualizing a desired image).

In particular, the method 850 for visualizing an image shown in FIG. 17 comprises the following four main operations or the following four main steps 860, 870, 880 and 890, wherein the step 860 comprises presenting navigation commands and a predetermined model of arrangement of unmanned aerial vehicles to unmanned aerial vehicles 200, each of which is provided with at least one white-color light source 260 configured to emit white-color light and at least one controllable light source 240 configured to emit light with a variable wavelength; the step 870 comprises, in response to said navigation commands, directing said unmanned aerial vehicles 200 from at least one parking station 100 to a predetermined region of space so as to enable disposition of each of said directed unmanned aerial vehicles 200 in a predetermined spatial location in accordance with said model of arrangement of unmanned aerial vehicles to form in the air at least one display from said light sources 240, 260; the step 880 comprises presenting data relating to a static or dynamic image to said unmanned aerial vehicles 200 so as to enable emission of white-color light by said white light sources 260 of the unmanned aerial vehicles 200 and to enable altering of emission wavelength of said controllable light sources 240 of the unmanned aerial vehicles 200 for displaying said image on said formed display; and the step 890 comprises presenting navigation commands to said unmanned aerial vehicles 200 whose light sources 240, 260 form said display so as to enable movement thereof as part of said formed display to form at least one movable string of unmanned aerial vehicles.

FIG. 18 is a block diagram illustrating the basic operations of a method 900 for visualizing an image, wherein the method 900 for visualizing an image shown in FIG. 18 may be performed using a system 500 for visualizing an image which is based on the unmanned aerial vehicle shown in FIG. 8 and which may be implemented in accordance with any one of the relevant embodiments of the present invention described herein (i.e., the embodiments of the present invention pertaining to the unmanned aerial vehicle 200 according to FIG. 8 and the embodiments of the system 500 for visualizing an image which is based on the use of the unmanned aerial vehicles 200 according to FIG. 8 for visualizing a desired image).

In particular, the method 900 for visualizing an image shown in FIG. 18 comprises the following four main operations or the following four main steps 910, 920, 930 and 940, wherein the step 910 comprises presenting navigation commands and a predetermined model of arrangement of unmanned aerial vehicles to the unmanned aerial vehicles 200, each of which is provided with at least one screen 250 and projection device 270; the step 920 comprises, in response to said navigation commands, directing said unmanned aerial vehicles 200 from at least one parking station 100 to a predetermined region of space so as to enable disposition of each of said directed unmanned aerial vehicles 200 in a predetermined spatial location in accordance with said model of arrangement of unmanned aerial vehicles to form in the air at least one aggregate screen from said screens 250; the step 930 comprises presenting data relating a static or dynamic image to the projection devices 270 of unmanned aerial vehicles 200 so as to enable projection of said image on said aggregate screen; and the step 940 comprises presenting navigation commands to said unmanned aerial vehicles 200 whose screens 250 form said aggregate screen so as to enable movement thereof as part of said aggregate screen to form at least one movable string of unmanned aerial vehicles.

FIG. 19 is a block diagram illustrating the basic operations of a method 950 for visualizing an image, wherein the method 950 for visualizing an image shown in FIG. 19 may be performed using a system 500 for visualizing an image which is based on the unmanned aerial vehicle shown in FIG. 9 and which may be implemented in accordance with any one of the relevant embodiments of the present invention described herein (i.e., the embodiments of the present invention pertaining to the unmanned aerial vehicle 200 according to FIG. 9 and the embodiments of the system 500 for visualizing an image which is based on the use of the unmanned aerial vehicles 200 according to FIG. 9 for visualizing a desired image).

In particular, the method 950 for visualizing an image shown in FIG. 19 comprises the following four main operations or the following four main steps 960, 990, 980 and 990, wherein the step 960 comprises presenting navigation commands and a predetermined model of arrangement of unmanned aerial vehicles to the unmanned aerial vehicles 200, each of which is provided with a housing or framework in the form of a fuselage 210, and a projection device 270; the step 970 comprises, in response to said navigation commands, directing said unmanned aerial vehicles 200 from at least one parking station 100 to a predetermined region of space so as to enable disposition of each of said directed unmanned aerial vehicles 200 in a predetermined spatial location in accordance with said model of arrangement of unmanned aerial vehicles to form in the air at least one screen from said housings or frameworks in the form of the fuselage 210 of the unmanned aerial vehicles 200; the step 980 comprises presenting data relating a static or dynamic image to the projection devices 270 of unmanned aerial vehicles 200 so as to enable projection of said image on said formed screen; and the step 990 comprises presenting navigation commands to said unmanned aerial vehicles 200 whose housings or frameworks in the form of the fuselage 210 form said screen so as to enable movement thereof as part of said formed screen to form at least one movable string of unmanned aerial vehicles.

The provided illustrative embodiments of the present invention, examples and description serve only to facilitate understanding of the principles of the claimed invention and are not limiting. Other possible embodiments of the present invention, or modifications or improvements to the above embodiments of the present invention will suggest themselves to one skilled in the art after reading the above description. The scope of the present invention is limited only by the appended claims.

What is claimed is:

1. A system for visualizing an image, comprising:

one or more parking stations;

unmanned aerial vehicles which are accommodated in the parking stations and each of which is provided with at least one display; and a control device communicatively coupled to the unmanned aerial vehicles and configured to direct at least a portion of said unmanned aerial vehicles from at least one parking station of said parking stations to a predetermined region of space so as to enable disposition of each of said directed unmanned aerial vehicles in a predetermined spatial location in accordance with a predetermined model of arrangement of unmanned aerial vehicles to form in the air at least one aggregate display from said displays;

wherein the control device is configured to present data relating to an image to said directed unmanned aerial vehicles so as to enable displaying of said image at least on a portion of said aggregate display; and the unmanned aerial vehicles whose displays form said aggregate display define at least one movable string of unmanned aerial vehicles as part of said aggregate display, in which string said unmanned aerial vehicles move one after another along a predetermined trajectory, wherein the beginning of said movable string corresponds to the entry point of an unmanned aerial vehicle into the plurality of unmanned aerial vehicles forming the aggregate display, and the end of said string corresponds to the exit point of an unmanned aerial vehicle from the plurality of unmanned aerial vehicles forming the aggregate display.

2. The system according to claim 1, wherein each of said unmanned aerial vehicles is further provided with a location determination module configured to determine the spatial coordinates of said unmanned aerial vehicle in real time and is configured to present the determined spatial coordinates to the control device, and the control device is further configured to present navigation commands to the unmanned aerial vehicles for altering the course of movement thereof in the event that it is determined, based on the spatial coordinates thereof, that the distance between the unmanned aerial vehicles is less than a predetermined threshold value.

3. The system according to claim 1, wherein each of said unmanned aerial vehicles is further provided with measurement sensors for measuring flight parameters of the unmanned aerial vehicle and is further configured to present said flight parameters of the unmanned aerial vehicle to the control device, and the control device is further configured to present navigation commands to each of the unmanned aerial vehicles for altering the course of movement and/or mode of operation thereof in the event that at least one of said measured flight parameters thereof does not correspond to a threshold value or is beyond the range of threshold values.

4. The system according to claim 1, wherein each of the unmanned aerial vehicles is provided with at least one power source and is further configured to present, in real time, data relating to a power reserve of the unmanned aerial vehicle to the control device so as to enable replacement thereof with at least one other unmanned aerial vehicle from at least one of said parking stations in the event that the power reserve of said unmanned aerial vehicle to be replaced is below a predetermined threshold value.

5. The system according to claim 1, wherein each of the unmanned aerial vehicles is further configured to present, in real time, data relating to the operation of the display thereof to the control device so as to enable replacement thereof with at least one other unmanned aerial vehicle from at least one of said parking stations in the event of failure of the display thereof.

6. The system according to claim 1, wherein each of the unmanned aerial vehicles is further provided with measurement sensors for measuring parameters of state of the structure of the unmanned aerial vehicle and is further configured to present, in real time, the parameters of state of the structure of the unmanned aerial vehicle to the control device so as to enable replacement thereof with at least one other unmanned aerial vehicle from at least one of said parking stations in the event that at least one of said parameters of state of the structure of the unmanned aerial vehicle does not correspond to a threshold value or is beyond the range of threshold values.

7. The system according to claim 4, wherein said at least one power source comprises each at least one from the group comprising: a battery, a generator based on an internal combustion engine, a generator based on a hydrogen engine, and a solar panel.

8. The system according to claim 4, wherein at least one of said parking stations is further provided with at least one charging device, and the control device is further configured to direct each discharged unmanned aerial vehicle to said at least one parking station so as to enable connection thereof to one of said charging devices for replenishing the power reserve of the discharged unmanned aerial vehicle.

9. The system according to claim 8, wherein each of said charging devices is a wireless charging device or a wired charging device.

10. The system according to claim 8, wherein the unmanned aerial vehicles are configured to serially or parallelly electrically connect two or more of the unmanned aerial vehicles to one another while being accommodated on the parking station so as to enable connection thereof to a charging device for simultaneous replenishment of the range thereof.

11. The system according to claim 8, wherein each of said unmanned aerial vehicles is further provided with a detection device configured to determine the distance to other unmanned aerial vehicles in the operating area of the detection device and is further configured to alter the spatial location, course of movement and/or mode of operation thereof in the event that the distance to the detected unmanned aerial vehicle is less than a threshold value, or is further configured to present data relating to determined values of the distance to the detected unmanned aerial vehicles to the control device so as to enable altering of the spatial location, course of movement and/or mode of operation of said unmanned aerial vehicle or said detected unmanned aerial vehicle in the event that the distance to that detected unmanned aerial vehicle is less than a threshold value.

12. The system according to claim 1, wherein each of said unmanned aerial vehicles is provided with two displays disposed on said unmanned aerial vehicle such that they face opposite directions relative to one another, wherein, while forming the aggregate display, one of said displays defines one of the two opposite sides of the aggregate display, and the other one of said displays defines the other side of the aggregate display.

13. The system according to claim 12, wherein the control device enables displaying of the image from the both sides of said aggregate display, displaying of the image from one of the sides of said aggregate display, or displaying of distinct images on the opposite sides of said aggregate display.

14. The system according to claim 1, wherein the image being displayed is a static image or a dynamic image.

15. The system according to claim 1, wherein the control device is further configured to present navigation commands to the unmanned aerial vehicles whose displays form the aggregate display so as to enable re-arrangement of those unmanned aerial vehicles for altering the shape and/or size of the aggregate display.

16. The system according to claim 1, wherein the aggregate display is a two-dimensional display or a three-dimensional display.

17. The system according to claim 1, wherein the unmanned aerial vehicles whose displays form the aggregate display are divided into at least two groups, wherein the unmanned aerial vehicles in one of said groups have a movement speed and/or movement direction different from those of the unmanned aerial vehicles in other group of said groups.

18. The system according to claim 1, wherein the unmanned aerial vehicles whose displays form the aggregate display are divided into at least two groups, wherein the displays, with which the unmanned aerial vehicles in one of said groups are provided, have distinct overall dimensions, refresh rate and/or brightness different from those of the displays of the unmanned aerial vehicles in other group of said groups.

19. The system according to claim 1, wherein the unmanned aerial vehicles whose displays form the aggregate display maintain the spatial location thereof for a period of time corresponding to the duration of displaying of the image.

20. The system according to claim 1, wherein the unmanned aerial vehicles whose displays form the aggregate display are divided into at least two groups, and the control device enables displaying, on a portion of the aggregate display, the portion being formed from the displays of the unmanned aerial vehicles belonging to one of said groups, of a second image different from the image displayed on other portion of the aggregate display, the portion being formed from the displays of the unmanned aerial vehicles belonging to other group of said groups.

21. The system according to claim 1, wherein the unmanned aerial vehicles whose displays form the aggregate display are divided into at least two groups, and the control device enables displaying of the image on one portion of the aggregate display, the portion being formed from the displays of the unmanned aerial vehicles belonging to one of said groups, and on other portion of the aggregate display, the portion being formed from the displays of the unmanned aerial vehicles belonging to other group of said groups.

22. The system according to claim 1, wherein the unmanned aerial vehicles directed to the predetermined region of space are divided into two groups, wherein the displays of the unmanned aerial vehicles of the first group form the first layer of the aggregate display, and the displays of the unmanned aerial vehicles of the second group form the second layer of the aggregate display.

23. The system according to claim 22, wherein the control device enables displaying, on the displays of the first layer of the aggregate display, of a second image different from the image displayed on the displays of the second layer of the aggregate display, or coinciding therewith.

24. The system according to claim 22, wherein the control device enables displaying of a main image on the displays of the first layer of the aggregate display and enables displaying, on the displays of the second layer of the aggregate display, of a background image for said main image.

25. The system according to claim 1, wherein each of the displays of the unmanned aerial vehicles is one of a group of displays comprising: an LCD display, LED display, OLED display, AMOLED display, DLP display, TFT display, IPS display, TN display, STN display, CSTN display, FSTN display, DSTN display, DLP display, TFD display, LTPS display, UFB display, CRT display, PDP display and laser display.

26. The system according to claim 1, wherein the unmanned aerial vehicles are configured to detachably interact with one another while forming the aggregate display from the displays of the interacting unmanned aerial vehicles.

27. The system according to claim 1, wherein at least two of the unmanned aerial vehicles to be directed to the predetermined region of space are configured to mechanically connect to one another to form an aggregate unmanned aerial vehicle configured to detachably interact with at least one other unmanned aerial vehicle of said unmanned aerial vehicles while forming the aggregate display.

28. The system according to claim 1, wherein the unmanned aerial vehicles to be directed to a predetermined area of space are configured to mechanically connect to one another to form aggregate unmanned aerial vehicles, and the control device enables forming of the aggregate display from the displays of said aggregate unmanned aerial vehicles.

29. The system according to claim 1, wherein the unmanned aerial vehicles whose displays form the aggregate display are displaced in space with respect to one another along at least one of the three coordinate axes so that the aggregate display has a concave shape, a convex shape, or a curvilinear shape.

30. The system according to claim 1, wherein the unmanned aerial vehicles whose displays form the aggregate display form a predetermined quantity of sequentially disposed horizontal or vertical rows in each of which the unmanned aerial vehicles perform movement one after another towards the end of the row so as to return to the beginning of the row in case of going beyond the limits of said end of the row.

31. The system according to claim 30, wherein the unmanned aerial vehicles moving one after another and the corresponding returning unmanned aerial vehicles define a closed string of unmanned aerial vehicles.

32. The system according to claim 31, wherein the control device enables displaying of the corresponding portion of the image by the displays of the unmanned aerial vehicles moving one after another and enables turning off or darkening of the displays of the returning unmanned aerial vehicles.

33. The system according to claim 31, wherein the control device enables replacement of each discharged unmanned aerial vehicle with a charged unmanned aerial vehicle while return of the discharged unmanned aerial vehicle to the beginning of the corresponding one of the rows of unmanned aerial vehicles.

34. The system according to claim 33, wherein the control device further enables direction of a discharged unmanned aerial vehicle to a parking station for replenishment of the range thereof and enables return of said unmanned aerial vehicle with replenished range so as to provide for replacement of one of other discharged unmanned aerial vehicles.

35. The system according to claim 34, wherein the control device enables replacement of a discharged unmanned aerial vehicle with a charged unmanned aerial vehicle while presence of the discharged unmanned aerial vehicle in a spatial location located at the shortest distance from the place of charging thereof.

36. The system according to claim 4, wherein the control device enables direction of charged unmanned aerial vehicles to the predetermined region of space in a quantity corresponding to the quantity of unmanned aerial vehicles whose displays form the aggregate display so as to enable substantially simultaneous replacement thereof with said charged unmanned aerial vehicles.

37. The system according to claim 36, wherein the control device further enables formation, in said region of space, of a replacement aggregate display from said charged unmanned aerial vehicles, the replacement aggregate display being a copy of the aggregate display to be replaced, so as to enable replacement of the aggregate display to be replaced with the replacement aggregate display, wherein the control device substantially simultaneously presents control commands to the unmanned aerial vehicles whose displays form the aggregate display to be replaced so as to provide for turning off, darkening or hiding of those displays and presents control commands to the unmanned aerial vehicles whose displays form the replacement aggregate display so as to provide for turning on of those displays.

38. The system according to claim 37, wherein the control device further enables displaying, on the replacement aggregate display, of a second image coinciding with the image displayed by the replaced aggregate display, or of a third image being a continuation of the visual sequence of the image displayed by the replaced aggregate display.

39. The system according to claim 37, wherein the control device further enables replacement of the aggregate display to be replaced with a replacement aggregate display upon expiration of a predetermined period of time.

40. The system according to claim 1, wherein the unmanned aerial vehicles whose displays form the aggregate display are divided into at least two groups in each of which the displays of the unmanned aerial vehicles form one of the portions of the aggregate display, wherein the control device further enables formation, in said region of space, of at least one replacement portion of the aggregate display from charged unmanned aerial vehicles directed to said region of space so as to enable replacement of the portion to be replaced of the aggregate display with said replacement portion of the aggregate display.

41. The system according to claim 40, wherein, while replacement of a portion to be replaced of the aggregate display with a replacement portion of the aggregate display, the control device substantially simultaneously presents control commands to unmanned aerial vehicles whose displays form the portion to be replaced of the aggregate display so as to provide for turning off, darkening or hiding those displays, and control commands to unmanned aerial vehicles whose displays form the replacement portion of the aggregate display so as to provide for turning on of those displays.

42. The system according to claim 1, wherein the unmanned aerial vehicles to be directed to the predetermined region of space are divided into groups, in each of which the displays of the unmanned aerial vehicles form one of the layers of the aggregate display, wherein the control device further enables displaying, on each of said formed layers of the aggregate display, one of the aggregate portions of a three-dimensional image, one and the same two-dimensional image, or distinct two-dimensional images.

43. The system according to claim 1, wherein each of the unmanned aerial vehicles is provided with at least one power source and is further configured to present, in real time, data relating to the range to the control device so as to enable direction of each discharged unmanned aerial vehicle of the unmanned aerial vehicles whose displays form the aggregate display to one of said parking stations and to enable re-arrangement of the remaining unmanned aerial vehicles whose displays form the aggregate display for altering or maintaining the shape and/or size of the aggregate display.

44. The system according to claim 1, wherein the control device is further configured to direct, to said region of space, additional unmanned aerial vehicles from at least one of said parking stations so as to enable integration thereof into the structure of the aggregate display for altering the shape and/or size of the aggregate display.

45. The system according to claim 1, wherein the unmanned aerial vehicles whose displays form the aggregate display are divided into groups in each of which the displays of the unmanned aerial vehicles form one of the portions of the aggregate display, wherein, while forming the aggregate display, the control device enables arrangement of said unmanned aerial vehicles such that at least one of said portions of the aggregate display has a shape and/or size that are different from the remaining portions of the aggregate display.

46. The system according to claim 1, wherein each of the unmanned aerial vehicles is provided with at least one power source, and said system further comprises a laser projection unit configured to emit a laser beam, wherein each of the unmanned aerial vehicles is provided with a laser emission receiver/converter electrically connected to the power source and configured to convert the received laser beam into an electric current so as to enable charging of said power source.

47. The system according to claim 46, wherein each of the unmanned aerial vehicles is further configured to present, in real time, data relating to the range to the control device, and the control device is further configured to control the operation of the laser projection unit so as to enable direction of the laser beam to the unmanned aerial vehicle whose range is below a predetermined threshold value.

48. The system according to claim 1, further comprising an aerial lattice structure configured to accommodate thereon the unmanned aerial vehicles directed by the control device to said region of space so as to provide for formation of said aggregate display.

49. The system according to claim 48, wherein the lattice aerial structure is provided with landing platforms configured to accommodate thereon said directed unmanned aerial vehicles.

50. The system according to claim 48, wherein the lattice aerial structure is provided with one or more fasteners configured to interact with said directed unmanned aerial vehicles.

51. The system according to claim 48, wherein each of said directed unmanned aerial vehicles is provided with one or more fasteners configured to interact with the lattice aerial structure.

52. The system according to claim 1, wherein the unmanned aerial vehicles directed to the predetermined region of space are configured to mechanically connect to one another while forming the aggregate display.

53. The system according to claim 1, wherein the unmanned aerial vehicles directed to the predetermined region of space are provided with one or more fasteners enabling mutual detachable connection of said unmanned aerial vehicles to one another while forming the aggregate display.

54. The system according to claim 53, wherein the one or more fasteners of the unmanned aerial vehicles are configured to deploy, unfold or expand so as to enable mutual detachable connection of said unmanned aerial vehicles.

55. The system according to claim 53, wherein the one or more fasteners of the unmanned aerial vehicles are configured to extend from housings of the unmanned aerial vehicles to provide for mutual detachable connection of said unmanned aerial vehicles.

56. The system according to claim 1, wherein each of the unmanned aerial vehicles is further provided with at least one grip and image capturing device configured to capture images in real time in the field of view so as to enable identifying at least one of the directed unmanned aerial vehicles in said field of view while being present in said region of space, wherein each of said grips is communicatively coupled to the image capturing device so as to enable performance of gripping of one of the identified unmanned aerial vehicles in response to data relating to the identified unmanned aerial vehicles from the image capturing device.

57. The system according to claim 1, wherein at least one of said parking stations is further provided with at least one charging device, and the control device is further configured to direct the unmanned aerial vehicles whose displays form the aggregate display to said at least one parking station so as to enable connection of each of said directed unmanned aerial vehicles to one of said charging devices for replenishing the range thereof.

58. The system according to claim 57, wherein the control device is configured to present navigation commands to the unmanned aerial vehicles whose displays form the aggregate display for directing same to said at least one parking station upon expiration of a predetermined period of time.

59. The system according to claim 57, wherein the control device is configured to substantially simultaneously or sequentially present navigation commands to the unmanned aerial vehicles whose displays form the aggregate display for directing same to said at least one parking station.

60. The system according to claim 57, wherein the control device is configured to present navigation commands to the unmanned aerial vehicles whose displays form the aggregate display for directing same to said at least one parking station in groups or one after another.

61. The system according to claim 57, wherein the control device is further configured to present navigation commands to the charged unmanned aerial vehicles so as to enable return thereof to the initial spatial locations thereof for re-forming said aggregate display.

62. The system according to claim 1, wherein at least one of said parking stations is further provided with at least one charging device, and the unmanned aerial vehicles whose displays form the aggregate display are configured to move to said at least one parking station so as to enable connection of each of said directed unmanned aerial vehicles to one of said charging devices for replenishing the range thereof.

63. The system according to claim 62, wherein the unmanned aerial vehicles whose displays form the aggregate display are configured to automatically move to said at least one parking station upon expiration of a predetermined period of time.

64. The system according to claim 62, wherein the unmanned aerial vehicles whose displays form the aggregate display are configured to automatically move to said at least one parking station substantially simultaneously or sequentially.

65. The system according to claim 62, wherein the unmanned aerial vehicles whose displays form the aggregate display are configured to automatically move to said at least one parking station in groups or one after another.

66. The system according to claim 62, wherein the charged unmanned aerial vehicles are configured to automatically return to the initial spatial locations thereof for re-forming said aggregate display.

67. The system according to claim 1, wherein each of the unmanned aerial vehicles is provided with at least two displays disposed on said unmanned aerial vehicle such that they are arranged at an angle with respect to one another, wherein, while forming the aggregate display, said displays form distinct sides of the aggregate display.

68. The system according to claim 12, wherein the control device enables displaying of the image from all sides of said aggregate display, displaying of the image from at least one of the sides of said aggregate display, or displaying of distinct images on distinct sides of said aggregate display.

69. The system according to claim 1, wherein the control device is further configured to present navigation commands to the unmanned aerial vehicles whose displays form the aggregate display so as to enable re-arrangement of those unmanned aerial vehicles for dividing said aggregate display into at least two individual display portions for visualizing the image.

70. The system according to claim 1, wherein the control device further enables disposition of said directed unmanned aerial vehicles in predetermined spatial locations in accordance with the predetermined model of arrangement of unmanned aerial vehicles so as to enable formation in the air of at least two aggregate displays.

71. The system according to claim 70, wherein the control device is further configured to present navigation commands to the unmanned aerial vehicles whose displays form said at least two aggregate displays so as to enable re-arrangement of those unmanned aerial vehicles for combining said aggregate displays into at least one integral display portion for visualizing the image.

72. A method for visualizing an image comprising the following steps of:

presenting navigation commands and a predetermined model of arrangement of unmanned aerial vehicles to unmanned aerial vehicles, each of which is provided with at least one display;

in response to said navigation commands, directing said unmanned aerial vehicles from at least one parking station to a predetermined region of space so as to enable disposition of each of said directed unmanned aerial vehicles in a predetermined spatial location in accordance with said model of arrangement of unmanned aerial vehicles for forming in the air at least one aggregate display from said displays;

presenting data relating a static or dynamic image to the unmanned aerial vehicles so as to enable displaying of said image on said aggregate display; and presenting navigation commands to said unmanned aerial vehicles whose displays form said aggregate display so as to enable movement thereof as part of said aggregate display to form at least one movable string of unmanned aerial vehicles, in which string said unmanned aerial vehicles move one after another along a predetermined trajectory, wherein the beginning of said movable string corresponds to the entry point of an unmanned aerial vehicle into the plurality of unmanned aerial vehicles forming the aggregate display, and the end of said string corresponds to the exit point of an unmanned aerial vehicle from the plurality of unmanned aerial vehicles forming the aggregate display.

73. The method according to claim 72, further comprising:

receiving, by means of the control device, data relating to the range from each of the unmanned aerial vehicles whose displays form the aggregate display;

detecting, by means of the control device, each discharged unmanned aerial vehicle whose range is less than a threshold value among said unmanned aerial vehicles, based on said data relating to the range; and directing, by means of the control device, a charged unmanned aerial vehicle from the parking station for replacing said discharged unmanned aerial vehicle.

74. The method according to claim 73, further comprising directing said discharged unmanned aerial vehicle to the parking station so as to enable replenishment of the range thereof.

75. The method according to claim 74, further comprising directing the unmanned aerial vehicle with a replenished range to the predetermined region of space so as to enable replacement of one of the discharged unmanned aerial vehicles whose displays form the aggregate display.

76. The method according to claim 72, further comprising presenting, by means of the control device, navigation commands to the unmanned aerial vehicles whose displays form the aggregate display so as to enable rearrangement of those unmanned aerial vehicles for altering the shape and/or size of the aggregate display.

77. The method according to claim 72, further comprising presenting, by means of the control device, navigation commands to the unmanned aerial vehicles whose displays form the aggregate display so as to enable rearrangement of those unmanned aerial vehicles for dividing said aggregate display into at least two individual display portions for visualizing the image.

78. The method according to claim 72, wherein said directed unmanned aerial vehicles, while being disposed in predetermined spatial locations in accordance with the predetermined model of arrangement of unmanned aerial vehicles, form in the air at least two aggregate displays.

79. The method according to claim 78, further comprising presenting, by means of the control device, navigation commands to the unmanned aerial vehicles whose displays form the aggregate display so as to enable rearrangement of those unmanned aerial vehicles for combining said aggregate displays into at least one integral display portion for visualizing the image.

* * * * *